(12) United States Patent
Jeong et al.

(10) Patent No.: US 10,452,333 B2
(45) Date of Patent: Oct. 22, 2019

(54) USER TERMINAL DEVICE PROVIDING USER INTERACTION AND METHOD THEREFOR

(71) Applicant: SAMSUNG ELECTRONICS CO., LTD., Suwon-si (KR)

(72) Inventors: Hee-seok Jeong, Suwon-si (KR); Se-jin Kwak, Seoul (KR); Hyun-jin Kim, Seoul (KR); Shi-yun Cho, Anyang-si (KR); Yeo-jun Yoon, Suwon-si (KR); Moon-joo Lee, Suwon-si (KR); Nipun Kumar, Suwon-si (KR); Joon-kyu Seo, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 451 days.

(21) Appl. No.: 15/199,044

(22) Filed: Jun. 30, 2016

(65) Prior Publication Data
US 2016/0313966 A1    Oct. 27, 2016

Related U.S. Application Data

(63) Continuation of application No. PCT/KR2014/012785, filed on Dec. 24, 2014.

(30) Foreign Application Priority Data

Dec. 30, 2013  (KR) .................. 10-2013-0167120
Sep. 2, 2014   (KR) .................. 10-2014-0116506

(51) Int. Cl.
*G06F 3/14* (2006.01)
*G06F 1/16* (2006.01)
(Continued)

(52) U.S. Cl.
CPC .......... *G06F 3/1423* (2013.01); *G04G 21/00* (2013.01); *G06F 1/163* (2013.01); *G06F 1/165* (2013.01);
(Continued)

(58) Field of Classification Search
CPC ...... G06F 3/1423; G06F 1/163; G06F 3/0482; G06F 3/04817; G06F 1/1692;
(Continued)

(56) References Cited

U.S. PATENT DOCUMENTS 8,723,824 B2   5/2014 Myers et al.
8,918,738 B2  12/2014 Yoshitomi et al.
(Continued)

FOREIGN PATENT DOCUMENTS

CN   102238281 A   11/2011
CN   102388356 A    3/2012
(Continued)

OTHER PUBLICATIONS

Communication dated Jun. 2, 2017, issued by the European Patent Office in counterpart European Application No. 14876874.0.
(Continued)

*Primary Examiner* — John T Repsher, III
(74) *Attorney, Agent, or Firm* — Sughrue Mion, PLLC

(57) ABSTRACT

A user interaction method of a user terminal device including a bent touchscreen includes: establishing a connection between the user terminal device and an external device located external to the user terminal device, such that the user terminal device and the external device are able to communicate with each other; displaying a UI element associated with the external device on a sub-region of the bent touch screen; and performing a function associated with the UI element in response to a user gesture selecting the UI element.

16 Claims, 61 Drawing Sheets

(51) Int. Cl.

| | | |
|---|---|---|
| *G06F 3/0482* | (2013.01) | |
| *G06F 3/0481* | (2013.01) | |
| *G06F 3/0484* | (2013.01) | |
| *G06F 3/0488* | (2013.01) | |
| *H04M 1/725* | (2006.01) | |
| *G06F 3/041* | (2006.01) | |
| *G04G 21/00* | (2010.01) | |
| *H04M 1/23* | (2006.01) | |

(52) U.S. Cl.
CPC .......... *G06F 1/169* (2013.01); *G06F 1/1626* (2013.01); *G06F 1/1652* (2013.01); *G06F 1/1692* (2013.01); *G06F 3/041* (2013.01); *G06F 3/0482* (2013.01); *G06F 3/0484* (2013.01); *G06F 3/04817* (2013.01); *G06F 3/04845* (2013.01); *G06F 3/04847* (2013.01); *G06F 3/04883* (2013.01); *G06F 3/04886* (2013.01); *H04M 1/72583* (2013.01); *G06F 2200/1634* (2013.01); *G06F 2203/0339* (2013.01); *G06F 2203/04102* (2013.01); *G06F 2203/04803* (2013.01); *G06F 2203/04808* (2013.01); *G09G 2370/16* (2013.01); *H04M 1/236* (2013.01); *H04M 2250/16* (2013.01)

(58) Field of Classification Search
CPC .. G06F 1/165; G06F 3/04847; G06F 3/04886; G06F 3/04883; G06F 3/04845; G06F 3/0484; G06F 3/041; G06F 1/169; G06F 1/1652; G06F 1/1626; G06F 2203/04808; G06F 2203/04803; G06F 2203/04102; G06F 2203/0339; G06F 2200/1634; H04M 1/72583; H04M 2250/16; H04M 1/236; G09G 2370/16; G04G 21/00
USPC ........................................................ 715/761
See application file for complete search history.

(56) References Cited

U.S. PATENT DOCUMENTS

| | | | |
|---|---|---|---|
| 8,990,721 B2 | 3/2015 | Choi | |
| 9,898,163 B2 | 2/2018 | Yoshitomi et al. | |
| 10,019,052 B2 | 7/2018 | Lee et al. | |
| 2008/0146285 A1* | 6/2008 | Lee | H04M 1/0266 455/566 |
| 2011/0276911 A1 | 11/2011 | Choi | |
| 2012/0036475 A1 | 2/2012 | Yoshitomi et al. | |
| 2013/0016040 A1 | 1/2013 | Ahn et al. | |
| 2013/0076649 A1* | 3/2013 | Myers | H04M 1/0268 345/173 |
| 2013/0145311 A1 | 6/2013 | Joo | |
| 2013/0265221 A1 | 10/2013 | Lee et al. | |
| 2013/0300697 A1 | 11/2013 | Kim et al. | |
| 2014/0269223 A1* | 9/2014 | Mokhnatkina | G04G 13/02 368/73 |
| 2015/0015511 A1* | 1/2015 | Kwak | G06F 3/0412 345/173 |
| 2015/0031348 A1* | 1/2015 | Lee | H04B 1/385 455/418 |
| 2015/0046874 A1 | 2/2015 | Yoshitomi et al. | |
| 2018/0129382 A1 | 5/2018 | Yoshitomi et al. | |

FOREIGN PATENT DOCUMENTS

| | | |
|---|---|---|
| EP | 2420922 A1 | 2/2012 |
| KR | 10-0548364 B1 | 2/2006 |
| KR | 10-2010-0003585 A | 1/2010 |
| KR | 10-2011-0083386 A | 7/2011 |
| KR | 10-2013-0113895 A | 10/2013 |
| KR | 10-2013-0127050 A | 11/2013 |

OTHER PUBLICATIONS

Rad Systems: "Charger Alert", Google Play, Oct. 26, 2012, XP002770030, Retrieved from the Internet: URL: https://play.google.com/store/apps/details?id=com.chargeralert.android, (2 pages total).
Communication dated Apr. 22, 2015, issued by the Korean Intellectual Property Office in corresponding Korean Application No. 10-2014-0116506.
Communication dated Sep. 24, 2015, issued by the Korean Intellectual Property Office in corresponding Korean Application No. 10-2014-0116506.
Communication dated Nov. 17, 2015, issued by the Korean Intellectual Property Office in corresponding Korean Application No. 10-2014-0116506.
International Search Report, issued by International Searching Authority in corresponding International Application No. PCT/KR2014/012785, dated Apr. 24, 2015. (PCT/ISA/210).
Written Opinion, issued by International Searching Authority in corresponding International Application No. PCT/KR2014/012785, dated Apr. 24, 2015. (PCT/ISA/237).
Communication dated Aug. 23, 2018, issued by the European Patent Office in counterpart European Application No. 14876874.0.
Communication dated Jan. 28, 2019, from the State Intellectual Property Office of People's Republic of China in counterpart Application No. 201480059965.6.
Communication dated Aug. 7, 2019 issued by the State Intellectual Property Office of P.R. China in counterpart Chinese Application No. 201480059965.6.
Communication dated Aug. 8, 2019 issued by the Korean Intellectual Property Office in counterpart Korean Application No. 10-2015-0050717.

* cited by examiner

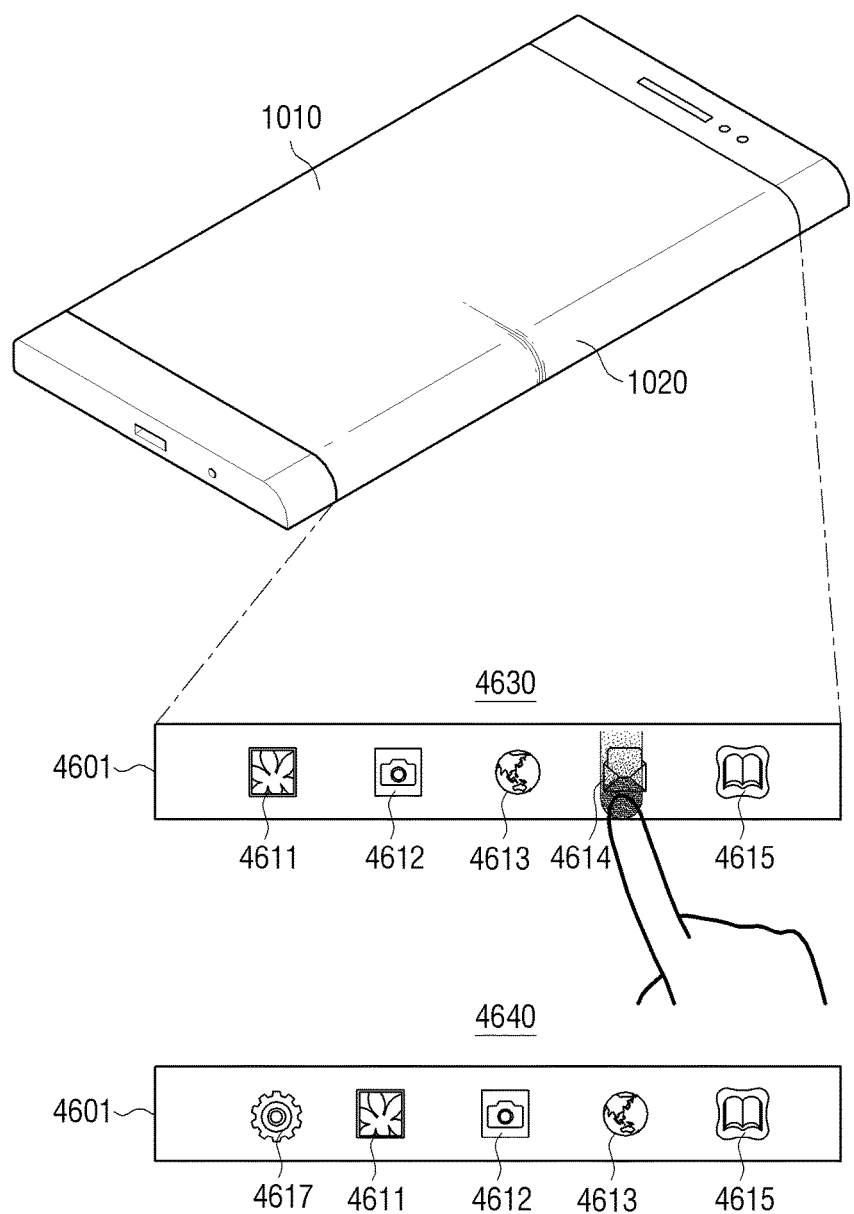

USER TERMINAL DEVICE PROVIDING USER INTERACTION AND METHOD THEREFOR

CROSS-REFERENCE TO RELATED APPLICATIONS

This application is a continuation of International Application PCT/KR2014/012785, filed on Dec. 24, 2014, in the Korean Intellectual Property Office, and claims priority to Korean Patent Application Nos. 10-2013-0167120 filed on Dec. 30, 2013 and 10-2014-0116506 filed on Sep. 2, 2014 in the Korean Intellectual Property Office, the disclosures of which are incorporated herein by reference in their entirety.

BACKGROUND

Field

Apparatuses and methods consistent with the present disclosure relate to a user terminal device providing a user interaction and a method therefor, and more particularly, to a user terminal device providing a user interaction using a bent touch screen divided into a main region and at least one sub-region and a method therefor.

Description of the Related Art

With the development of electronic technology, various types of user terminal devices have been developed and distributed. Recently, user terminal devices having a greater diversity of functions have become available, while the size of user terminal devices has been reduced. As a result, demand for user terminal devices has increased.

A user terminal device may provide various types of content, such as multimedia content and applications, in response to a user request. A user may use buttons, a touch screen, and the like, which are installed in the user terminal device, to select the various functions of the user terminal device. The user terminal device may optionally execute programs depending on the user interaction, and may display the executed results.

Meanwhile, as the functionality of user terminal devices increases, there is a greater need for a method for displaying content that utilizes different types of user interaction. That is, as the available types and functionality of content increases, the existing interaction methods, which rely on buttons and touch screens, may not be sufficient.

Therefore, there is a need for a user interaction technology to enable the user to use the user terminal device more conveniently.

SUMMARY

Exemplary embodiments overcome the above disadvantages and other disadvantages not described above. Also, the exemplary embodiments are not required to overcome the disadvantages described above, and an exemplary embodiment of the present invention may not overcome any of the problems described above.

The present disclosure provides a user terminal device capable of supporting various user interactions using a bent touch screen divided into a main region and at least one sub-region and a method therefor.

According to an aspect of the present disclosure, a user interaction method for a user terminal device including a bent touch screen that is divided into a main region corresponding to a front surface of the user terminal device and a sub-region having an area smaller than that of the main region and corresponding to a side surface of the user terminal device, a viewing plane of the sub region being fixed to form an obtuse angle with respect to the main region, the user interaction method includes: sensing a user gesture selecting a first object included in a menu displayed on the sub-region of the user terminal device; sensing an accessory gesture on the main region of the user terminal device, the accessory gesture performed by an accessory device associated with the use terminal device; and visually transforming and displaying a region corresponding to a trajectory of the accessory gesture on the main region of the user terminal device by applying a function corresponding to the first object selected by the user gesture.

The receiving of the user gesture may include receiving the user gesture through a touch panel mounted under the sub-region of the bent touch screen and the receiving of the accessory gesture may include receiving the accessory gesture through a recognition panel mounted under the main region of the bent touch screen.

The visually transforming and displaying of the region corresponding to the trajectory of the accessory gesture may include visually transforming and displaying the region corresponding to the trajectory of the accessory gesture in response to the user gesture being held on the first object.

The visually transforming and displaying of the region corresponding to the moved trajectory may include visually transforming and displaying the region corresponding to the moved trajectory by applying a function corresponding to a second object different from the first object included in the menu when the finger touch is released on the first object.

The visually transforming and displaying of the region corresponding to the moved trajectory may include returning the region corresponding to the moved trajectory visually transformed and displayed to a form before the transformation when the finger touch is released on the first object.

The receiving of the finger gesture selecting the first object may further include sensing a user's palm performing the finger gesture at a back surface of the user terminal device.

The region corresponding to the moved trajectory may be a region in which the moved trajectory is located on the main region, a region in a closed curve depending on a generation of the closed curve by the moved trajectory, or a region around the moved trajectory.

The menu may include a menu for editing or drawing an image on the main region and the menu may include at least one of a pencil object, a pen thickness object, a brush object, an eraser object, a straight object, and a curved object.

The menu may be a menu for managing an e-book page displayed on the main region and the menu may include at least one of a bold type object, an italic type object, an underbar object, a cancellation line object, a font size change object, a highlight object, a search object, and a magnifying glass object.

The receiving of the finger gesture selecting the first object included in the menu displayed on the sub-region may include receiving a multi-finger gesture selecting the first object and the second object included in the menu displayed on the sub-region and the visually transforming and displaying of the region corresponding to the moved trajectory may include visually transforming and displaying the region corresponding to the moved trajectory as a result of applying a function corresponding to the first object and the second object to the region corresponding to the moved trajectory of the pen gesture in response to the multi-finger gesture.

The visually transforming and displaying of the region corresponding to the moved trajectory may further include executing an application processing the displayed image to be displayed on the main region as a result of applying the function corresponding to the first object.

According to another aspect of the present disclosure, a user terminal device including a bent touch screen that is divided into a main region and a sub-region having an area smaller than that of the main region and is fixed to form a surface including the main region and a surface including the sub-region in an obtuse angle, the user terminal device includes: the bent touch screen receiving a finger gesture selecting a first object included in a menu displayed on the sub-region and receiving a pen gesture moved on the main region; and a controller visually transforming and displaying a region corresponding to a trajectory moved by the pen gesture by applying a function corresponding to the first object selected by the finger gesture to the region.

The bent touch screen may receive the finger gesture through a touch panel mounted under the sub-region of the bent touch screen and receive the pen gesture through a pen recognition panel mounted under the main region of the bent touch screen.

The controller may visually transform and display the region corresponding to the moved trajectory when a finger touch gesture is held on the first object as the user's finger gesture.

The controller may visually transform and display the region corresponding to the moved trajectory by applying a function corresponding to a second object different from the first object included in the menu to the region when the finger touch is released on the first object.

The controller may return the region corresponding to the moved trajectory visually transformed and displayed to a form before the transformation when the finger touch is released on the first object.

The region corresponding to the moved trajectory may be a region in which the moved trajectory is located on the main region, a region in a closed curve depending on a generation of the closed curve by the moved trajectory, or a region around the moved trajectory.

The bent touch screen may receive a multi-finger gesture selecting the first object and the second object included in the menu displayed on the sub-region and the controller may visually transform and display the region corresponding to the moved trajectory in response to the multi-finger gesture, as a result of applying a function corresponding to the first object and the second object to the region corresponding to the moved trajectory of the pen gesture.

The controller may execute an application processing the displayed image to be displayed on the main region as a result of applying the function corresponding to the first object.

According to another aspect of the present disclosure, a recording medium recorded with a program executing a user interaction of a user terminal device including a bent touch screen that is divided into a main region and a sub-region having an area smaller than that of the main region and is fixed to form a surface including the main region and a surface including the sub-region in an obtuse angle, the program includes receiving a finger gesture selecting a first object included in a menu displayed on the sub-region of the bent touch screen fixed to form the surface including the main region and the surface including the sub-region in the obtuse angle; receiving a pen gesture moved on the main region; and visually transforming and displaying a region corresponding to a moved trajectory in response to the finger gesture and the pen gesture, as a result of applying a function corresponding to the first object to the region corresponding to the moved trajectory of the pen gesture.

According to another aspect of the present disclosure, a user interaction method for a user terminal device including a bent touch screen that includes a main region corresponding to a front surface of the user terminal device and a sub-region corresponding to a side surface of the user terminal device, a viewing plane of the sub-region being fixed at an obtuse angle with respect to the main region, the user interaction method includes: establishing a connection between the user terminal device and an external device located external to the user terminal device, such that the user terminal device and the external device are able to communicate with each other; displaying a UI element associated with the external device on the sub-region in response to the establishing the connection between the user terminal device and the external device; sensing a user gesture selecting the UI element; and performing a function associated with the UI element in response to the sensed user gesture.

The performing of the function associated with the UI element may include displaying an execution screen of an application corresponding to the UI element on the main region or the sub-region of the bent touch screen.

The performing of the function associated with the UI element may include displaying at least one UI element configured to control the external device on the sub-region of the bent touch screen.

The performing of the function associated with the UI element may include controlling a function of the external device.

According to another aspect of the present disclosure, a user interaction method for a user terminal device including a bent touch screen that includes a main region corresponding to a front surface of the user terminal device and a sub-region corresponding to a side surface of the user terminal device, a viewing plane of the sub-region being fixed at an obtuse angle with respect to the main region, the user interaction method includes: determining that an accessory device associated with the user terminal device is separated from the user terminal device, such that the user terminal device and the accessory device are in a state of diminished communication with each other; displaying a UI element associated with the accessory device on the sub-region in response to the determining that the accessory device associated with the user terminal device is separated from the user terminal device; sensing a user gesture selecting the UI element; and performing a function associated with the UI element in response to the sensed user gesture.

The performing of the function associated with the UI element may include displaying an execution screen of an application corresponding to the UI element on the main region or the sub-region of the bent touch screen.

According to another aspect of the present disclosure, a user interaction method for a user terminal device including a bent touch screen that includes a main region corresponding to a front surface of the user terminal device and a sub-region corresponding to a side surface of the user terminal device, a viewing plane of the sub-region being fixed at an obtuse angle with respect to the main region, the user interaction method includes: receiving a communication request from an external device; displaying a UI element representing the external device on the sub-region in response to the communication request from the external device; sensing a user gesture selecting the UI element displayed on the sub-region; and establishing a communication connection between the user terminal device and the external device in response to the sensed user gesture.

According to another aspect of the present disclosure, a user terminal device includes a bent touch screen that includes a main region corresponding to a front surface of the user terminal device and a sub-region corresponding to a side surface of the user terminal device, a viewing plane of the sub-region being fixed at an obtuse angle with respect to the main region; and a controller, the bent touch screen being configured to sense a user gesture; and the controller being configured to establish a connection between the user terminal device and an external device located external to the user terminal device, such that the user terminal device and the external device are able to communicate with each other, display a UI element associated with the external device on the sub-region in response to the establishing the connection between the user terminal device and the external device, and perform a function associated with the UI element in response to a user gesture selecting the UI element being received through the bent touch.

The controller may display an execution screen of an application corresponding to the UI element on the main region or the sub-region in response to the user gesture selecting the user interface element being received through the bent touch screen.

The controller may display at least one UI element operable to control the external device on the sub-region of the user terminal device in response to the user gesture selecting the user interface element being received through the bent touch screen.

The controller may be configured to control a function of the external device in response to the user gesture selecting the user interface element being received through the bent touch screen.

According to another aspect of the present disclosure, a user terminal device includes a bent touch screen that includes a main region and corresponding to a front surface of the user terminal device and a sub-region corresponding to a side surface of the user terminal device, a viewing plane of the sub-region being fixed at an obtuse angle with respect to the main region; and a controller, the bent touch screen being configured to sense a user gesture; and the controller being configured to determine that an accessory device associated with the user terminal device is separated from the user terminal device, such that the user terminal device and the accessory device are in a state of diminished communication with each other; display a UI element associated with the accessory device on the sub-region in response to the determining that the accessory device associated with the user terminal device is separated from the user terminal device, and perform a function associated with the UI element in response to a user gesture selecting the user interface element being received through the bent touch screen.

The controller may display an execution screen of an application corresponding to the UI element on the main region or the sub-region when performing the function associated with the UI element.

According to another aspect of the present disclosure, a user terminal device including a bent touch screen that includes a main region and a sub-region each corresponding to a front surface and a side surface of the user terminal device, the user terminal device includes: the bent touch screen receiving a user gesture; and a controller displaying a UI element representing an external device communicating with the user terminal device on the sub-region and performing a communication connection between the user terminal device and the external device in response to the user gesture received through the bent touch screen selecting the UI element.

As described above, according to various exemplary embodiments of the present disclosure, the user may use the bent touch screen to control the function of the user terminal device. As a result, it is possible to enhance the user convenience and satisfaction.

BRIEF DESCRIPTION OF THE DRAWINGS

The above and/or other aspects of the exemplary embodiments will be more apparent by describing certain exemplary embodiments with reference to the accompanying drawings, in which:

FIGS. 45, 46A, and 46B are diagrams illustrating the performance of the user interaction on a panel displayed in a sub-region according to an exemplary embodiment of the present disclosure;

DETAILED DESCRIPTION OF THE EXEMPLARY EMBODIMENTS

Hereinafter, the present disclosure will be described in detail with reference to the accompanying drawings.

Figure 1:
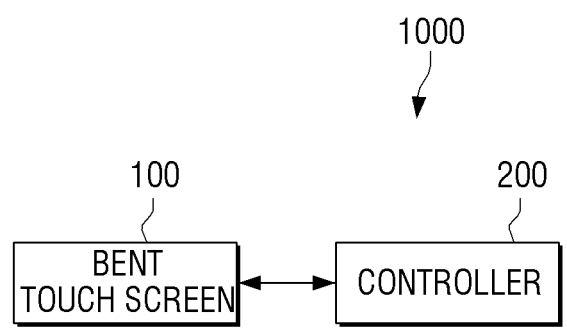
FIG. 1 is a block diagram illustrating a configuration of a user terminal device according to an aspect of an exemplary embodiment.

FIG. 1 is a block diagram illustrating an example of a basic configuration of a user terminal device for describing various exemplary embodiments of the present disclosure. A user terminal device 1000 of FIG. 1 may be implemented as various types of apparatuses such as TV, a PC, a laptop PC, a cellular phone, a tablet PC, a PDA, an MP3 player, a kiosk, a digital photo frame, and a table display apparatus. When the user terminal device 1000 is implemented as one of the portable apparatuses such as the cellular phone, the tablet PC, the PDA, the MP3 player, and the laptop PC, the user terminal device 1000 may also be called a mobile device, but will be generally referred to as a user terminal device for purposes of the present specification.

Referring to FIG. 1, the user terminal device 1000 includes a bent touch screen 100 and a controller 200.

The bent touch screen 100 is divided into a main region and at least one sub-region. Here, the definition of the main region and the sub-region may vary. For example, a region having a relatively larger size of the two regions may be defined as the main region, and a region having a relatively smaller size of the two regions may be defined as the sub-region. Alternatively, a region located on the same surface as a surface on which a home button for returning to a home screen, a front speaker, or the like is disposed may be defined as the main region, and a region located at a side surface or a back surface may be defined as the sub-region. Alternatively, the main region may be defined as a region capable of directly controlling a UI element within the region, and the sub-region may also be defined as a region capable of controlling the UI element within the main region.

An area of the sub-region may be smaller than the main region. Further, at least one sub-region may form a surface different from the main region. For example, if the main region is disposed on a front surface of the user terminal device 1000, at least one sub-region may be disposed on different surfaces like a right side surface, a left side surface, and a back surface among the external surfaces of the user terminal device 1000. The surface including the main region and the surface including at least one sub-region may be fixed to form an angle with respect to each other, for instance, a right angle, an acute angle, or an obtuse angle. The forms, positions, and number of sub-regions may be variously implemented according to the exemplary embodiments of the present disclosure. This will be described below in more detail with reference to the accompanying drawings.

The controller 200 may individually control the main region and at least one sub-region of the bent touch screen 100. For example, the main region and at least one sub-region may display different contents. A kind, a display method, a layout, or the like of contents displayed on the main region and at least one sub-region may be variously changed according to the exemplary embodiment of the present disclosure. This will be described below in more detail.

Figure 2:
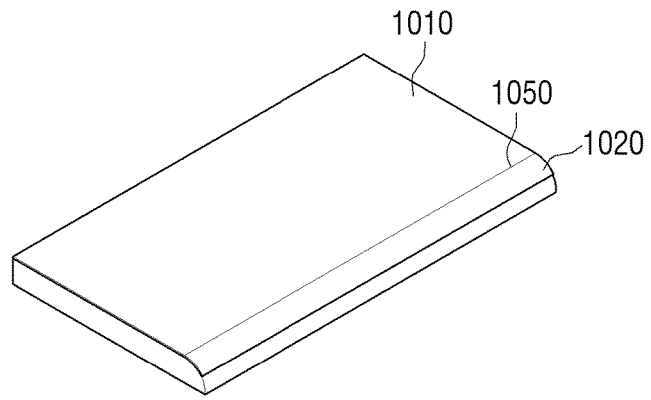
FIGS. 2, 3, 4, 5, 6, 7, 8, 9, and 10 are diagrams illustrating various configuration examples of a bent touch screen.

FIG. 2 is a diagram illustrating an example of an external configuration of the user terminal device including the bent touch screen divided into one sub-region and the main region.

Referring to FIG. 2, the bent touch screen 100 may be divided into a main region 1010 disposed on the front surface of the user terminal device 1000 and a sub-region 1020 disposed on the right side surface of the user terminal device 1000. In FIG. 2, the main region 1010 and the sub-region 1020 are divided based on a boundary region 1050. Considering the fact that the bent touch screen 100 is in a bent state, the boundary region 1050 may be differently represented as a curve.

Figure 3:

FIG. 3 is a diagram illustrating a cross section configuration of the user terminal device of FIG. 2. Referring to FIG. 3, the main region 1010 and the sub-region 1020 of the bent touch screen 100 are disposed on the front surface and the side surface, respectively, of the user terminal device 1000.

Figure 4:
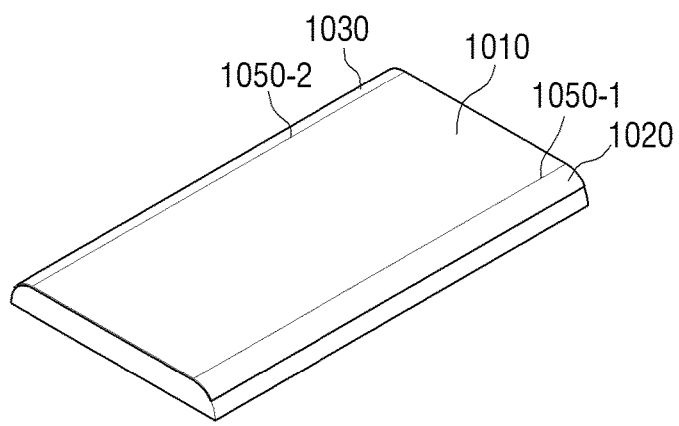
Figure 5:
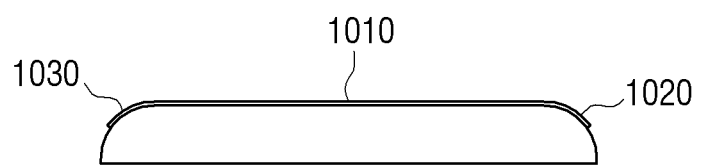

FIGS. 4 and 5 are diagrams illustrating examples of the external configuration and the cross section configuration of the user terminal device including the bent touch screen divided into two sub-regions and the main region.

Referring to FIG. 4, the main region 1010 is disposed on the front surface and the sub-regions 1020 and 1030 are disposed on the right side surface and the left side surface, respectively. The main region 1010 and each of the sub-regions 1020 and 1030 are divided by boundary regions 1050-1 and 1050-2.

FIG. 5 illustrates the cross section configuration of the user terminal device of FIG. 4. Referring to FIG. 5, each of the sub-regions 1020 and 1030 may be disposed to form an angle, for instance, an obtuse angle, with respect to the main region 1010, so as to be able to be viewed from a front direction.

Figure 6:
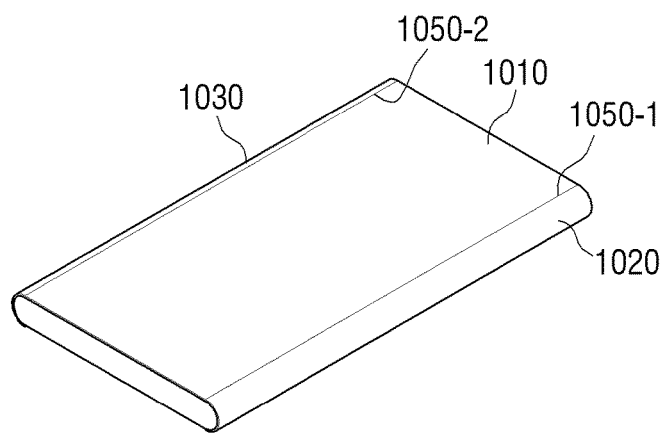
Figure 7:
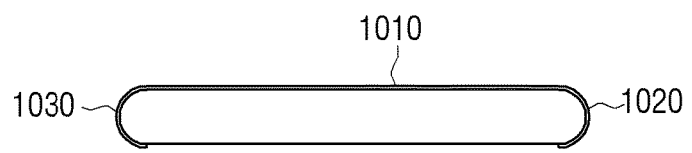

FIGS. 6 and 7 are diagrams illustrating another example of the user terminal device including the bent touch screen divided into two sub-regions and the main region. Referring to FIG. 6, the two sub-regions 1020 and 1030 are disposed at both sides of the main region 1010, and may be fixed at an angle at which they may be viewed from the right and left directions, and not from the front direction. That is, referring to FIG. 7, each of the sub-regions 1020 and 1030 may be bent at approximately 90° with respect to the surface including the main region 1010.

Meanwhile, according to another exemplary embodiment of the present disclosure, the sub-region may also be disposed at an opposite side of the main region 1010.

Figure 8:
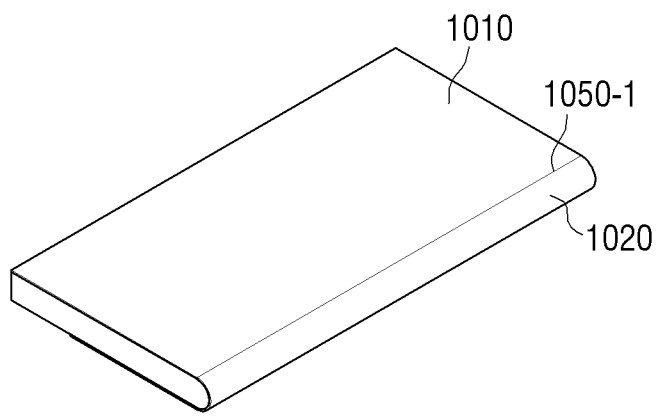
Figure 9:
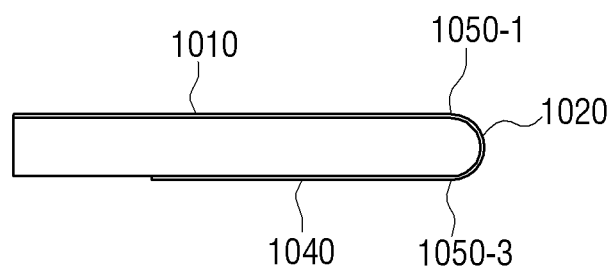

FIGS. 8 and 9 are diagrams illustrating another example of the user terminal device including the bent touch screen divided into two sub-regions and the main region. Referring to FIGS. 8 and 9, the bent touch screen 100 is divided into the main region 1010 formed on the front surface, a first sub-region 1020 formed on the side surface, and the second sub-region 1040 formed on the back surface. In FIG. 9, the second sub-region 1040 does not cover the whole back surface but may be formed only in a portion of the back surface. The controller 200 may divide the main region 1010, the first sub-region 1020, and the second sub-region 1040 based on a first boundary region 1050-1 and a third boundary region 1050-3 to display different contents for each region.

Meanwhile, FIGS. 3 to 9 illustrate that the sub-regions 1020 and 1030 are formed in a curved or rounded shape, and thus the surface including the main region 1010 and the curved surface including the sub-regions 1020 and 1030 are connected to each other to form an obtuse angle θ. However, the sub-regions 1020, 1030, and 1040 may also be planar, i.e., formed in a plane form. In this case, the plane including the main region 1010 and the plane including the sub-regions 1020, 1030, and 1040 may contact each other along a boundary line. That is, the boundary regions 1050-1, 1050-2, and 1050-3 may also be a line shape.

Meanwhile, the user terminal device 1000 may have a triangular cross section. In this case, the surface including the main region 1010 and the surface including the sub-region 1020 are connected to each other to form the obtuse angle θ at the boundary region 1050. In addition, the cross section configuration may be configured in various shapes such as a trapezoid and a polygon.

Further, the state in which the bent touch screen 100 is bent in a horizontal direction with respect to the front surface of the user terminal device is illustrated as described above in FIGS. 3-9, but the present disclosure is not limited thereto. That is, the bent touch screen 100 may be bent in a vertical direction with respect to the front surface of the user terminal device 1000.

Figure 10:
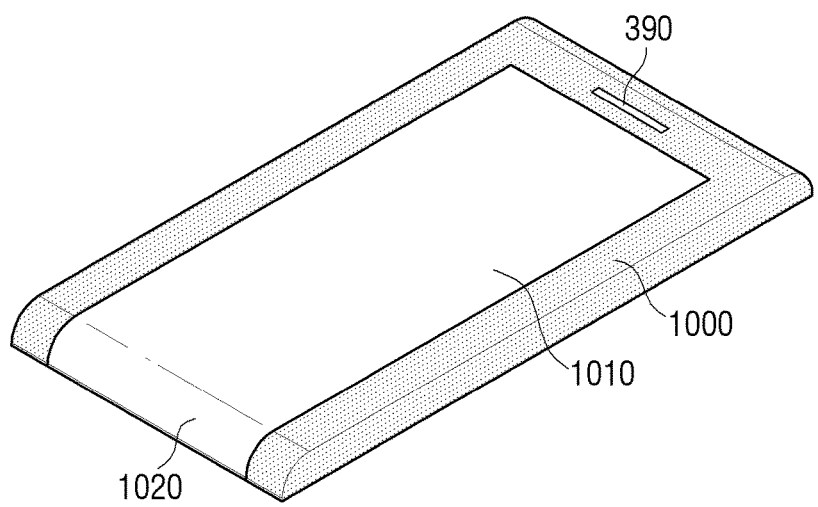

FIG. 10 illustrates the state in which the bent touch screen 100 is bent vertically. In detail, the bent touch screen 100 may be divided into the main region 1010 disposed on the front surface of the user terminal device 1000 and the sub-region 1020 disposed on a lower side surface thereof configured below the main region 1010. A speaker 390 may be disposed at an upper side of the main region 1010 opposite to the sub-region 1020.

Meanwhile, FIG. 1 illustrates the configuration of the user terminal device including the bent touch screen 100 and the controller 200, but according to the exemplary embodiment of the present disclosure, the user terminal device 1000 may further include various components. For example, the user terminal device 1000 may further include a memory in which various applications are stored. The controller 200 executes applications stored in the memory depending on the user gesture to display contents provided by the applications in at least one of the main region and the sub-region. In other words, the controller 200 may control the bent touch screen 100 to display the contents provided by the applications on at least one of the main region and the sub-region.

The contents may include a user interaction (UI) element. The UI element may include an element that may interact with a user to implement visual, auditory, and/or olfactory feedback, etc., according to a user input. The UI element may be represented in at least one of an image, a text, and a moving picture. Alternatively, even though the foregoing information is not displayed, if there is one region that may be fed back according to a user input, the region may be referred to as the UI element. The UI element may be, for example, an object performing a specific function or an icon corresponding to an application as application identification information.

Further, in the present disclosure, contents displayed on the main region are named main contents, and contents displayed on the sub-region are named sub-contents. The controller 200 may display the main contents and the sub-contents with different layouts. If the application is changed, the controller 200 may display the main contents and the sub-contents depending on the changed application on the main region and the sub-region, respectively.

In addition, the user terminal device 1000 may be configured in various forms.

Figure 11:
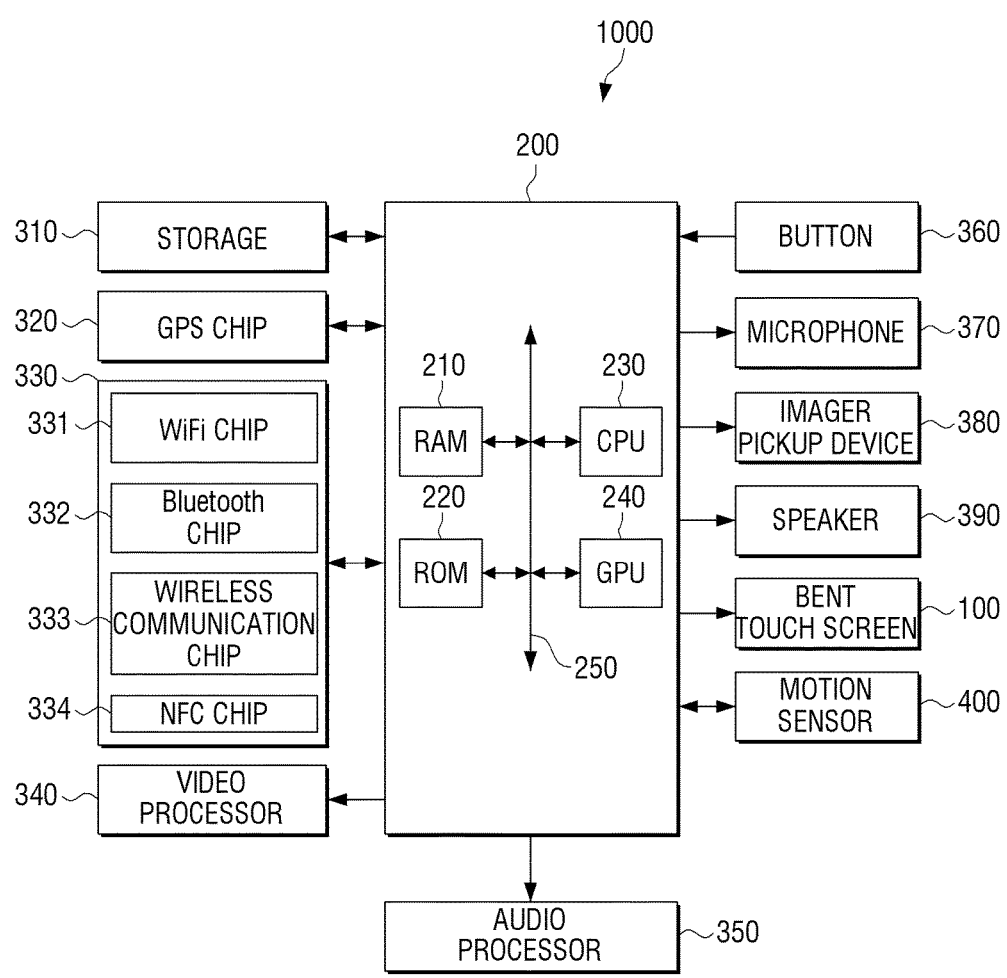
FIG. 11 is a block diagram illustrating a configuration of the user terminal device according to various exemplary embodiments of the present disclosure.

FIG. 11 is a block diagram illustrating an example of a detailed configuration of the user terminal device 1000 implemented as a portable phone. Referring to FIG. 11, the user terminal device 1000 includes the bent touch screen 100, the controller 200, the storage 310, a GPS chip 320, a communicator 330, a video processor 340, an audio processor 350, a button 360, a microphone 370, an imager 380, the speaker 390, and a motion sensor 400.

The bent touch screen 100 may be divided into the main region and at least one sub-region as described above. The bent touch screen 100 may be implemented as various forms of displays such as a liquid crystal display (LCD), an organic light emitting diode (OLED) display, and a plasma display panel (PDP). A driving circuit, which may be implemented in forms of an a-si TFT, a low temperature poly silicon (LTPS) TFT, an organic TFT (OTFT), etc., a backlight, or the like may, be included within the bent touch screen 100. Further, the bent touch screen 100 may be implemented as flexible display. Alternatively, the bent touch screen 100 may also be implemented as a general display that is not flexible. When the bent touch screen 100 is implemented as the general display, the bent touch screen 100 may be configured by connecting a plurality of displays to each other.

Meanwhile, the bent touch screen 100 may include a touch panel (not illustrated) and a pen recognition panel (not illustrated).

The touch panel may sense a gesture input of a user's finger and may output a touch event value corresponding to a sensed touch signal. The touch panel may be mounted under the main region and the sub-region of the bent touch screen 100, or may be mounted only under the sub-region of the bent touch screen 100. The touch panel may be one of a capacitive type touch panel and a resistive type touch panel. The capacitive type touch panel senses micro electricity generated by a user's body to calculate touch coordinates. The resistive type touch panel includes two electrode plates embedded in the touch panel and calculates touch coordinates by sensing a flow of current due to a contact between upper and lower plates at a touched point.

The pen recognition panel may sense a pen gesture input of a user depending on an operation of a user's touch pen (for example, stylus pen, digitizer pen, etc.) and output a pen proximity event value or a pen touch event value. The pen recognition panel may be mounted under the main region of the bent touch screen 100. The pen recognition panel may be implemented as, for example, an EMR scheme and may sense a touch or a proximity input depending on a change in strength of electric field due to the proximity or touch of the pen. In detail, the pen recognition panel may be configured to include an electromagnetic induction coil sensor (not illustrated) having a grid structure and an electromagnetic signal processor (not illustrated) sequentially providing alternating current signals having a predetermined frequency to each loop coil of the electromagnetic induction coil sensor. If a pen having a resonance circuit embedded therein is present around the loop coil of the pen recognition panel, a magnetic field transmitted from the corresponding loop coil generates a current based on mutual electromagnetic induction to the resonance circuit in the pen. Based on the current, the induction magnetic field is generated from the coil configuring the resonance circuit within the pen and the pen recognition panel may detect the induction magnetic field from the loop coil in the signal receiving state to sense an approach position or a touched position of the pen.

The storage 310 may store various programs and data required for the operation of the user terminal device 1000. In detail, programs, data, etc., for configuring various kinds of screens to be displayed on the main region and the sub-region may be stored in the storage 310. The controller 200 uses the programs and data stored in the storage 310 to display contents on the main region and the sub-region of the bent touch screen 100. In other words, the controller 200 may control the bent touch screen 100 to display contents. Further, if the user's touch is sensed on one of the main region, the sub-region, and/or a boundary region corresponding to a boundary therebetween, the controller 200 may perform a control operation corresponding to the touch.

The controller 200 includes an RAM 210, an ROM 220, a CPU 230, a graphic processing unit (GPU) 240, and a bus 250. The RAM 210, the ROM 220, the CPU 230, the GPU 240, etc., may be connected to each other through the bus 250.

The CPU 230 accesses the storage 310 to perform booting using an O/S stored in the storage 310. Further, the CPU 230 executes various operations using various programs, contents, data, and the like which are stored in the storage 310.

A set of commands for system booting is stored in the ROM 220. When a turn on command is input and thus power is input to the controller 200, the CPU 230 copies the O/S stored in the storage 310 to the RAM 210 according to the command stored in the ROM 220 and executes the O/S to boot the system. When the booting is completed, the CPU 230 copies the various programs stored in the storage 310 to the RAM 210 and executes the programs copied to the RAM 210 to execute various operations. When the booting of the user terminal device 1000 is completed, the GPU 240 displays a UI screen on an activated region of the main region and the sub-region. In detail, the GPU 240 may use an operator (not illustrated) and a renderer (not illustrated) to generate a screen including various objects such as an icon, an image, and a text. The operator operates attribute values, such as coordinate values, forms, sizes, and colors which will be displayed by each object according to a layout of the screen. The renderer generates a screen of various layouts including objects based on the attribute values which are operated by the operator. The screen generated from the renderer is provided to the bent touch screen 100 to be displayed on the main region and the sub-region, respectively.

The GPS chip 320 is a component for receiving a GPS signal from a global positioning system (GPS) satellite to calculate a current position of the user terminal device 1000. The controller 200 may use the GPS chip 320 to calculate a user position when a navigation program is used or the current position of the user is required.

The communicator 330 is configured to communicate with various types of external devices according to various types of communication schemes. The communicator 330 includes a WiFi chip 331, a Bluetooth chip 332, a wireless communication chip 333, a near field communication (NFC) chip 334, etc. The controller 200 uses the communicator 330 to perform communication with various kinds of external devices.

The WiFi chip 331 and the Bluetooth chip 332 each perform communications by a WI-FI® scheme and a BLU-ETOOTH® scheme. The WI-FI® chip 331 or the BLU-ETOOTH® chip 332 first transmits and receives various connection information such as an SSID and a session key and then performs a communication connection using the various connection information, thereby transmitting and receiving various kinds of information. The wireless communication chip 333 means a chip which performs communications depending on various communication standards such as IEEE, ZIGBEE®, 3rd generation (3G), 3rd generation partnership project (3GPP®), and long term evolution (LTE®). The NFC chip 334 means a chip which is operated by the NFC scheme using a band of 13.56 MHz among various RF-ID frequency bands such as 135 kHz, 13.56 MHz, 433 MHz, 860 to 960 MHz, and 2.45 GHz.

The video processor 340 is a component for processing video data included in contents received through the communicator 330 or contents stored in the storage 310. The video processor 340 may perform various image processings, such as decoding, scaling, noise filtering, frame rate conversion, and resolution conversion, on the video data.

The audio processor 350 is a component for processing audio data included in contents received through the communicator 330 or included in contents stored in the storage 310. The audio processor 350 may perform various processing functions on the audio data such as decoding, amplification, and noise filtering.

When a program for playing multimedia contents is executed, the controller 200 may drive the video processor 340 and the audio processor 350 to play the corresponding contents.

The bent touch screen 100 may display an image frame generated from the video processor 340 on at least one of the main region and the sub-region.

Further, the speaker 390 outputs the audio data generated from the audio processor 350.

The button 360 may be various types of buttons such as a mechanical button, a touch pad, and a wheel which are formed in any region such as a front portion, a side portion, a rear portion, etc., of an external surface of the main body of the user terminal device 1000.

The microphone 370 is a component for receiving a user voice or other sounds and converting the received user voice or other sounds into the audio data. The controller 200 may use the user voice input through the microphone 370 during a call process or convert the user voice into the audio data and store the converted audio data in the storage 310.

The imager 380 is a component for imaging a still image or a moving picture depending on the control of the user. The imager 380 may include a plurality of imaging components, for example, a front camera and a rear camera. As described above, the imager 380 may be used as a means for acquiring a user image in the exemplary embodiment for tracking the user's eyes.

When the imager 380 and the microphone 370 are provided, the controller 200 may also perform the control operation depending on the user voice input through the microphone 370 or the user motion recognized by the imager 380. That is, the user terminal device 1000 may be operated in a motion control mode or a voice control mode. When the user terminal device 1000 is operated in the motion control mode, the controller 200 activates the imager 380 to image the user and tracks the motion change of the user to perform the control operation corresponding thereto. When the user terminal device 1000 is operated in the voice control mode, the controller 200 may also be operated in the voice recognition mode, which analyzes the user voice input through the microphone 370 and performs the control operation depending on the analyzed user voice.

In the user terminal device 1000 supported by the motion control mode or the voice control mode, the voice recognition technology or the motion recognition technology may be used in various exemplary embodiments as described above. For example, if the user performs a motion like selecting the object displayed on the home screen or pronouncing a voice command corresponding to the object, the corresponding object is determined to be selected and the control operation matched with the object may be performed.

The motion sensor 400 is a component for sensing a motion of the main body of the user terminal device 1000. That is, the user terminal device 1000 may be rotated or be inclined in various directions. The motion sensor 400 may use at least one of various sensors such as a geomagnetic sensor, a gyro sensor, and/or an accelerator sensor to sense motion characteristics such as a rotation direction, an angle, and a gradient.

In addition, although not illustrated in FIG. 11, according to the exemplary embodiment of the present disclosure, the user terminal device 1000 may further include an USB port to which an USB connector may be connected, including various external input ports connected to various external terminals such as a headset, a mouse, and an LAN, a DMB chip receiving and processing a digital multimedia broadcasting (DMB) signal, various sensors, etc.

Figure 12:
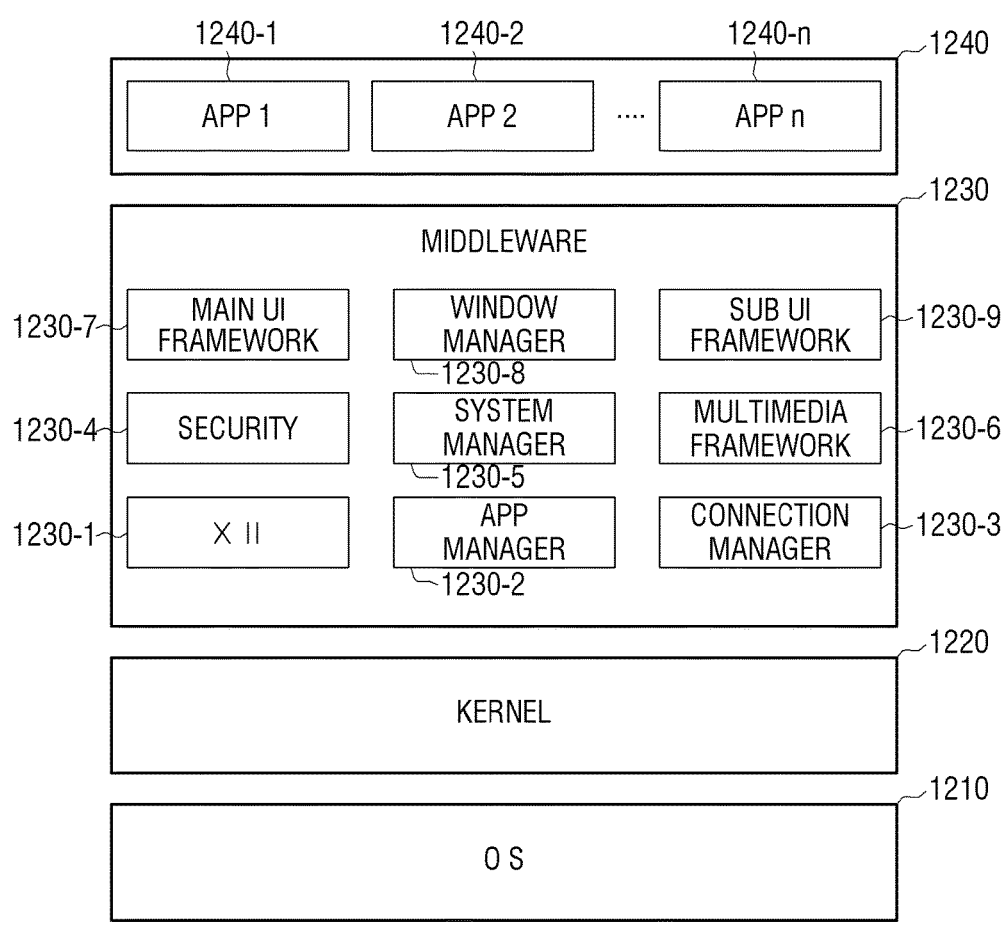
FIG. 12 is a diagram illustrating an example of a software configuration of the user terminal device.

Meanwhile, as described above, the storage 310 may store various programs. FIG. 12 is a diagram for describing a software structure stored in the storage 310 of the user terminal device 1000. As illustrated in FIG. 12, the storage 310 may store software including an operating system (OS) 1210, a kernel 1220, a middleware 1230, and an application module 1240.

The operating system (OS) 1210 serves to control and manage the general operations of hardware. That is, the OS 1210 is a hierarchy taking charge of basic functions of hardware management, memory, security, etc.

The kernel 1220 serves as a path through which various signals in addition to a touch signal, etc., sensed by the bent touch screen 100 are transferred to the middleware 1220.

The middleware 1220 includes various software modules controlling the operation of the user terminal device 1000. Referring to FIG. 12, the middleware 1230 includes an X11 module 1230-1, an APP manager 1230-2, a connection manager 1230-3, a security module 1230-4, a system manager 1230-5, a multimedia framework 1230-6, a UI framework 1230-7, a window manager 1230-8, and a handwriting recognition module 1230-9.

The X11 module 1230-1 is a module receiving various event signals from various kinds of hardware included in the user terminal device 1000. Here, the event may include an event that the user gesture is sensed, an event that a system alarm is generated, and an event that a specific program is executed or ends.

The APP manager 1230-2 is a module for managing an execution state of various applications in the application module 1240 installed in the storage 310. The APP manager 1230-2 calls and executes an application corresponding to the corresponding event when the X11 module 1230-1 senses an application execution event.

The connection manager 1230-3 is a module for supporting a wired or wireless network connection. The connection manager 1230-3 may include various detailed modules such as a DNET module and an UPnP module.

The security module 1230-4 is a module for supporting certification, request permission, secure storage of hardware, and the like.

The system manager 1230-5 monitors a state of each component within the user terminal device 1000 and provides the monitored results to other modules. For example, when a residual quantity of a battery is insufficient, when an error occurs, or when a communication connection state is broken, etc., the system manager 1230-5 may provide the monitored results to the main UI framework 1230-7 or the sub UI framework 1230-9 to output a notification message or a notification sound.

The multimedia framework 1230-6 is a module for playing multimedia contents stored in the user terminal device 1000 or provided from external sources. The multimedia framework 1230-6 may include a player module, a camcoder module, a sound processing module, and the like. Therefore, the multimedia framework 1230-6 may perform an operation of playing various multimedia contents to generate and play a screen and a sound, respectively.

The main UI framework 1230-7 is a module for providing various UI's to be displayed on the main region of the bent touch screen 100 and the sub UI framework 1230-9 is a module for providing various UIs to be displayed on the sub-region. The main UI framework 1230-7 and the sub UI framework 1230-9 may include an image compositor module for configuring various kinds of objects, a coordinate compositor for calculating coordinates at which an object is displayed, a rendering module for rendering the configured object to the calculated coordinates, a 2D/3D UI toolkit for providing a tool for configuring a 2D or 3D type of UI, etc.

The window manager 1230-8 may sense a touch event performed by a user's body or a pen, or other input events. When the events are sensed, the window manager 1230-8 transfers the event signal to the main UI framework 1230-7 or the sub UI framework 1230-9 to perform an operation corresponding to the event.

In addition, when the user touches and drags the screen, various program modules such as a handwriting module for drawing a line depending on the drag trajectory, an angle calculation module for calculating a pitch angle, a roll angle, a yaw angle, etc., based on a sensor value sensed by the motion sensor 400 may also be stored.

The application module 1240 includes applications 1240-1, 1240-2, to 1240-$n$ for supporting various functions. For example, the application module 1240 may include program modules for providing various services such as a navigation program module, a game module, an e-book module, a calendar module, and an alarm management module. The applications may be installed as a default, or may be arbitrarily installed and used by a user in use. When the object is selected, the CPU 230 may execute an application corresponding to an object selected by the application module 1240.

The software structure illustrated in FIG. 12 is only an example, and therefore, the exemplary embodiments are not limited thereto. Therefore, if necessary, some of the software structure may be omitted, changed, or added. For example, the storage 310 may additionally store various programs such as a sensing module for analyzing signals sensed by various sensors, messaging modules of a messenger program, a short message service (SMS) & multimedia message service (MMS) program, an e-mail program, a call info aggregator program module, a VoIP module, and a web browser module.

Meanwhile, as described above, the user terminal device 1000 may be implemented as various types of devices such as a cellular phone, a tablet PC, a laptop PC, a PDA, an MP3 player, a digital photo frame, TV, a PC, and a kiosk. Therefore, the configuration illustrated in FIGS. 11 and 12 may be variously changed depending on a kind of the user terminal device 1000.

As described above, the user terminal device 1000 may be implemented as various forms and configurations. The controller 200 of the user terminal device 1000 may support various user interactions according to the exemplary embodiment of the present disclosure.

Hereinafter, the user interaction method according to various exemplary embodiments of the present disclosure will be described in detail.

Figure 13:
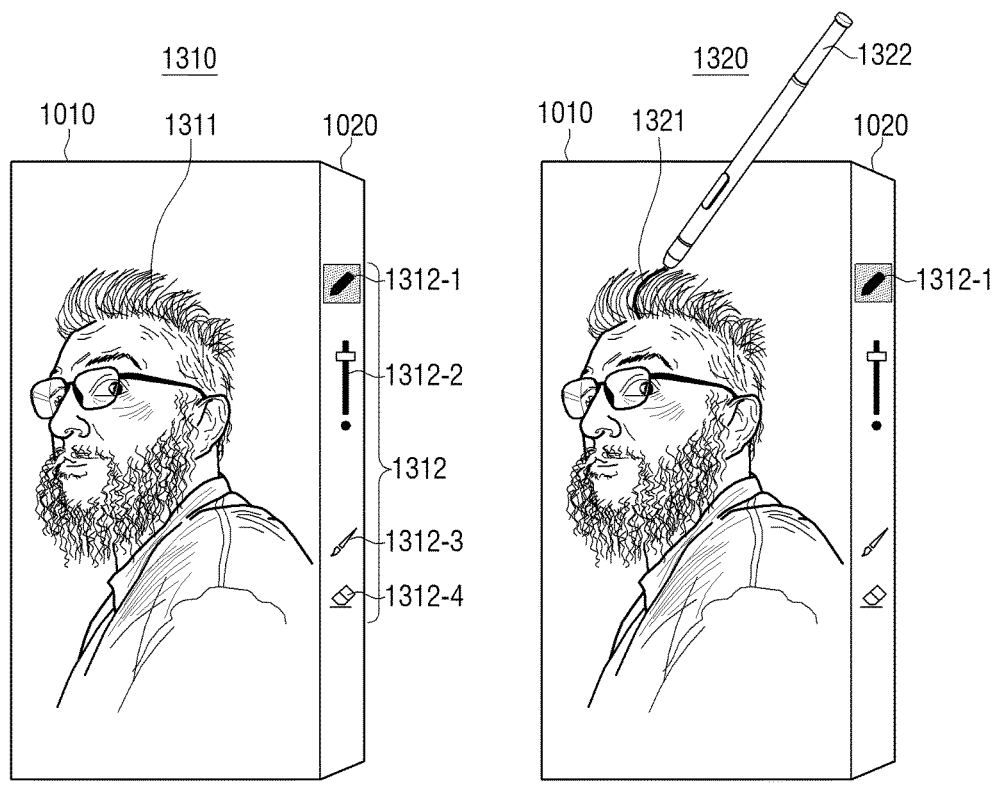
FIGS. 13, 14, 15A, 15B, 16, 17, 18, 19, 20, 21, 22, and 23 are diagrams illustrating a process of performing a user interaction in an image editing application according to an exemplary embodiment of the present disclosure.

FIG. 13 is a diagram illustrating a process of performing a user interaction in an image editing application according to an exemplary embodiment of the present disclosure.

Referring to 1310 of FIG. 13, the controller 200 may display an image 1311 to be edited or an empty screen on the main region 1010 and a menu 1312 for editing an image or drawings an image in the empty screen on the sub-region 1020. The menu 1312 may include at least one of a pencil object 1312-1 for selecting a pencil as a pen kind, a pen thickness object 1312-2 for selecting a thickness of pen, a brush object 1312-3 for selecting a brush as the pen kind, and an eraser object 1312-4 for erasing the image on the main region 1010. In this case, the pencil object 1312-1 on the sub-region 1020 may be the selected state. For example, the pencil object 1312-1 may be selected as a default when the image editing application is performed.

Referring to 1320 of FIG. 13, in the state in which the pencil object 1312-1 is selected, the bent touch screen 100 may receive and sense a pen gesture 1322 moved on the main region 1010. For example, the bent touch screen 100 may receive and sense a touch on one point on the main region 1010 and then is moved, and may receive and sense a pen gesture 1322 releasing the touch at the one point and other points.

The controller 200 may visually transform and display a region 1321 corresponding to the moved trajectory in response to the received pen gesture 1322. For example, the controller 200 may display a shape drawn with a pencil to appear in the region 1321 corresponding to the moved trajectory, as a result of applying the function corresponding to the pencil object 1312-1.

Figure 14:
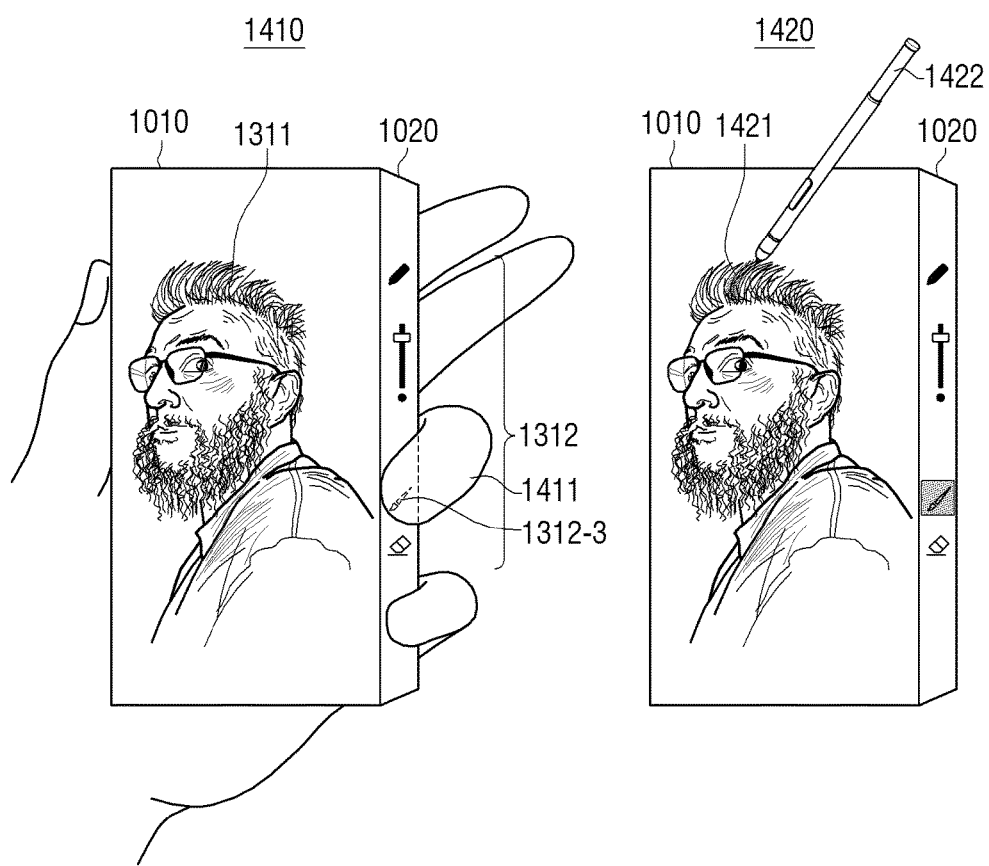

FIG. 14 is a diagram illustrating a process of performing a user interaction in an image editing application according to another exemplary embodiment of the present disclosure.

Referring to 1410 of FIG. 14, the controller 200 may display the image 1311 to be edited on the main region 1010 and the menu 1312 for editing an image on the sub-region 1020. The bent touch screen 100 may receive and sense a user's finger gesture 1411 (for example, finger touch gesture) selecting the brush object 1312-3 included in the menu 1312. In this case, the user's palm may contact the back surface of the user terminal device 1000 and the user terminal device 1000 may sense the user's palm performing the finger gesture on the back surface of the user terminal device 1000.

Referring to 1420 of FIG. 14, in the state in which the brush object 1312-3 is selected, the bent touch screen 100 may receive and sense a pen gesture 1422 moved on the main region 1010. The controller 200 may visually transform and display a region 1421 corresponding to the moved trajectory, in response to the received pen gesture 1422. For example, the controller 200 may display a shape drawn with a brush to appear in the region 1421 corresponding to the moved trajectory, as a result of applying the function corresponding to the brush object 1312-3.

Figure 15A:
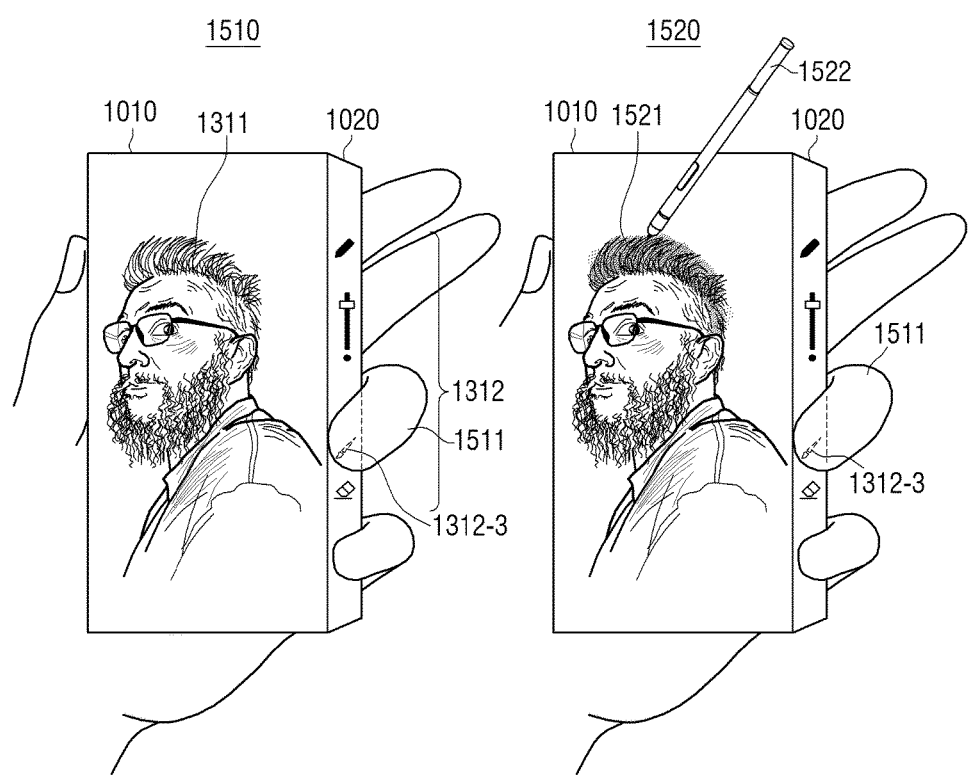
Figure 15B:
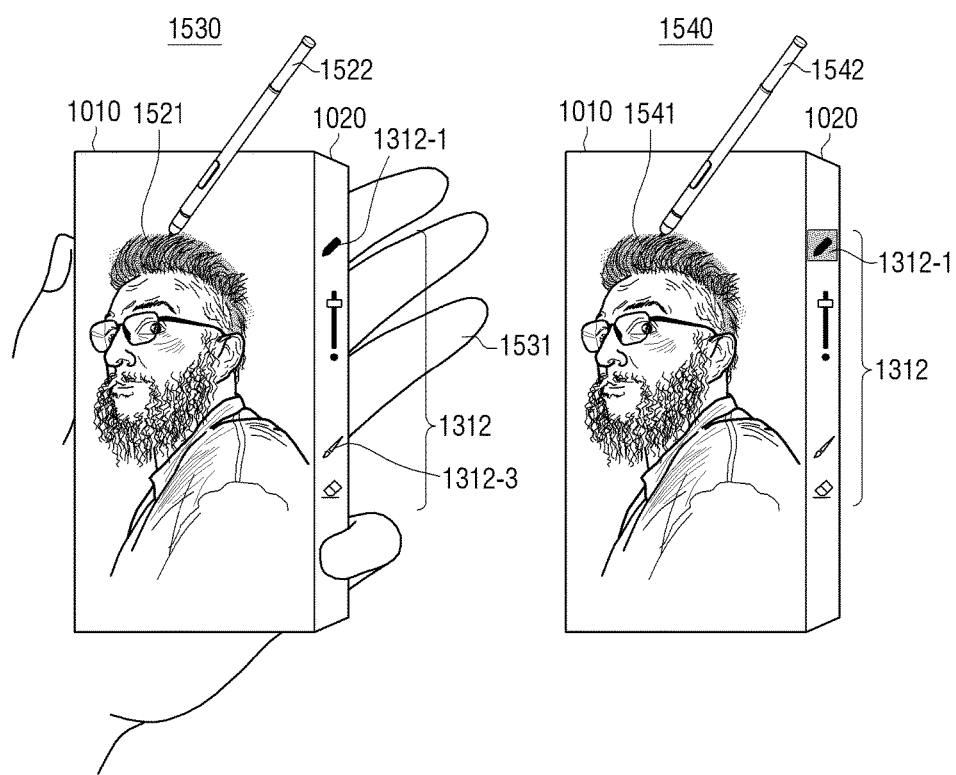

FIGS. 15A and 15B are diagrams illustrating a process of performing a user interaction in an image editing application according to another exemplary embodiment of the present disclosure.

Referring to 1510 of FIG. 15A, the controller 200 may display the image 1311 to be edited on the main region 1010 and the menu 1312 for editing an image on the sub-region 1020. The bent touch screen 100 may receive and sense a user's finger gesture 1511 (for example, finger touch gesture) selecting the brush object 1312-3 included in the menu 1312.

Referring to 1520 of FIG. 15A, in the state in which the brush object 1312-3 is selected, the bent touch screen 100 may receive and sense a pen gesture 1522 moved on the main region 1010. In this case, the user may continuously hold the finger gesture 1511 (for example, finger touch gesture) on the brush object 1312-3 included in the sub-region 1020. The controller 200 may visually transform and display a region 1521 corresponding to the moved trajectory in response to the received pen gesture 1522 in the state in which the finger touch gesture is held. For example, the controller 200 may display a shape drawn with a brush to appear in the region 1521 corresponding to the moved trajectory, as a result of applying the function corresponding to the brush object 1312-3.

Referring to 1530 of FIG. 15B, the bent touch screen 100 may receive and sense a finger gesture 1531 (for example, touch release gesture) releasing the finger gesture 1511 (for example, finger touch gesture) on the brush object 1312-3 included in the sub-region 1020.

Referring to 1540 of FIG. 15B, when the finger touch gesture is released, the controller 200 may automatically select the pencil object 1312-1 included in the menu 1312. In the state in which the finger touch gesture is released, the bent touch screen 100 may continuously receive a pen gesture 1542 moved on the main region 1010. The controller 200 may respond to the received pen gesture 1542 to display a shape drawn with a pencil to appear in the region 1541 corresponding to the moved trajectory, as a result of applying the function corresponding to the pencil object 1312-1.

Figure 16:
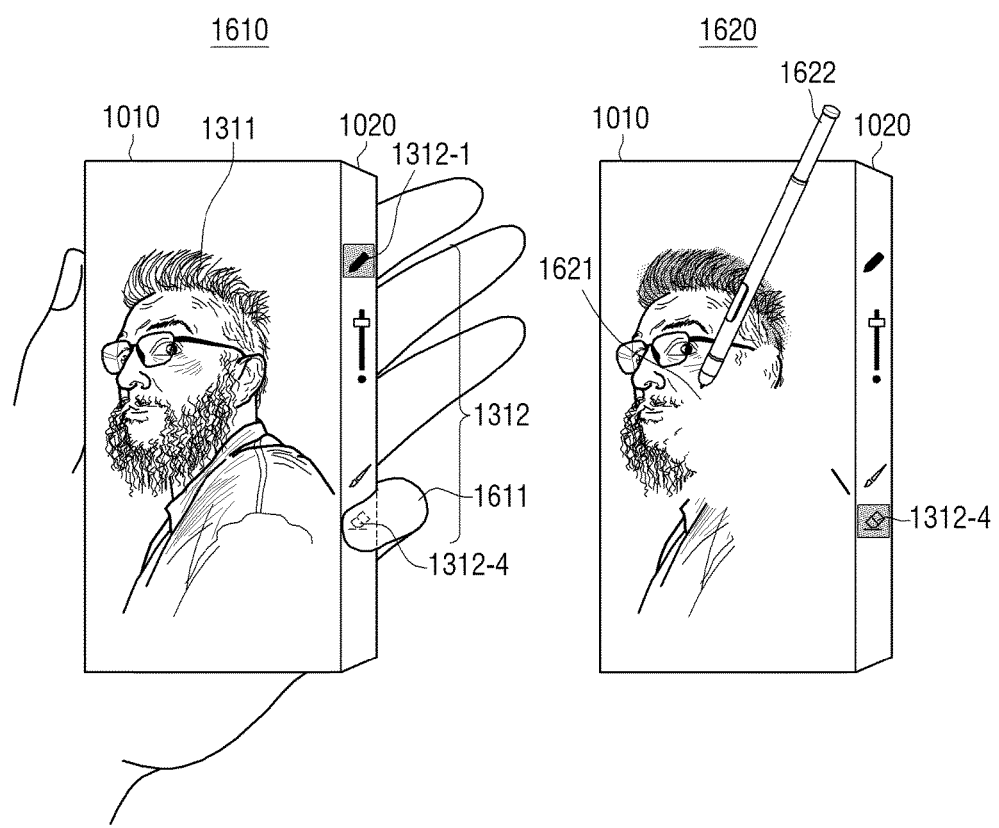

FIG. 16 is a diagram illustrating a process of performing a user interaction in an image editing application according to another exemplary embodiment of the present disclosure.

Referring to 1610 of FIG. 16, the controller 200 may display the image 1311 to be edited on the main region 1010 and the menu 1312 for editing an image on the sub-region 1020. The bent touch screen 100 may receive and sense a user's finger gesture 1611 (for example, finger touch gesture) selecting the eraser object 1312-4 included in the menu 1312.

Referring to 1620 of FIG. 16, in the state in which the eraser object 1312-4 is selected, the bent touch screen 100 may receive and sense a pen gesture 1622 moved on the main region 1010. The controller 200 may visually transform and display a region 1621 corresponding to the moved trajectory in response to the received pen gesture 1322. For example, the controller 200 may erase the image displayed on the region 1621 corresponding to the moved trajectory or transform and display the image to be the same as a color of a wallpaper, or a separate image different from the image, as a result of applying the function corresponding to the eraser object 1312-4.

Figure 17:
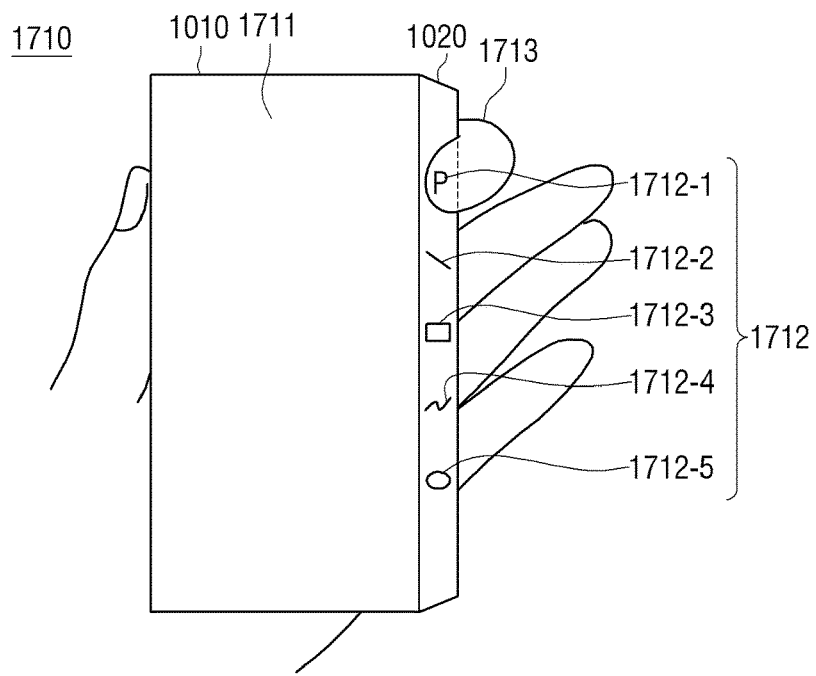
Figure 17:
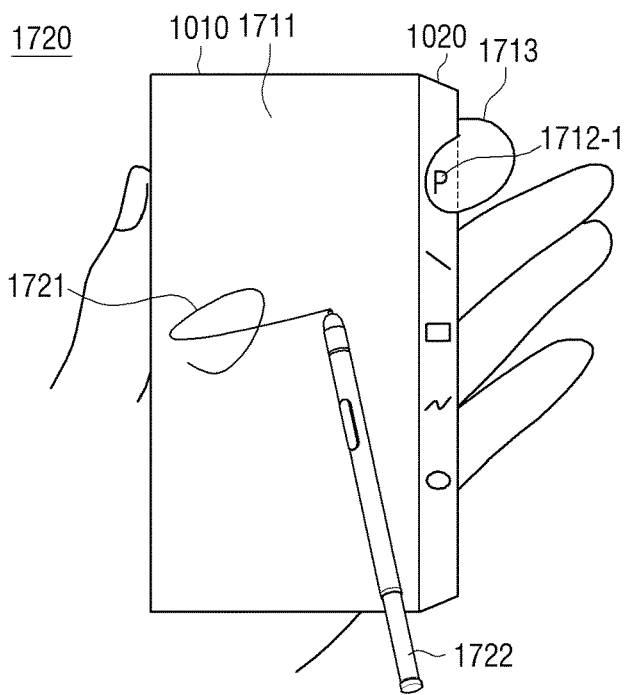

FIG. 17 is a diagram illustrating a process of performing a user interaction in an image editing application according to another exemplary embodiment of the present disclosure.

Referring to 1710 of FIG. 17, the controller 200 may display an empty screen 1711 without an image on the main region 100 and a menu 1712 for drawing an image on the sub-region 1020. The menu 1712 may include at least one of a practice object 1712-1 for drawing a virtual image, a straight object 1712-2 for drawing a straight line, a quadrangle object 1712-3 for drawing a quadrangle, a curve object 1713-4 for drawing a curved line, and a circle object 1713-5 for drawing a circle. The user terminal device 1000 may receive and sense a user's finger gesture 1713 (for example, finger touch gesture) selecting the practice object 1712-1 included in the menu 1712.

Referring to 1720 of FIG. 17, in the state in which the practice object 1712-1 is selected, the bent touch screen 100 may receive and sense a pen gesture 1722 moved on the main region 1010. In this case, the user may continuously hold the finger gesture 1713 (for example, finger touch gesture) on the practice object 1712-1 included in the sub-region 1020. In the state in which the user's finger touch gesture 1713 is held, the bent touch screen 100 may receive and sense a gesture 1722 moved on the main region 1010. The controller 200 may visually transform and display a region 1721 corresponding to the moved trajectory in response to the received pen gesture 1722. For example, the controller 200 may display a dotted line or a line having low contrast in the region 1721 corresponding to the moved trajectory, as a result of applying the function corresponding to the practice object 1712-1.

When the user's finger gesture (for example, touch release gesture) releasing the practice object 1712-1 is input, the controller 200 may return the region 1721 corresponding to the moved trajectory visually transformed and displayed to the form before the transformation. For example, the line represented by the dotted line or the color having low contrast applied to the region 1721 corresponding to the moved trajectory may be deleted on the main region 1010.

Figure 18:
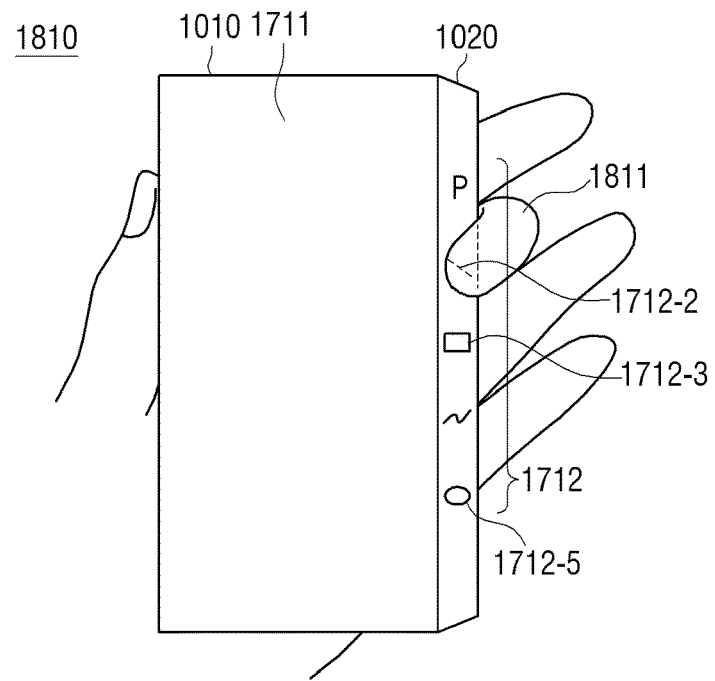
Figure 18:
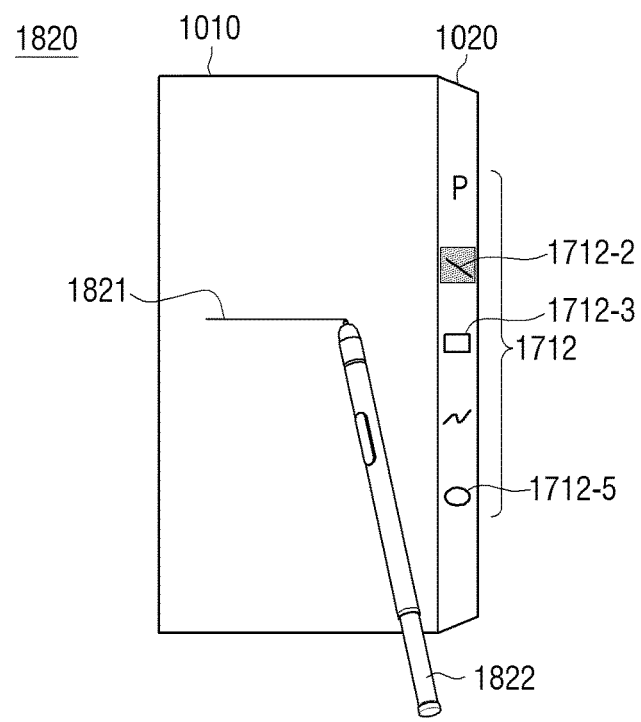

FIG. 18 is a diagram illustrating a process of performing a user interaction in an image editing application according to another exemplary embodiment of the present disclosure.

Referring to 1810 of FIG. 18, the controller 200 may display the empty screen 1711 without an image on the main region 1010 and the menu 1712 for editing an image on the sub-region 1020. The bent touch screen 100 may receive and sense a user's finger gesture 1811 (for example, finger touch gesture) selecting the straight object 1712-2 included in the menu 1712.

Referring to 1820 of FIG. 18, in the state in which the straight object 1712-2 is selected, the bent touch screen 100 may receive and sense a pen gesture 1822 moved on the main region 1010. The controller 200 may visually transform and display a region 1821 corresponding to the moved trajectory in response to the received pen gesture 1822. For example, the controller 200 may display the region 1821 corresponding to the moved trajectory to appear as a straight line, as a result of applying the function corresponding to the straight object 1712-2. In other words, when the quadrangle object 1712-3 or the circle object 1712-5 on the sub-region 1020 is selected using the finger gesture by a similar manner corresponding to the moved trajectory by the pen gesture 1822, the controller 200 may visually transform and display the region corresponding to the moved trajectory by the pen gesture (not illustrated) on the main region 1010. For example, when the quadrangle object 1712-3 is selected, the controller 200 may recognize a starting point and an ending point of the region (not illustrated) corresponding to the moved trajectory and display a quadrangle of which each of the starting point and the ending point becomes a vertex. Further, when the circle object 1712-5 is selected, the controller 200 may recognize the starting point and the ending point of the region (not illustrated) corresponding to the moved trajectory and display a circle having the starting point as an original point and a distance between the starting point and the ending point as a radius to appear on the main region 1010.

Figure 19:
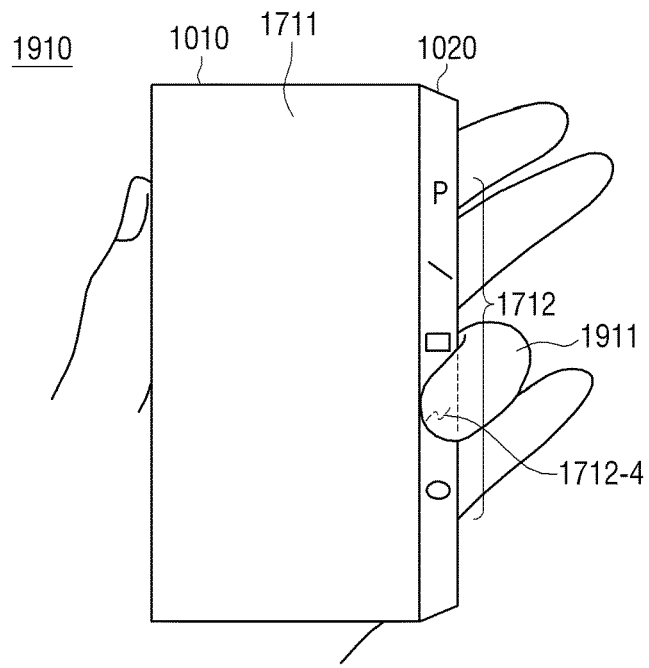
Figure 19:
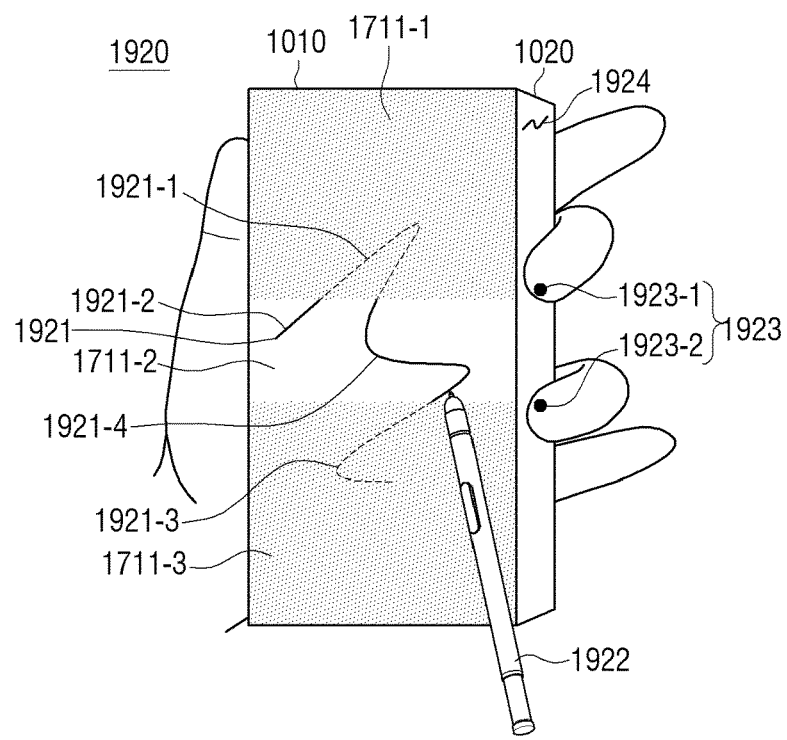

FIG. 19 is a diagram illustrating a process of performing a user interaction in an image editing application according to another exemplary embodiment of the present disclosure.

Referring to 1910 of FIG. 19, the controller 200 may display the empty screen 1711 without an image on the main region 1010 and the menu 1712 for editing an image on the sub-region 1020. The bent touch screen 100 may receive and sense a user's finger gesture 1911 (for example, finger touch gesture) selecting a curve object 1712-4 included in the menu 1712.

Referring to 1920 of FIG. 19, in the state in which the curve object 1712-4 is selected, the bent touch screen 100 may receive and sense a pen gesture 1922 moved on the main region 1010. Further, the bent touch screen 100 may receive and sense a multi-finger gesture 1923 touching two points 1923-1 and 1923-2 on the sub-region 1020. The controller 200 may apply a function corresponding to the curve object 1712-4 to a region 1921 corresponding to the moved trajectory associated with positions of the two points 1923-1 and 1923-2 in response to the pen gesture 1922 and the multi-finger gesture 1923. For example, the controller 200 may not display a curved line in regions 1921-1 and 1921-3 corresponding to the moved trajectory included in the regions 1711-1 and 1711-3, but may display the curved line to appear in regions 1921-2 and 1921-4 corresponding to the moved trajectory included in the region 1711-2, as a result of applying the function corresponding to the curve object 1712-4. Referring to 1920 of FIG. 19, an icon 1924 representing that the function corresponding to the curve object 1712-4 is executing may be displayed on the sub-region 1020.

Figure 20:
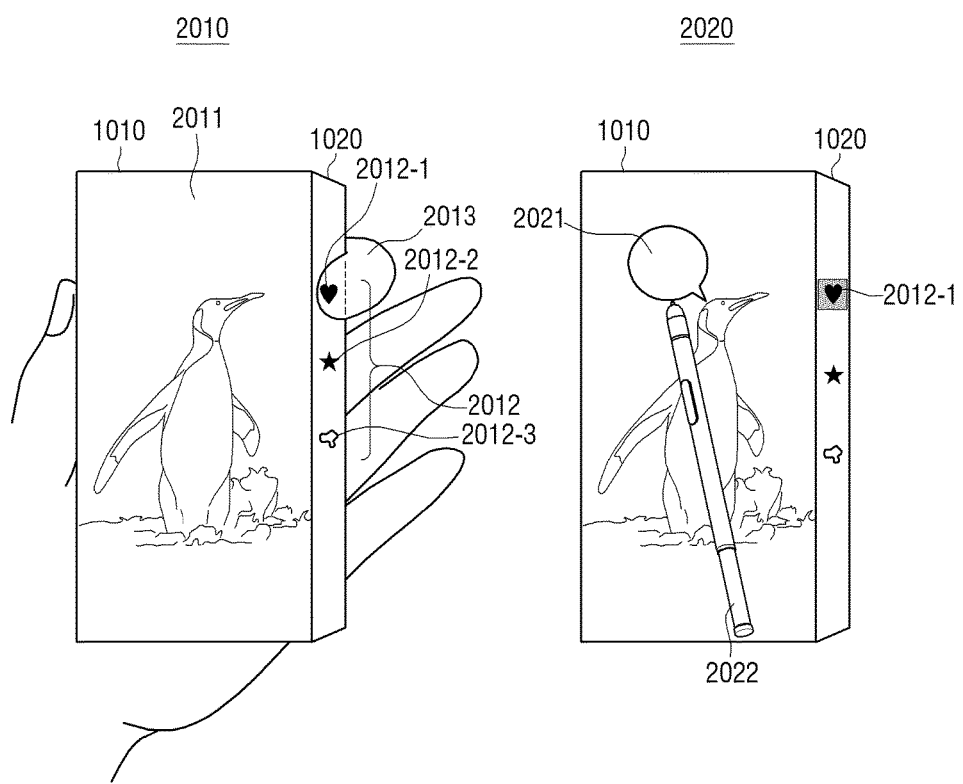

FIG. 20 is a diagram illustrating a process of performing a user interaction in an image editing application according to another exemplary embodiment of the present disclosure.

Referring to 2010 of FIG. 20, the controller 200 may display an image 2011 photographed by using a camera application on the main region 1010 and a menu 2012 for editing an image 2011 on the sub-region 1020. The menu 2012 may include at least one of a speech balloon object 2012-1 for inserting a speech balloon, an effect object 2012-2 for applying an effect to the selected region, or a cutting object 2012-3 for cutting the selected region and storing the cut region as a photograph. The bent touch screen 100 may receive and sense a user's finger gesture 2013 (for example, finger touch gesture) selecting the speech balloon object 2012-1.

Referring to 2020 of FIG. 20, in the state in which the speech balloon object 2012-1 is selected, the bent touch screen 100 may receive and sense a pen gesture 2022 selecting one point on the main region 1010. The controller 200 may visually transform and display a region 2021 corresponding to one point in response to the received pen gesture 2022. For example, the controller 200 may display the speech balloon to appear in the region 2021 corresponding to one point, as a result of applying the function corresponding to the speech balloon object 2021.

Figure 21:
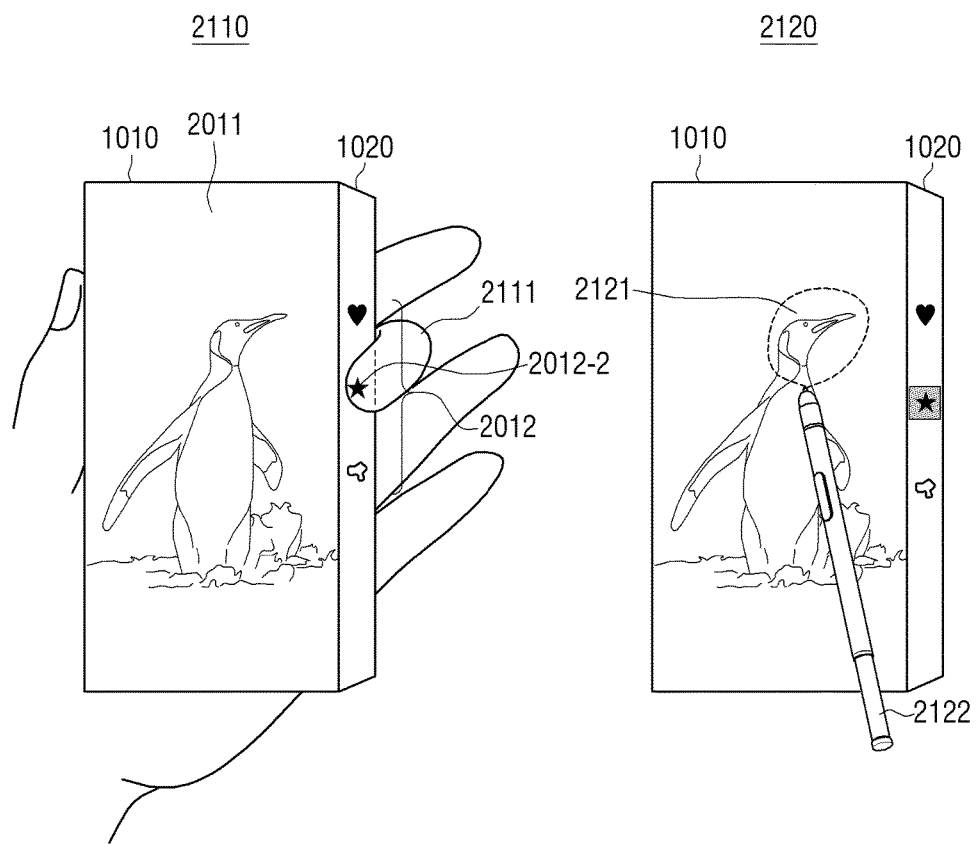

FIG. 21 is a diagram illustrating a process of performing a user interaction in an image editing application according to another exemplary embodiment of the present disclosure.

Referring to 2110 of FIG. 21, the controller 200 may display the image 2011 photographed by using the camera application on the main region 1010 and the menu 2012 for editing an image 2011 on the sub-region 1020. The bent touch screen 100 may receive and sense a user's finger gesture 2111 (for example, finger touch gesture) selecting the effect object 2012-2 included in the menu 2012.

Referring to 2120 of FIG. 21, in the state in which the effect object 2012-2 is selected, the bent touch screen 100 may receive and sense a pen gesture 2122 moved on the main region 1010. The controller 200 may visually transform and display a region 2121 corresponding to the moved trajectory in response to the received pen gesture 2122. For example, the controller 200 may apply a preset effect to the region 2121 corresponding to the moved trajectory, as a result of applying the function corresponding to the effect object 2012-2. For example, the controller 200 may apply a filter including one of a whitish effect, a sepia effect, a black and white effect, and a cartoon effect to the region 2121 corresponding to the moved trajectory.

Figure 22:
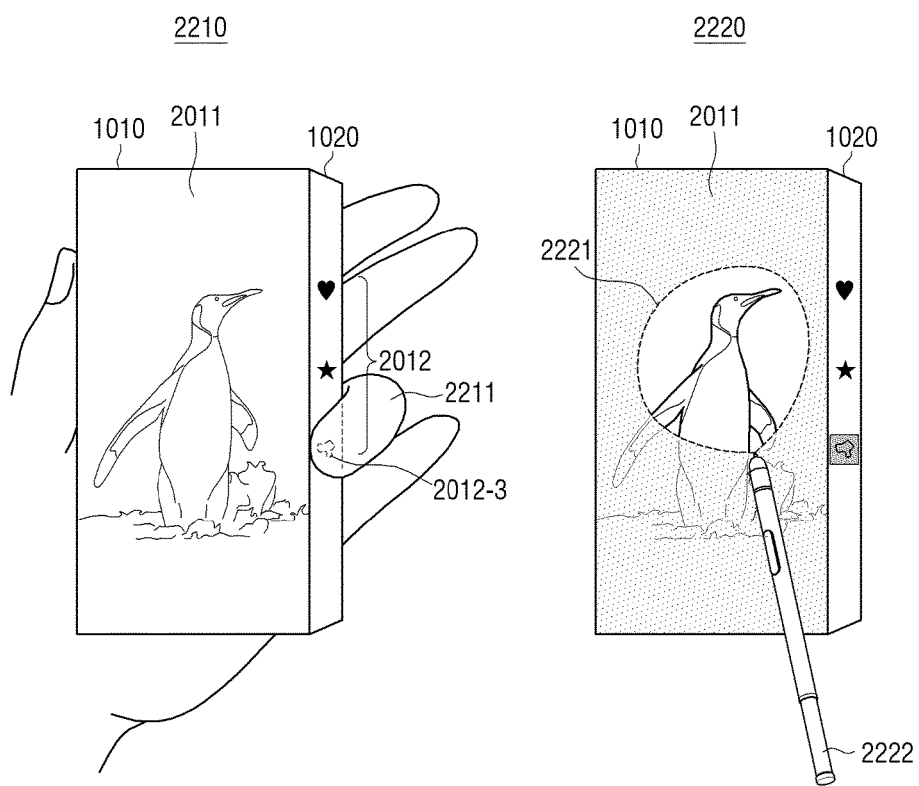

FIG. 22 is a diagram illustrating a process of performing a user interaction in an image editing application according to another exemplary embodiment of the present disclosure.

Referring to 2210 of FIG. 22, the controller 200 may display an image 2011 photographed by using a camera application on the main region 1010 and a menu 2012 for editing an image 2011 on the sub-region 1020. The bent touch screen 100 may receive and sense a user's finger gesture 2211 (for example, finger touch gesture) selecting the cutting object 2012-3 included in the menu 2012.

Referring to 2220 of FIG. 22, in the state in which the cutting object 2012-3 is selected, the bent touch screen 100 may receive and sense a pen gesture 2222 moved on the main region 1010. The controller 200 may visually transform and display a region 2221 corresponding to the moved trajectory in response to the received pen gesture 2222. For example, the controller 200 may display a dotted line or a highlighted line to appear in or around the border of the region 2221 corresponding to the moved trajectory, as a result of applying the function corresponding to the cutting object 2012-3. Further, the controller 200 may cut an inside region of the displayed line. The region cut by the controller 200 may be stored in a clip board or may be stored in the storage 310 as a separate file.

Figure 23:
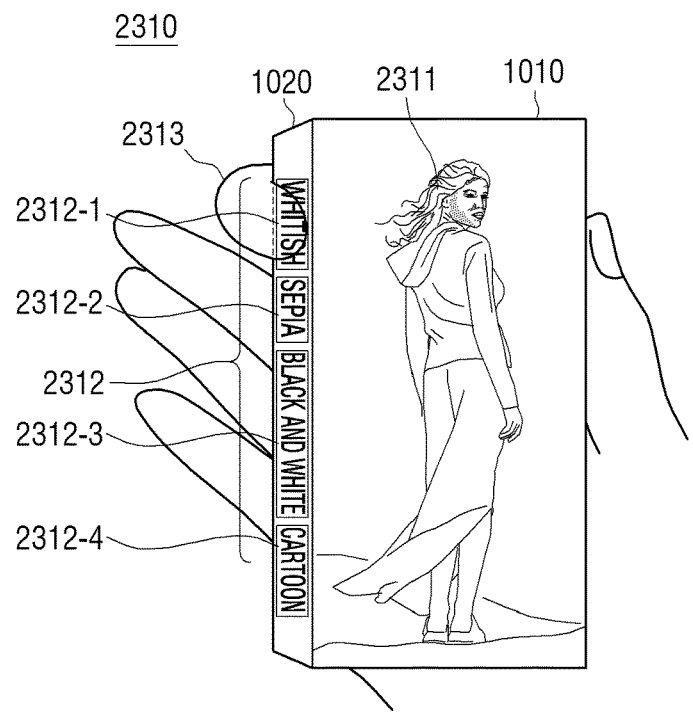
Figure 23:
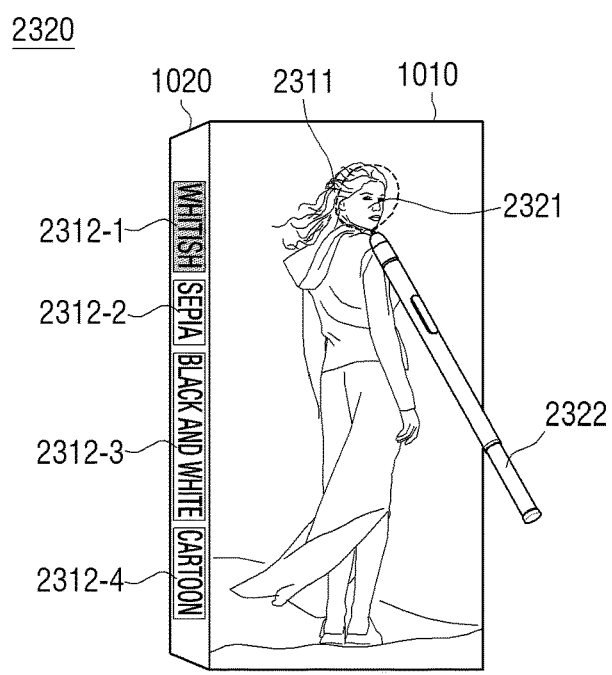

FIG. 23 is a diagram illustrating a process of performing a user interaction in an image editing application according to another exemplary embodiment of the present disclosure.

Referring to 2310 of FIG. 23, the controller 200 may display an image 2311 to be edited on the main region 1010 and a menu 2312 for editing an image on the sub-region 1020. The menu 2312 is an object for applying a filter effect to the image 2311 and may include at least one of a whitish object 2312-1 applying a whitish filter, a sepia object 2312-2 applying a sepia filter, a black and white object 2312-3 applying a black and white filter, and a cartoon object 2312-4 applying a cartoon filter. The bent touch screen 100 may receive and sense a user's finger gesture 2313 (for example, finger touch gesture) selecting the whitish object 2312-1 included in the menu 2312.

Referring to 2320 of FIG. 23, in the state in which the whitish object 2312-1 is selected, the bent touch screen 100 may receive and sense a pen gesture 2322 moved on the main region 1010. The controller 200 may visually transform and display a region 2321 corresponding to the moved trajectory in response to the received pen gesture 2322. For example, the controller 200 may display the region 2321 corresponding to the moved trajectory to apply the whitish effect to the region 2321, so as to increase a contrast of the region 2321 and to display the region 2321 more brightly and smoothly as compared to other regions, as a result of applying the function corresponding to the whitish object 2312-1.

In a similar manner, when the sepia object 2312-2, the black and white object 2312-3, or the cartoon object 2312-4 on the sub-region 1020 is selected using the finger gesture, the controller 200 may visually transform and display the region (not illustrated) corresponding to the moved trajectory by the pen gesture (not illustrated) on the main region 1010. For example, when the sepia object 2312-2 is selected, the controller 200 may display the region (not illustrated) corresponding to the moved trajectory to apply the sepia effect to the region. Further, when the black and white object 2312-3 is selected, the controller 200 may display the region (not illustrated) corresponding to the moved trajectory in shades of black and white to apply the black and white effect to the region. Further, when the cartoon object 2312-4 is selected, the controller 200 may display the region (not illustrated) corresponding to the moved trajectory to apply the cartoon effect like a cartoon image to the region.

Figure 24:
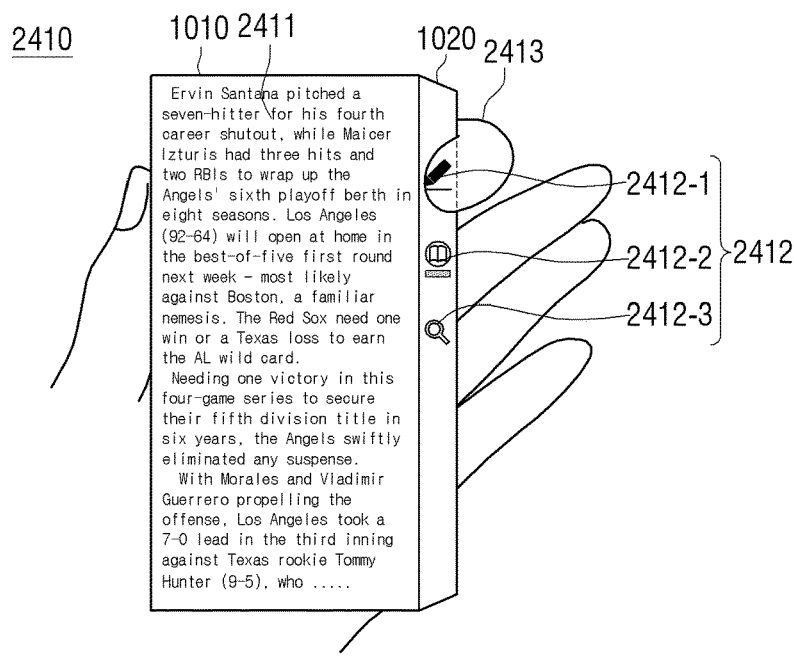
FIGS. 24, 25, and 26 are diagrams illustrating a process of performing a user interaction in an e-book application according to an exemplary embodiment of the present disclosure.
Figure 24:
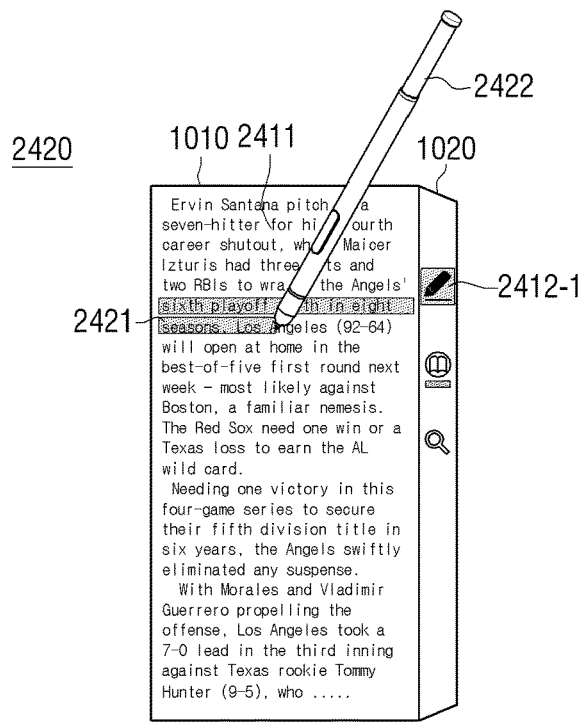

FIG. 24 is a diagram illustrating a process of performing a user interaction in an e-book application according to an exemplary embodiment of the present disclosure.

Referring to 2410 of FIG. 24, the controller 200 may display a page 2411 including a text on the main region 1010 and a menu 2412 for managing the page 2411 on the sub-region 1020. The menu 1312 may include at least one of a highlight object 2412-1 highlighting a specific text within the page 2411, a search object 2412-2 searching for and displaying meanings of words within the page 2411, and a magnifying glass object 2412-3 magnifying a specific region within the page 2411. The bent touch screen 100 may receive and sense a user's finger gesture 2413 (for example, finger touch gesture) selecting the highlight object 2412-1 included in the menu 2412.

Referring to 2420 of FIG. 24, in the state in which the highlight object 2412-1 is selected, the bent touch screen 100 may receive and sense a pen gesture 2422 moved on the main region 1010. The controller 200 may visually transform and display a region 2421 corresponding to the moved trajectory in response to the received pen gesture 2422. In this case, the region 2421 corresponding to the moved trajectory may be a region of a text located around the moved trajectory or a region around the text. The controller 200 may highlight and display the region 2421 corresponding to the moved trajectory to be visually differentiated from other regions, as a result of applying a function corresponding to the highlight object 2412-1. For example, the controller 200 may display the text or a color around the text by applying an animation effect of making the text or the color around the text different from other texts or colors around other texts, or by dynamically turning on/off the text or the color around the text, etc.

Figure 25:
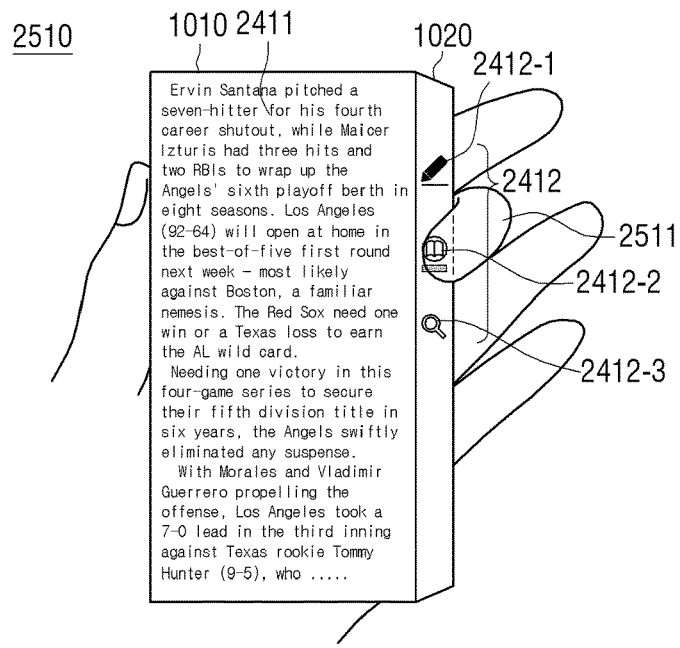
Figure 25:
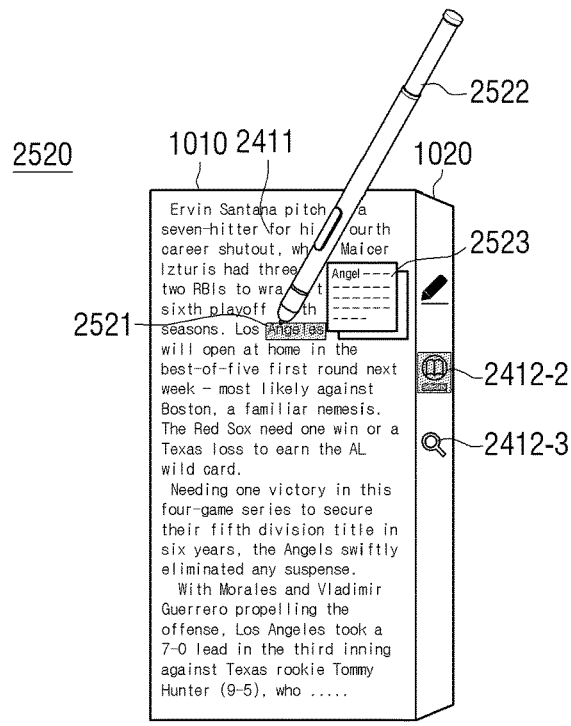

FIG. 25 is a diagram illustrating a process of performing a user interaction in an e-book application according to another exemplary embodiment of the present disclosure.

Referring to 2510 of FIG. 25, the controller 200 may display the page 2411 including the text on the main region 1010 and the menu 2412 for managing the page 2411 on the sub-region 1020. The bent touch screen 100 may receive and sense a user's finger gesture 2511 (for example, finger touch gesture) selecting the search object 2412-2 included in the menu 2412.

Referring to 2520 of FIG. 25, in the state in which the search object 2412-2 is selected, the bent touch screen 100 may receive and sense a pen gesture 2522 moved on the main region 1010. The controller 200 may visually transform and display a region 2521 corresponding to the moved trajectory in response to the received pen gesture 2522. Further, the meanings of words included in the region 2521 corresponding to the moved trajectory may be searched and displayed on the screen. For example, the controller 200 may highlight and display the region 2521 corresponding to the moved trajectory to be visually differentiated from other regions, as a result of applying a function corresponding to the search object 2412-1. Further, the controller 200 may display the meanings of the searched words to be included in a memo pad 2523 around the region 2521 corresponding to the moved trajectory. However, the exemplary embodiments are not limited thereto. For instance, the controller may display spelling suggestions and/or grammar suggestions, or other like, with respect to the words around the region 2521 corresponding to the moved trajectory.

In a similar manner, when the magnifying glass object 2412-3 on the sub-region 1020 is selected using the finger gesture, the controller 200 may visually transform and display the inside region of the moved trajectory by the pen gesture (not illustrated) on the main region 1010. For example, the controller 200 may magnify and display the region (not illustrated) corresponding to the moved trajectory on the main region 1020.

Figure 26:
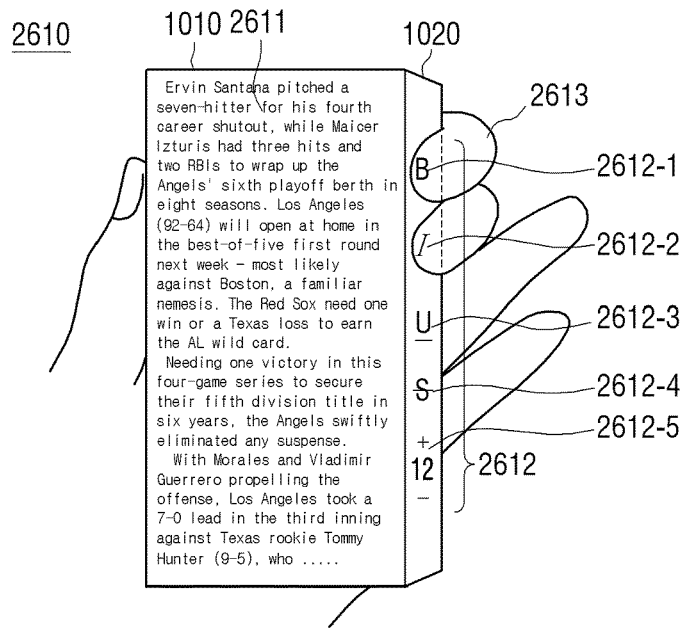
Figure 26:
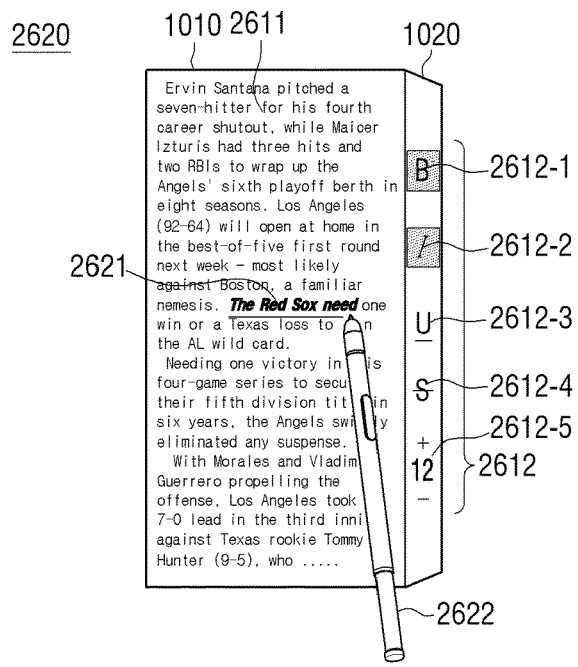

FIG. 26 is a diagram illustrating a process of performing a user interaction in an e-book application according to another exemplary embodiment of the present disclosure.

Referring to 2610 of FIG. 26, the controller 200 may display a page 2611 including the text on the main region 1010 and a menu 2612 for managing the page 2611 on the sub-region 1020. The menu 2612 may include at least one of a bold type object 2612-1 for thickly displaying a font of the text within the page 2611, an italic type object 2612-2 for displaying a font of the text in a slope type, an underbar object 2612-3 for underlining the font of the text, a cancellation line object 2612-4 for drawing a cancellation line on the font of the text, and a font size change object 2624-5 for changing a size of the font of the text. The bent touch screen 100 may receive and sense a user's finger gesture 2613 selecting the bold type object 2612-1 and the italic type object 2612-2 included in the menu 2612. In this case, the user's finger gesture 2613 may also be a multi-finger gesture approximately simultaneously selecting the bold type object 2612-1 and the italic type object 2612-2. The user's finger gesture 2613 of the multi-finger gestures may first select one of the bold type object 2612-1 and the italic type object 2612-2 and then may also be a combination of the sequential finger touch gestures selecting the other of the bold type object 2612-1 and the italic type object 2612-2.

Referring to 2620 of FIG. 26, in the state in which the bold type object 2612-1 and the italic type object 2612-2 are selected, the bent touch screen 100 may receive and sense a pen gesture 2622 moved on the main region 1010. The controller 200 may visually transform and display a region 2621 corresponding to the moved trajectory in response to the received pen gesture 2422. For example, the controller 200 may thickly display the font of the text included in the region 2621 corresponding to the moved trajectory in an italicized or sloped typeface, as a result of applying a function corresponding to the bold type object 2612-1 and the italic type object 2612-2.

In a similar manner, when the underbar object 2612-3, the cancellation line object 2612-4, or the font size change object 2614-5 on the sub-region 1020 is selected using the finger gesture, the controller 200 may visually transform and display the region corresponding to the moved trajectory by the pen gesture (not illustrated) on the main region 1010. For example, when the underbar object 2612-3 is selected, the controller 200 may display the font of the text included in the region (not illustrated) corresponding to the moved trajectory to be underlined. Further, when the cancellation line object 2612-4 is selected, the controller 200 may display the font of the text included in the region (not illustrated) corresponding to the moved trajectory so that the cancellation line is drawn on the font of the text. Further, when the font size change object 2612-5 is selected, the controller 200 may display the text included in the region (not illustrated) corresponding to the moved trajectory by reducing or increasing the size of the text.

Figure 27:
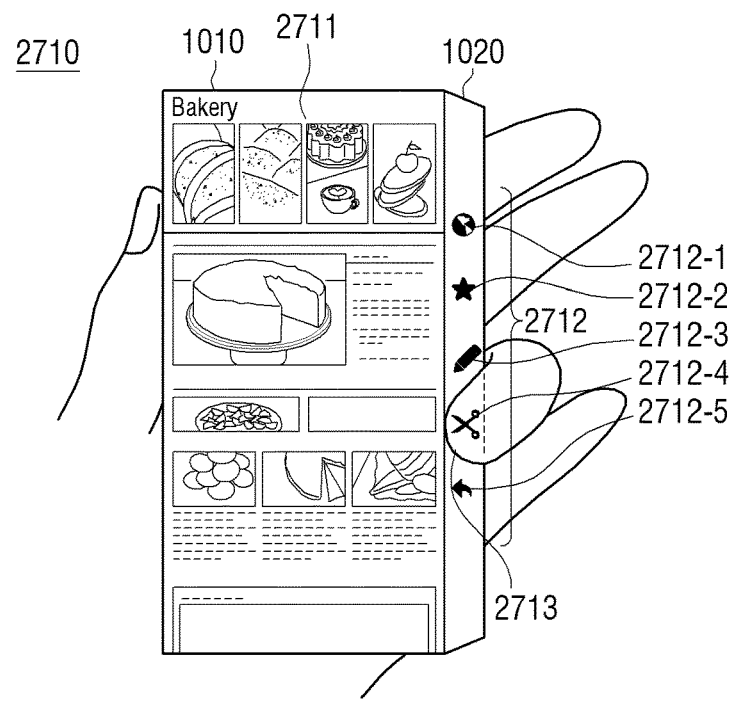
FIGS. 27 and 28 are diagrams illustrating a process of performing a user interaction in a web application according to an exemplary embodiment of the present disclosure.
Figure 27:
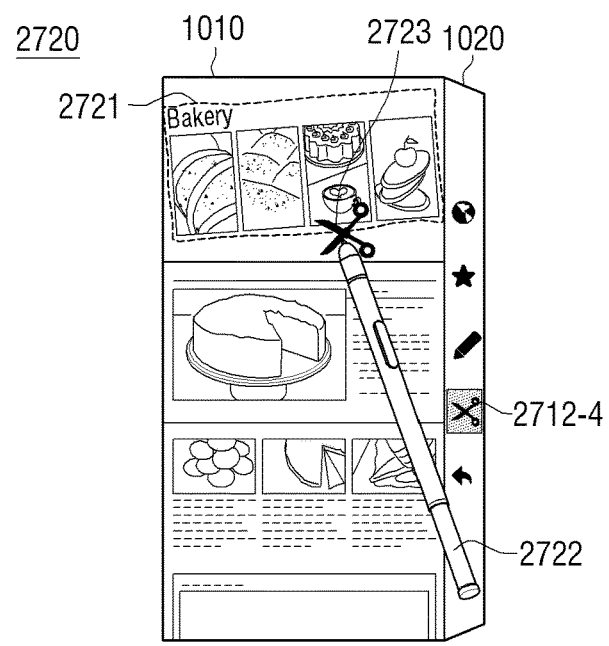

FIG. 27 is a diagram illustrating a process of performing a user interaction in a web application according to another exemplary embodiment of the present disclosure.

Referring to 2710 of FIG. 27, the controller 200 may display a web page 2711 including contents on the main region 1010 and a menu 2712 for performing a web page managing function on the web page 2711 on the sub-region 1020. The menu 2712 may display at least one of an Internet object 2712-1 for moving to other web pages or a home web page, a bookmark object 2712-2 for displaying a web page list registered as a bookmark, a drawing object 2712-3 for drawing a line or a diagram on the web page 2711, a cutting object 2712-4 for cutting a portion of the web page, and a cancellation object 2712-5 for returning to a screen before the edition. The bent touch screen 100 may receive and sense a user's finger gesture 2713 (for example, finger touch gesture) selecting the cutting object 2712-4 included in the menu 2712.

Referring to 2720 of FIG. 27, in the state in which the cutting object 2712-4 is selected, the bent touch screen 100 may receive and sense a pen gesture 2722 moved on the main region 1010. The controller 200 may visually transform and display a region 2721 corresponding to the moved trajectory in response to the received pen gesture 2722. For example, the controller 200 may display a dotted line or a highlighted line to appear in or around the region 2721 corresponding to the moved trajectory. Further, an icon (for example, scissors icon) 2723 representing that the cutting object 2712-4 is being selected may be displayed at a position where the moving pen gesture 2722 is located or around the point where the moving pen gesture 2722 is located. The controller 200 may cut an inside region of the displayed line. The cut region cut by the controller 200 may be transformed and moved from an original position or be displayed on the screen by inclining an angle thereof. The cut region may be stored in a clip board or may be stored in the storage 310 as a separate file.

Figure 28:
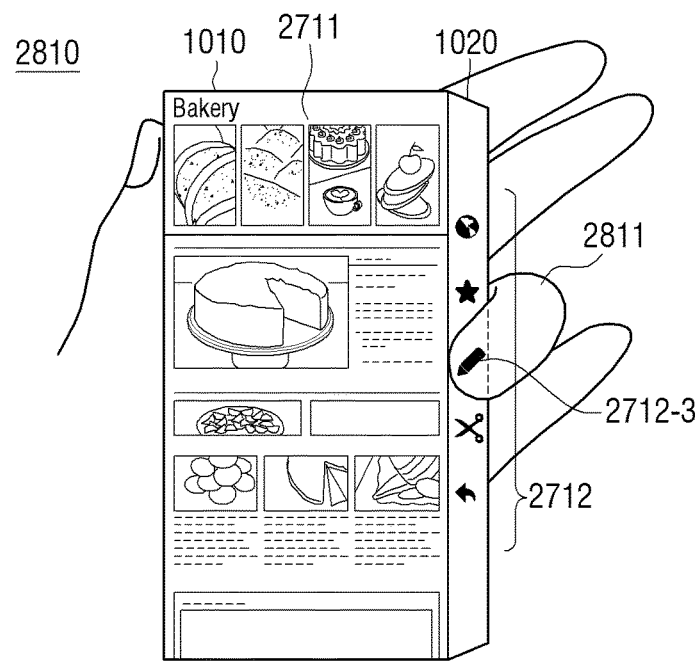
Figure 28:
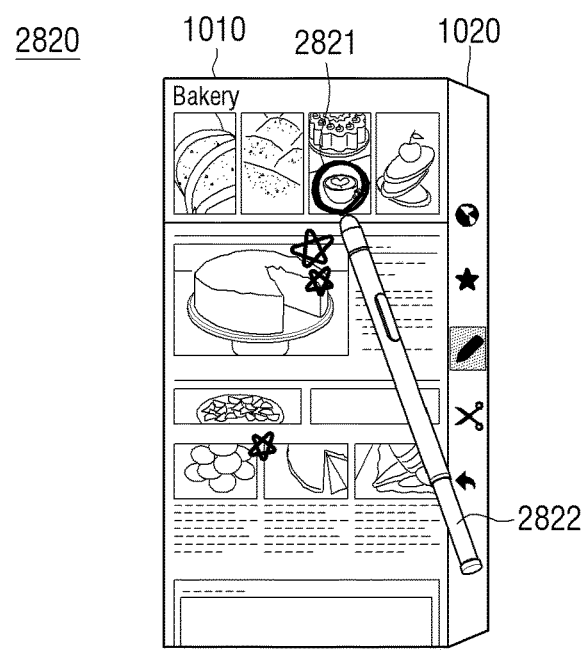

FIG. 28 is a diagram illustrating a process of performing a user interaction in a web application according to another exemplary embodiment of the present disclosure.

Referring to 2810 of FIG. 28, the controller 200 may display the web page 2711 including contents on the main region 1010 and the menu 2712 for performing the web page managing function on the web page 2711 on the sub-region 1020. The bent touch screen 100 may receive and sense a user's finger gesture 2811 (for example, finger touch gesture) selecting the drawing object 2712-3 included in the menu 2712.

Referring to 2820 of FIG. 28, in the state in which the drawing object 2712-3 is selected, the bent touch screen 100 may receive and sense a pen gesture 2822 moved on the main region 1010. The controller 200 may visually transform and display a region 2821 corresponding to the moved trajectory in response to the received pen gesture 2822. For example, the controller 200 may display a specific color in the region 2721 corresponding to the moved trajectory. The specific color may be determined as a default in advance or may be selected from a plurality of colors by the user.

Figure 29A:
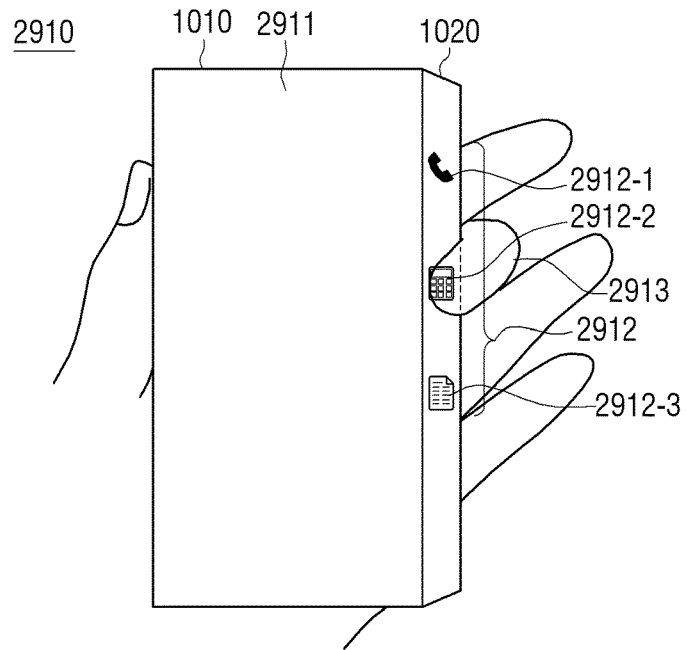
FIGS. 29A, 29B, 30A, and 30B are diagrams illustrating a process of performing a user interaction in a memo application according to an exemplary embodiment of the present disclosure.
Figure 29A:
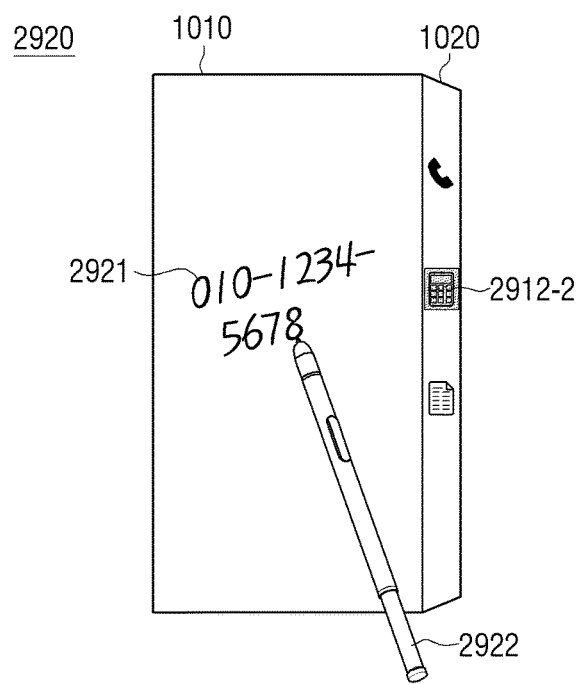
Figure 29B:
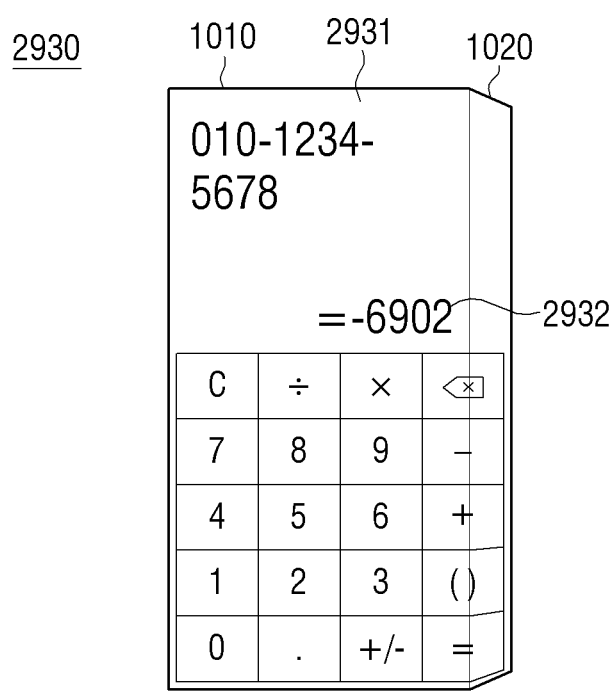

FIGS. 29A and 29B are diagrams illustrating a process of performing a user interaction in a memo application according to the exemplary embodiment of the present disclosure.

Referring to 2910 of FIG. 29A, the controller 200 may display the empty screen 2911 on the main region 1010 and a menu 2912 for processing an image to be displayed on the empty screen on the sub-region 1020. The menu 2912 may display a telephone object 2912-1 for converting a displayed image into a figure to place a call, a calculator object 2912-2 for converting the displayed image into the figure and calculating it, and a memo object 2912-3 for storing the displayed image. The bent touch screen 100 may receive and sense a user's finger gesture 2913 (for example, finger touch gesture) selecting the calculator object 2912-2 included in the menu 2912.

Referring to 2920 of FIG. 29A, in the state in which the calculator object 2912-2 is selected, the bent touch screen 100 may receive and sense a pen gesture 2922 moved on the main region 1010. The controller 200 may visually transform and display a region 2921 corresponding to the moved trajectory in response to the received pen gesture 2922. Further, the controller 200 may recognize the displayed image as a figure and an operator and perform the calculation, as a result of applying a function corresponding to the calculator object 2712-2.

Referring to 2930 of FIG. 29B, the controller 200 may execute an application 2931 processing the displayed image and display the application 2931 on the main region 1010, as a result of applying a function corresponding to the calculator object 2712-2. For example, the controller 200 may execute the calculator application 2931 performing the function corresponding to the calculator object 2912-2 and display the application on the main region 100. A calculation result 2932 depending on the execution of the calculator application 2931 may be displayed on the main region 1010.

Figure 30A:
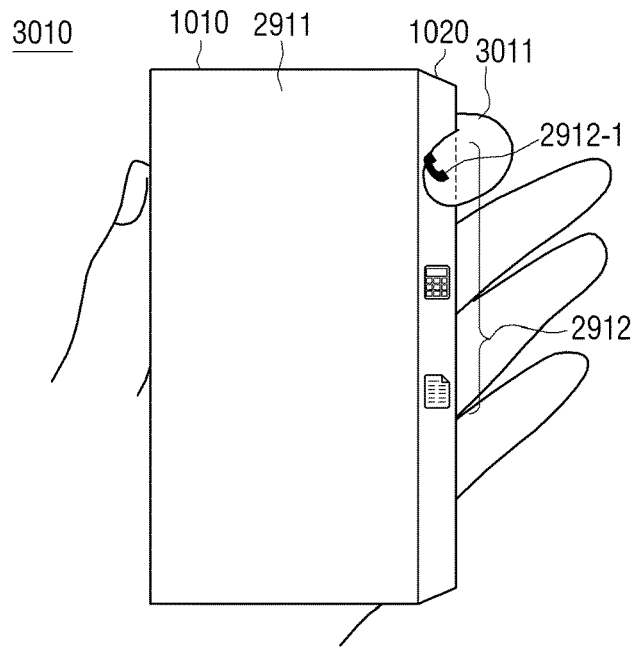
Figure 30A:
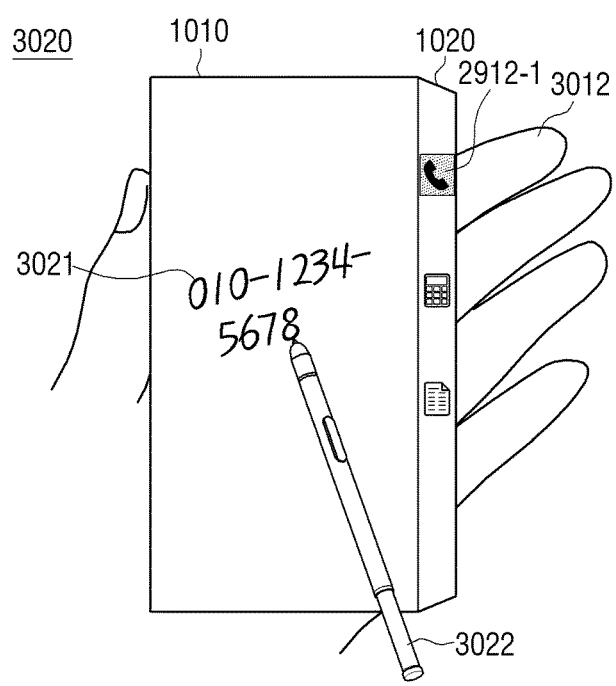
Figure 30B:
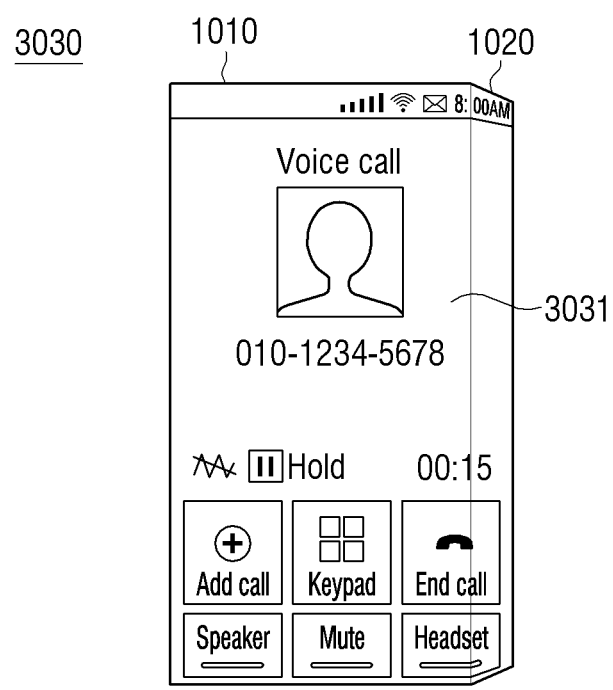

FIGS. 30A and 30B are diagrams illustrating a process of performing a user interaction in a memo application according to another exemplary embodiment of the present disclosure.

Referring to 3010 of FIG. 30A, the controller 200 may display the empty screen 2911 on the main region 1010 and the menu 2912 for processing the image displayed on the empty screen on the sub-region 1020. The bent touch screen 100 may receive and sense a user's finger gesture 3011 (for example, finger touch gesture) selecting the telephone object 2912-1 included in the menu 2912.

Referring to 3020 of FIG. 30A, in the state in which the telephone object 2912-1 is selected, the bent touch screen 100 may receive and sense a pen gesture 3022 moved on the main region 1010. The controller 200 may visually transform and display a region 3021 corresponding to the moved trajectory in response to the received pen gesture 3022. Further, the controller 200 may recognize the displayed image as a telephone number and perform the phone call, as a result of applying a function corresponding to the telephone object 2912-1.

Referring to 3030 of FIG. 30B, the controller 200 may execute a telephone application 3031 performing the function corresponding to the telephone object 2912-1 to be displayed on the main region 1010. The controller 200 may display the screen performing the telephone call at a telephone number recognized by the telephone application 3031.

Figure 31A:
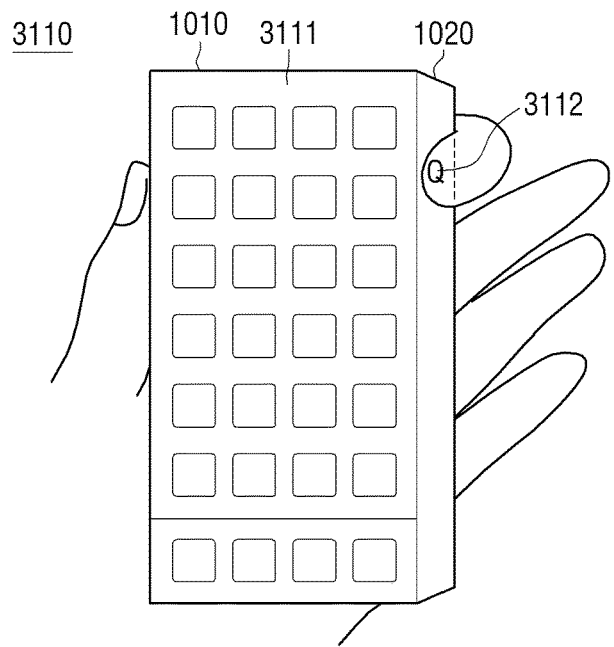
FIGS. 31A, 31B, 32A, and 32B are diagrams illustrating the process of performing a user interaction in a memo application according to the exemplary embodiment of the present disclosure.
Figure 31A:
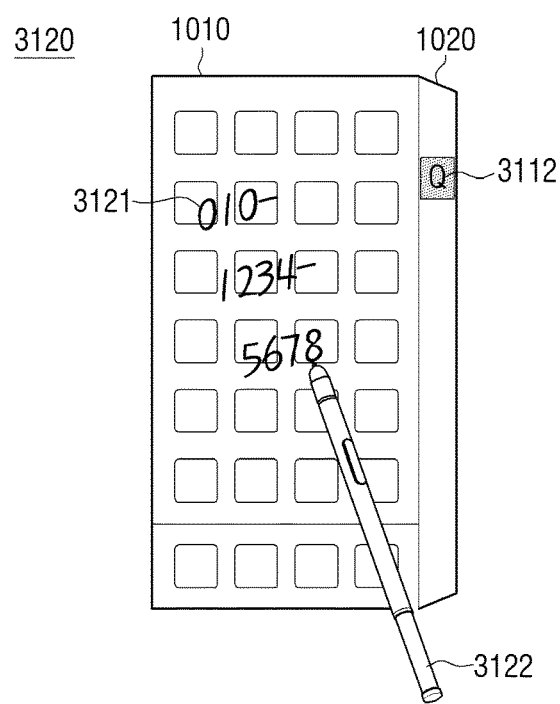
Figure 31B:
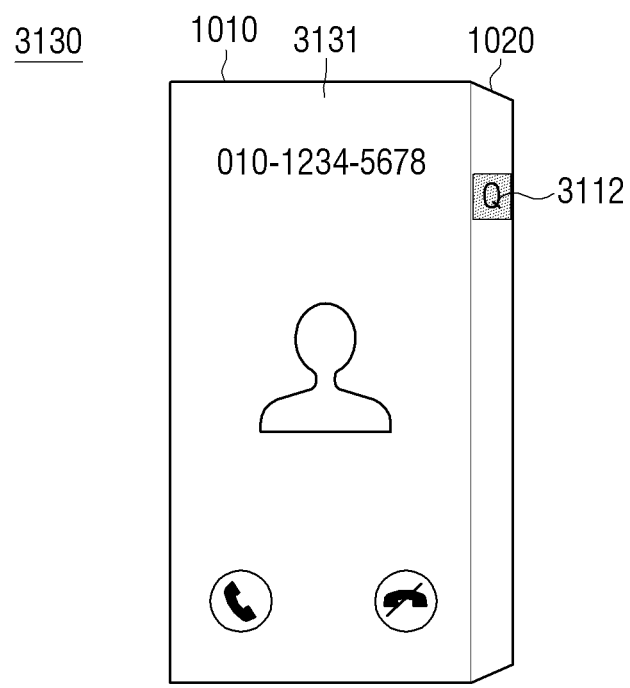

FIGS. 31A and 31B are diagrams illustrating a process of performing a user interaction in a home application according to the exemplary embodiment of the present disclosure.

Referring to 3110 of FIG. 31A, the controller 200 may display a home screen 3111 on the main region 1010 and a quick object 3112 for quickly processing the image displayed on the home screen on the sub-region 1020. The bent touch screen 100 may receive and sense a user's finger gesture 3113 (for example, finger touch gesture) selecting the quick object 3112.

Referring to 3120 of FIG. 31A, in the state in which the quick object 3112 is selected, the bent touch screen 100 may receive and sense a pen gesture 3122 moved on the main region 1010. The controller 200 may visually transform and display a region 3121 corresponding to the moved trajectory in response to the received pen gesture 3122. Further, the controller 200 may determine a format for the displayed image, as a result of applying a function corresponding to the quick object 3112. As a result, when the displayed image has a telephone number format, the controller 200 may recognize the displayed image as a telephone number and perform the telephone call.

Referring to 3130 of FIG. 31B, the controller 200 may execute a telephone application 3131 performing the function corresponding to the quick object 3112 to be displayed on the main region 1010. The controller 200 may display the screen performing the telephone call to the telephone number recognized by the telephone application 3131.

Figure 32A:
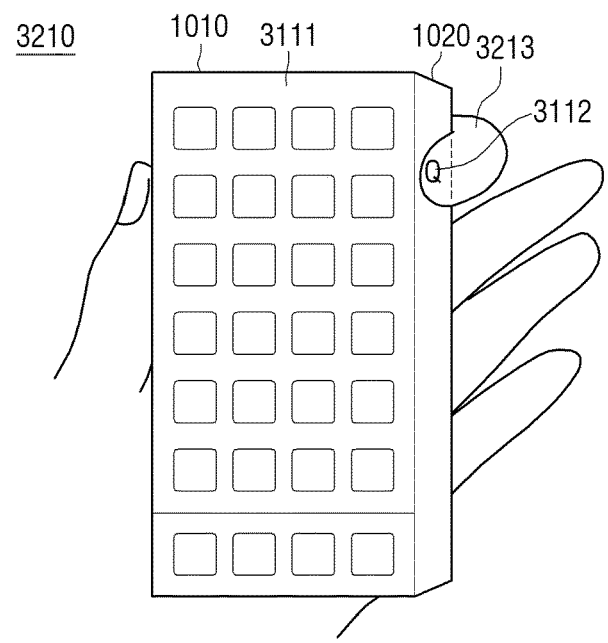
Figure 32A:
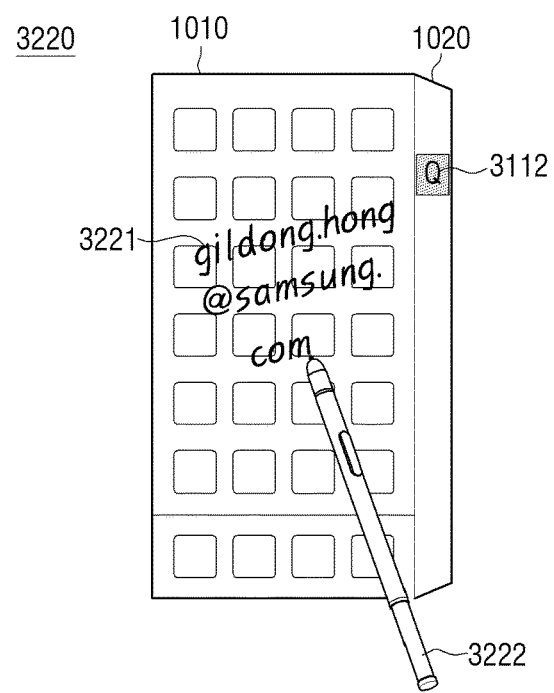
Figure 32B:
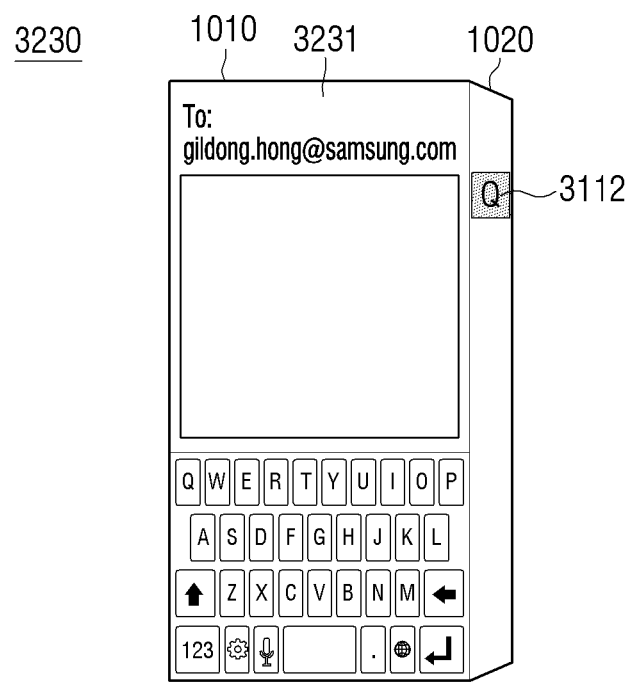

FIGS. 32A and 32B are diagrams illustrating a process of performing a user interaction in a home application according to the exemplary embodiment of the present disclosure.

Referring to 3210 of FIG. 32A, the controller 200 may display the home screen 3111 on the main region 1010 and the quick object 3112 for quickly processing the image displayed on the home screen on the sub-region 1020. The bent touch screen 100 may receive and sense a user's finger gesture 3213 (for example, finger touch gesture) selecting the quick object 3112.

Referring to 3220 of FIG. 32A, in the state in which the quick object 3112 is selected, the bent touch screen 100 may receive and sense a pen gesture 3222 moved on the main region 1010. The controller 200 may visually transform and display a region 3221 corresponding to the moved trajectory in response to the received pen gesture 3222. Further, the controller 200 may determine a format for the displayed image, as a result of applying a function corresponding to the quick object 3112. As a result, when the displayed image has an e-mail format, the controller 200 may recognize the displayed image as an e-mail and perform the e-mail sending function.

Referring to 3230 of FIG. 32B, an e-mail application 3231 performing the function corresponding to the quick object 3112 may be executed to be displayed on the screen. The controller 200 may display an e-mail preparing screen for sending an email to an e-mail recognized by the e-mail application 3231.

Figure 33:
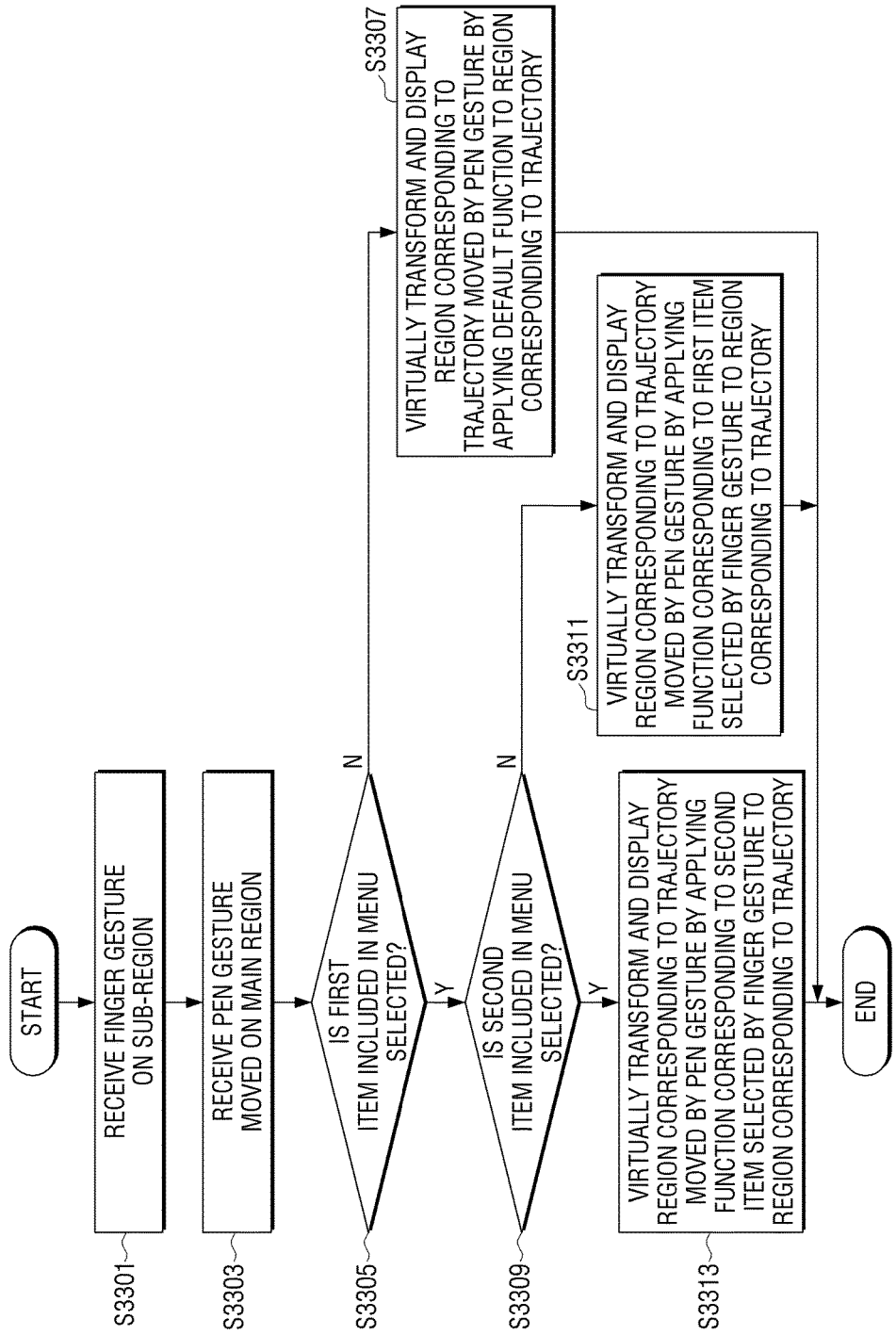
FIGS. 33 and 34 are flow charts for describing an interaction method for a user terminal device according to various exemplary embodiments of the present disclosure.

FIG. 33 is a flow chart for describing an interaction method according to an exemplary embodiment of the present disclosure.

Referring to FIG. 33, the user terminal device 1000 may receive and sense the finger gesture on the sub-region 1010 (S3301). Further, the user terminal device 1000 may receive and sense the pen gesture moved on the main region (S3303).

The user terminal device 1000 may determine whether the received finger gesture selects the first object included in the menu displayed on the sub-region 1010 (S3305). When the first object is not selected, the user terminal device 1000 may visually transform and display the region corresponding to the moved trajectory, as a result of applying a default function to the region corresponding to the moved trajectory of the pen gesture (S3307).

The user terminal device 1000 may determine whether the received finger gesture selects the first object and the second object (S3309). For example, the user terminal device 1000 may determine whether the finger gesture is the multi-finger gesture selecting both of the first object and the second object. When the finger gesture selects only the first object and does not select the second object, the user terminal device 1000 may visually transform and display the region corresponding to the moved trajectory, as a result of applying the function corresponding to the first object to the region corresponding to the moved trajectory of the pen gesture (S3311). On the other hand, when the finger gesture is the multi-finger gesture selecting both of the first object and the second object, the user terminal device 1000 may visually transform and display the region corresponding to the moved trajectory, as a result of applying the second object different from the first object to the region corresponding to the moved trajectory of the pen gesture (S3313).

Figure 34:
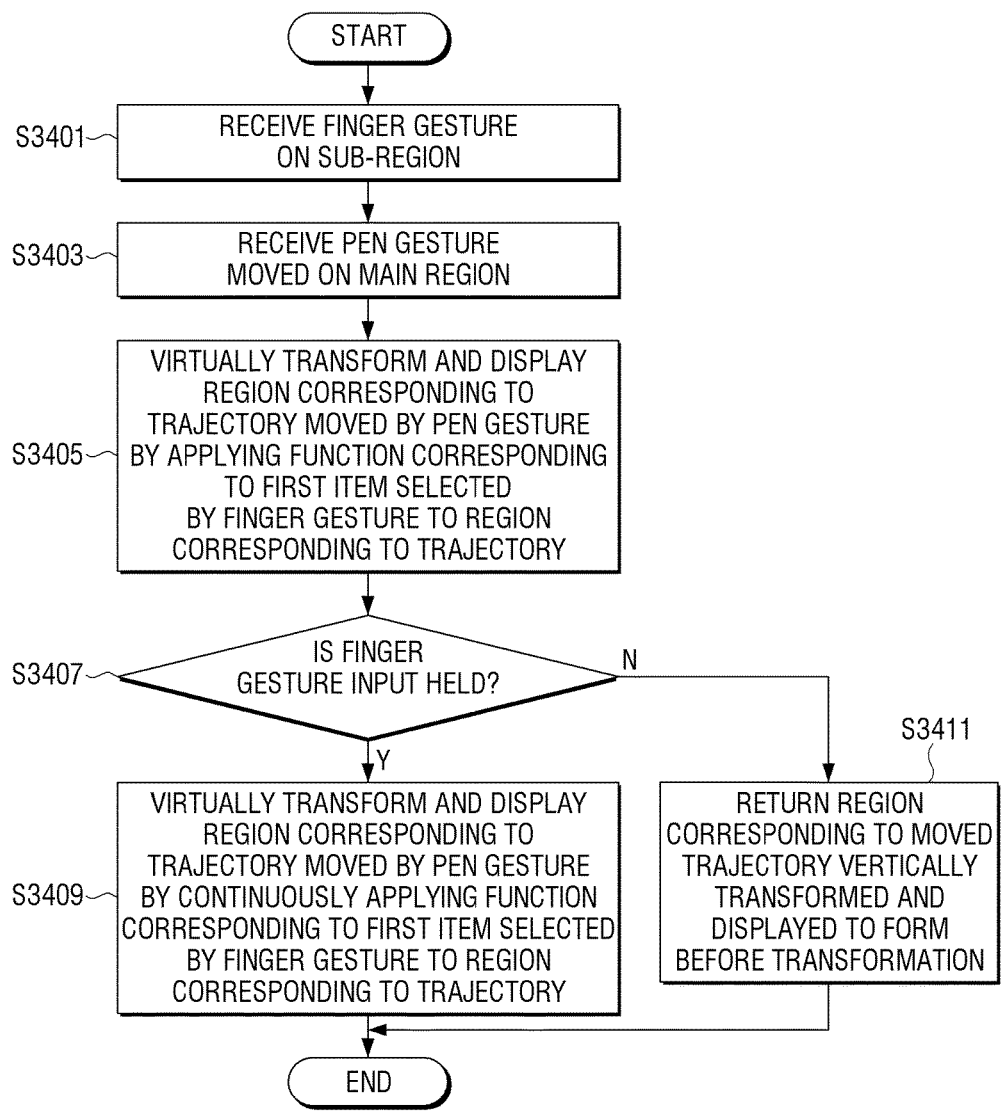

FIG. 34 is a flow chart for describing an interaction method according to another exemplary embodiment of the present disclosure.

Referring to FIG. 34, the user terminal device 1000 may receive and sense the finger gesture selecting the first object included in the menu displayed on the sub-region 1010 (S3401). Further, the user terminal device 1000 may receive and sense the pen gesture moved on the main region (S3403).

The user terminal device 1000 may visually deform and display the region corresponding to the moved trajectory in response to the finger gesture and the pen gesture, as a result of applying the function corresponding to the first object to the region corresponding to the moved trajectory of the pen gesture (S3405).

The user terminal device 1000 may determine whether the finger gesture input is held on the sub-region (S3407). When the finger gesture input is held, the user terminal device 1000 may continuously visually transform and display the region corresponding to the moved trajectory, as a result of applying the function corresponding to the first object to the region corresponding to the moved trajectory of the pen gesture (S3409). On the other hand, when the finger gesture is no longer input, the user terminal device 1000 may return the region corresponding to the moved trajectory visually transformed and displayed to the form before the transformation (S3411).

In addition, the interactions described in various exemplary embodiments as described above may be performed, but the illustration and description of the detailed flow chart for each exemplary embodiment will be omitted.

FIGS. 35 to 44 are diagrams illustrating performance of a user interaction by being connected to external devices according to an exemplary embodiment of the present disclosure.

According to the exemplary embodiment, the external device located outside of the user terminal device 1000 and the user terminal device 1000 may be connected to be able to communicate with each other.

Here, the connection between the external device located outside of the user terminal device 1000 and the user terminal device 1000 to be able to communicate with each other may be made in both of a wired manner and a wireless manner. For example, when the user terminal device 1000 and the external device are located within a predetermined distance or contact each other, the user terminal device 1000 and the external device may be connected to be able to communicate with each other. For example, when the communication scheme between the user terminal device 1000 and the external device uses a BLUETOOTH® scheme, if a BLUETOOTH® function of the user terminal device 1000 is turned on, the communicator 330 may transmit a power beacon signal to the external device. As a response to the power beacon signal, the external device may transmit an advertisement signal informing that the external device may be connected. As a response to the advertisement signal, the user terminal device 1000 transmits a connection request signal to the external device, such that a communication session may be formed between the user terminal device 1000 and an external device 3511. Under this situation, the connection between the user terminal device 1000 and the external device to be able to communicate with each other may mean the state in which the communication session is formed between the user terminal device 1000 and the external device 3511.

If the external device 3511 and the user terminal device 1000 are connected so as to be able to communicate with each other, the bent touch screen 100 may display the UI element associated with the external device on the sub-region 1020. The UI element associated with the external device may be one of, for example, an object for identifying the external device, an object for controlling the external device, and an icon corresponding to the application associated with the external device.

Next, the bent touch screen 100 may receive and sense the user gesture selecting the UI element while the UI element is displayed on the sub-region 1020. The user gesture may be, for example, the user's finger gesture or the user's pen gesture.

The controller 200 may display at least one UI element associated with the external device on the sub-region 1020 in response to the user gesture. Further, the controller 200 may display the execution screen of the application corresponding to one UI element on the sub-region 1020 or the main region 1010 in response to the user gesture selecting one of a plurality of other UI elements. Alternatively, the controller 200 may display the execution screen of the application corresponding to the selected UI element on the sub-region 1020 or the main region 1010 in response to the user gesture.

According to another exemplary embodiment, if the external device and the user terminal device 1000 are connected so as to be able to communicate with each other, the bent touch screen 100 may display the execution screen of the preset application on the sub-region 1020 or the main region 1010.

Figure 49:
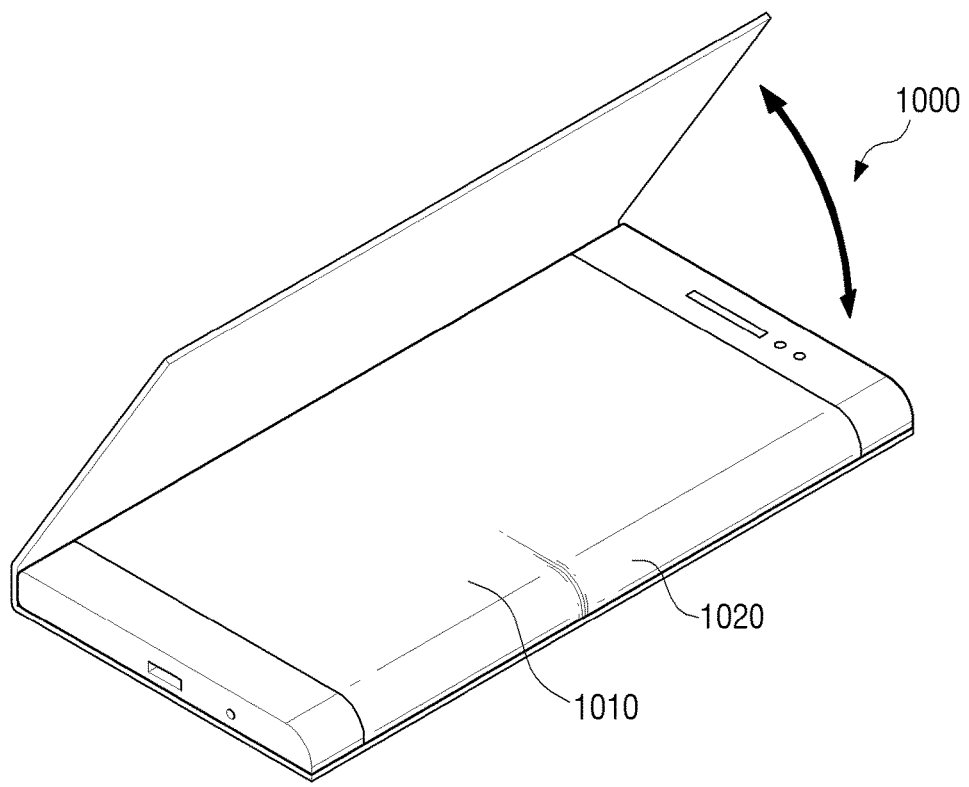
FIG. 49 is a diagram illustrating various configuration examples of the bent touch screen having a cover.

As described above, comparing to the case in which the UI element associated with the external device is displayed on the main region 1010, the case in which the UI element associated with the external device is displayed on the sub-region may consume a relatively smaller amount of power. Further, as illustrated in FIG. 49, if the user terminal device 1000 has a cover, the user may rapidly and easily view the UI element in the sub-region 1020 without the inconvenience of opening the cover.

Figure 35A:
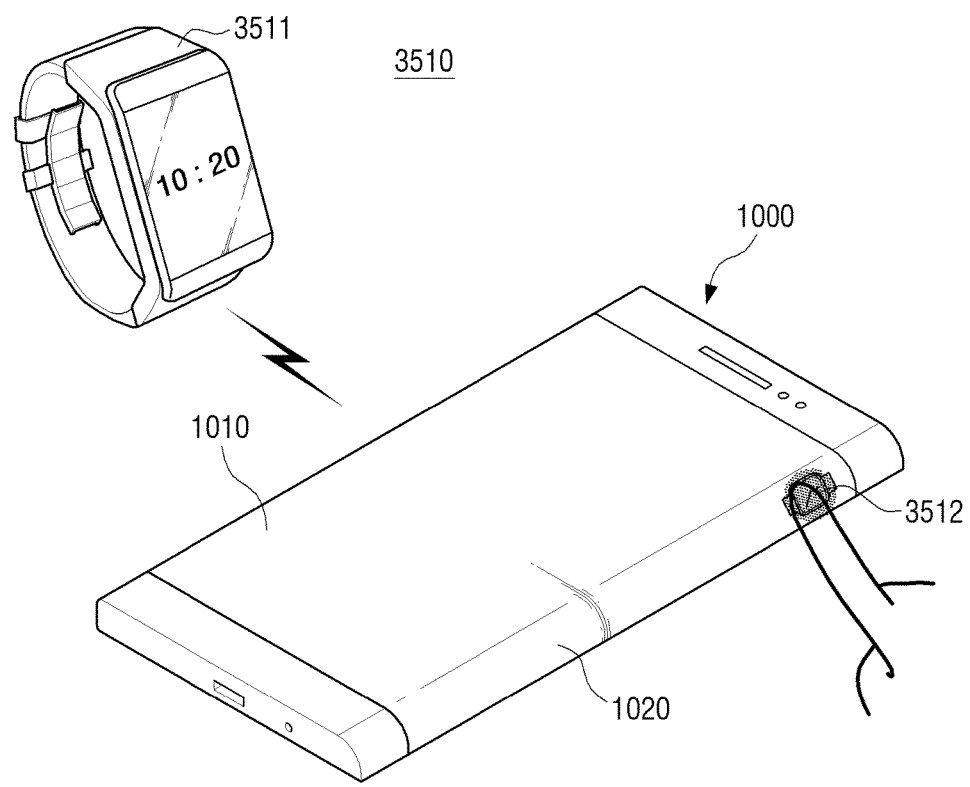
FIGS. 35A, 35B, 36A, 36B, 37A, 37B, 38, 39, 40, 41, 42, 43, and 44 are diagrams illustrating performance of a user interaction by connecting the user terminal device to an external device according to an exemplary embodiment of the present disclosure.
Figure 35A:
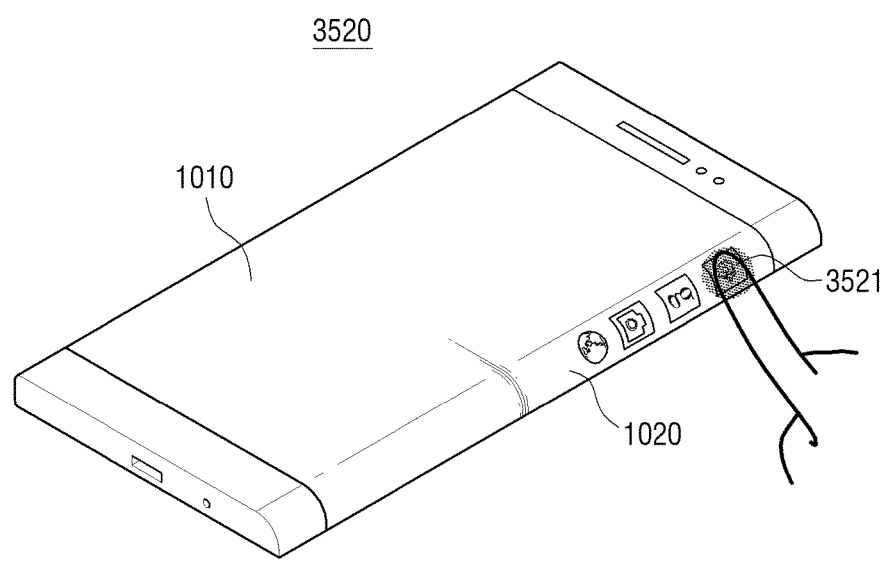
Figure 35B:
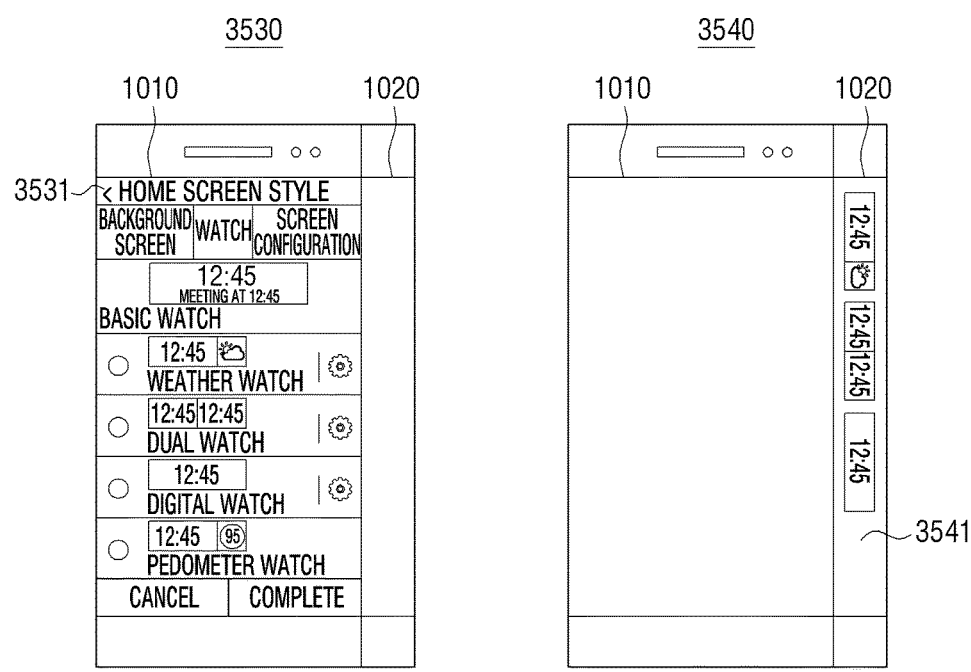

Referring to 3510 of FIG. 35A, the user terminal device 1000 and a wearable device (for example, a SAMSUNG GALAXY GEAR® brand wearable wrist watch that may be put on a wrist, etc.) 3511 located external to the user terminal device 1000 may be connected so as to be able to communicate with each other. If the user terminal device 1000 and the wearable device 3511 are connected so as to be able to communicate with each other, the controller 200 may display a UI element 3512 associated with the wearable device 3511 on the sub-region 1020. The UI element 3512 may be, for example, an object for identifying the wearable device 3511 or an icon corresponding to an application associated with the wearable device 3511. The bent touch screen 100 may receive and sense the user gesture selecting the UI element 3512 while the UI element 3512 is displayed on the sub-region 1020.

As illustrated in 3520 of FIG. 35A, the controller 200 may display a plurality of UI elements associated with the wearable device 3511 on the sub-region 1020 in response to the user gesture input selecting the user element 3512. Further, as illustrated in 3530 of FIG. 35B, the controller 200 may display an execution screen 3531 of the application corresponding to one UI element 3521 on the main region 1010 in response to the user gesture selecting one UI element 3521 of a plurality of other UI elements. As another example, as illustrated in 3540 of FIG. 35B, the controller 200 may display the execution screen 3541 of the application corresponding to the one UI element 3521 on the sub-region 1020.

Next, the controller 200 may control the wearable device 3511 in response to the user input through the execution screens 3531 and 3541 of the application. For example, in response to the user input, the controller 200 may determine a kind of home screen of the wearable device 3511, determine a kind of notification application to be displayed on the wearable device 3511, determine video or audio contents to be reproduced by the wearable device 3511, determine user biological information to be sensed by the wearable device 3511, or determine time information to be displayed on the wearable device 3511. However, the exemplary embodiments are not limited thereto.

Figure 36A:
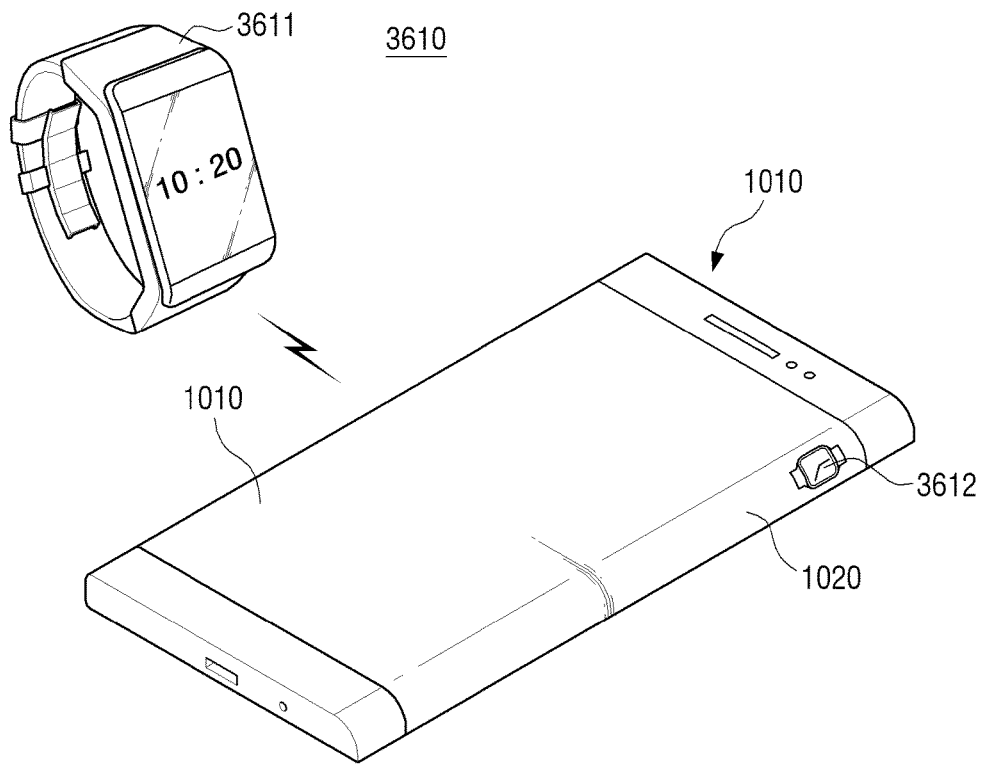

Referring to 3610 of FIG. 36A, the user terminal device 1000 and the wearable device 3611 located external to the user terminal device 1000 may be connected so as to be able to communicate with each other. If the user terminal device 1000 and the wearable device 3611 are connected so as to be able to communicate with each other, the controller 200 may display a UI element 3612 associated with the wearable device 3611 on the sub-region 1020. The UI element 3612 may be, for example, an object for identifying the wearable device 3611 or an icon corresponding to an application associated with the wearable device 3611. The bent touch screen 100 may receive and sense the user gesture selecting the UI element 3612 while the UI element 3612 is displayed on the sub-region 1020.

Figure 36B:
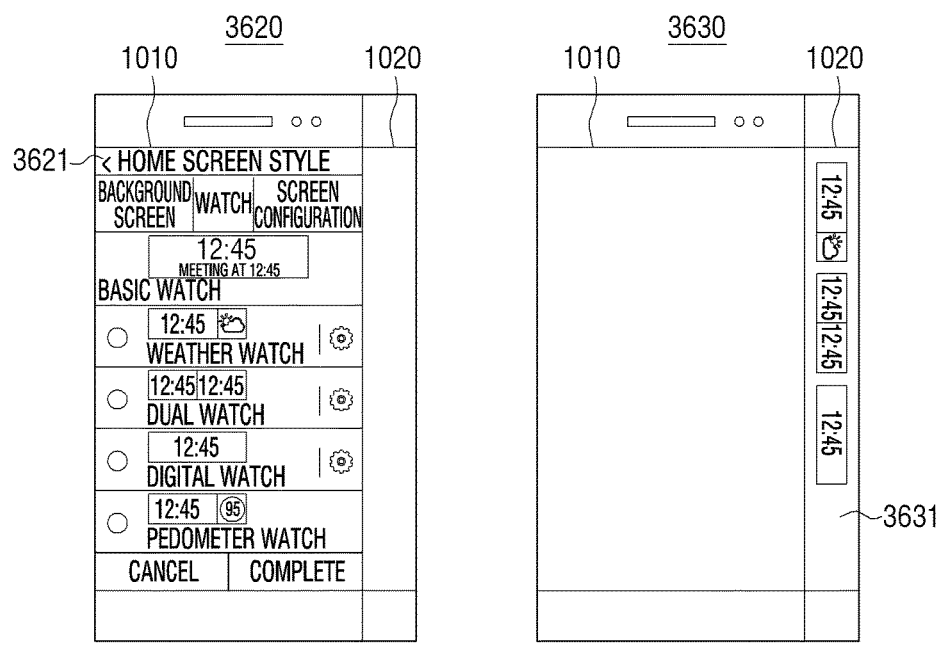

As illustrated in 3620 of FIG. 36B, the controller 200 may display the execution screen 3621 of the application corresponding to the UI element 3612 on the main region 1010 in response to the user gesture input selecting the user element 3612. As another example, as illustrated in 3630 of FIG. 36B, the controller 200 may display the execution screen 3631 of the application corresponding to a UI element 3612 on the sub-region 1020. Next, the controller 200 may control the wearable device 3611 in response to the user input through the execution screens 3621 and 3631 of the application.

Figure 37A:
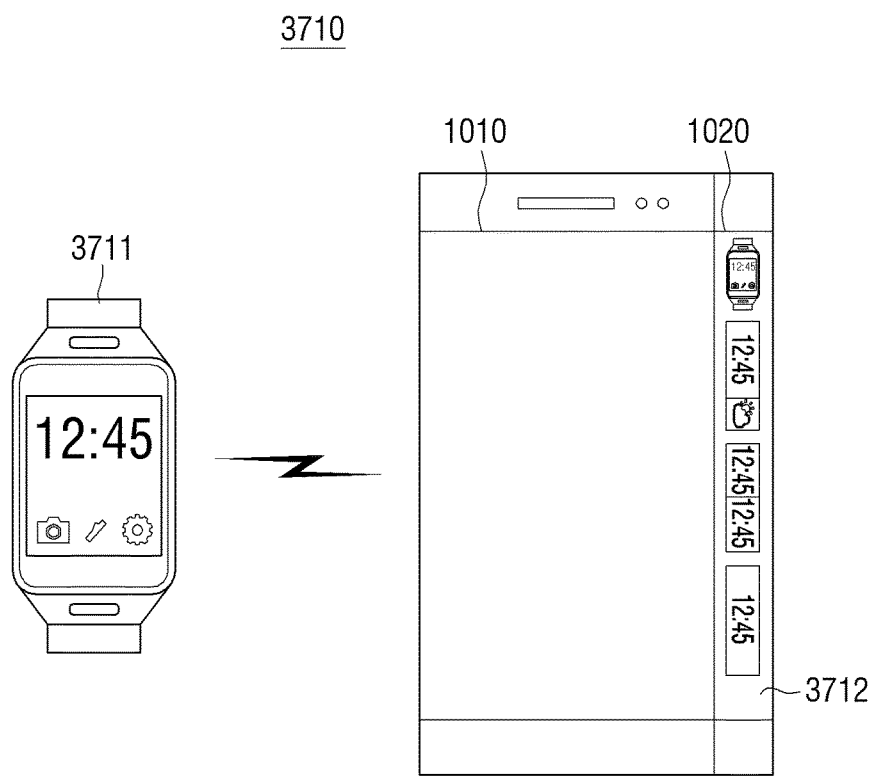
Figure 37B:
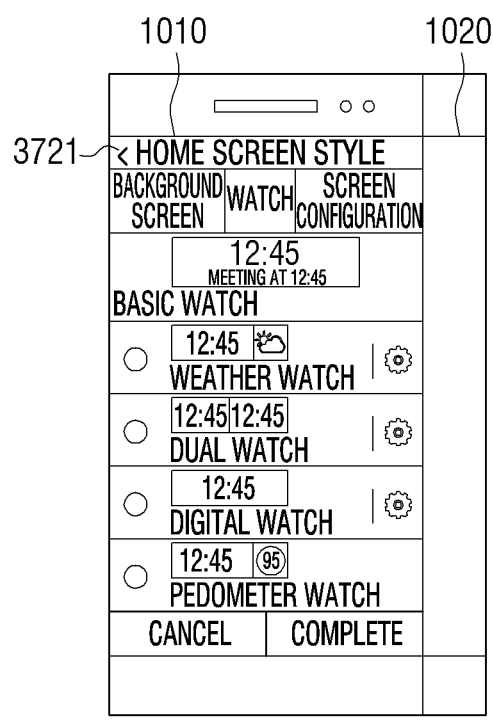

Referring to 3710 of FIG. 37A, the user terminal device 1000 and the wearable device 3711 located external to the user terminal device 1000 may be connected so as to be able to communicate with each other. If the user terminal device 1000 and the wearable device 3711 are connected so as to be able to communicate with each other, the controller 200 may display an execution screen 3712 of the preset application associated with the wearable device 3711 on the sub-region 1020. As another example, as illustrated in 3720 of FIG. 37B, the controller 200 may display the execution screen 3721 of the preset application associated with the wearable device 3711 on the main region 1010. Next, the controller 200 may control the wearable device 3711 in response to the user input through the execution screens 3712 and 3721 of the application.

Figure 38:
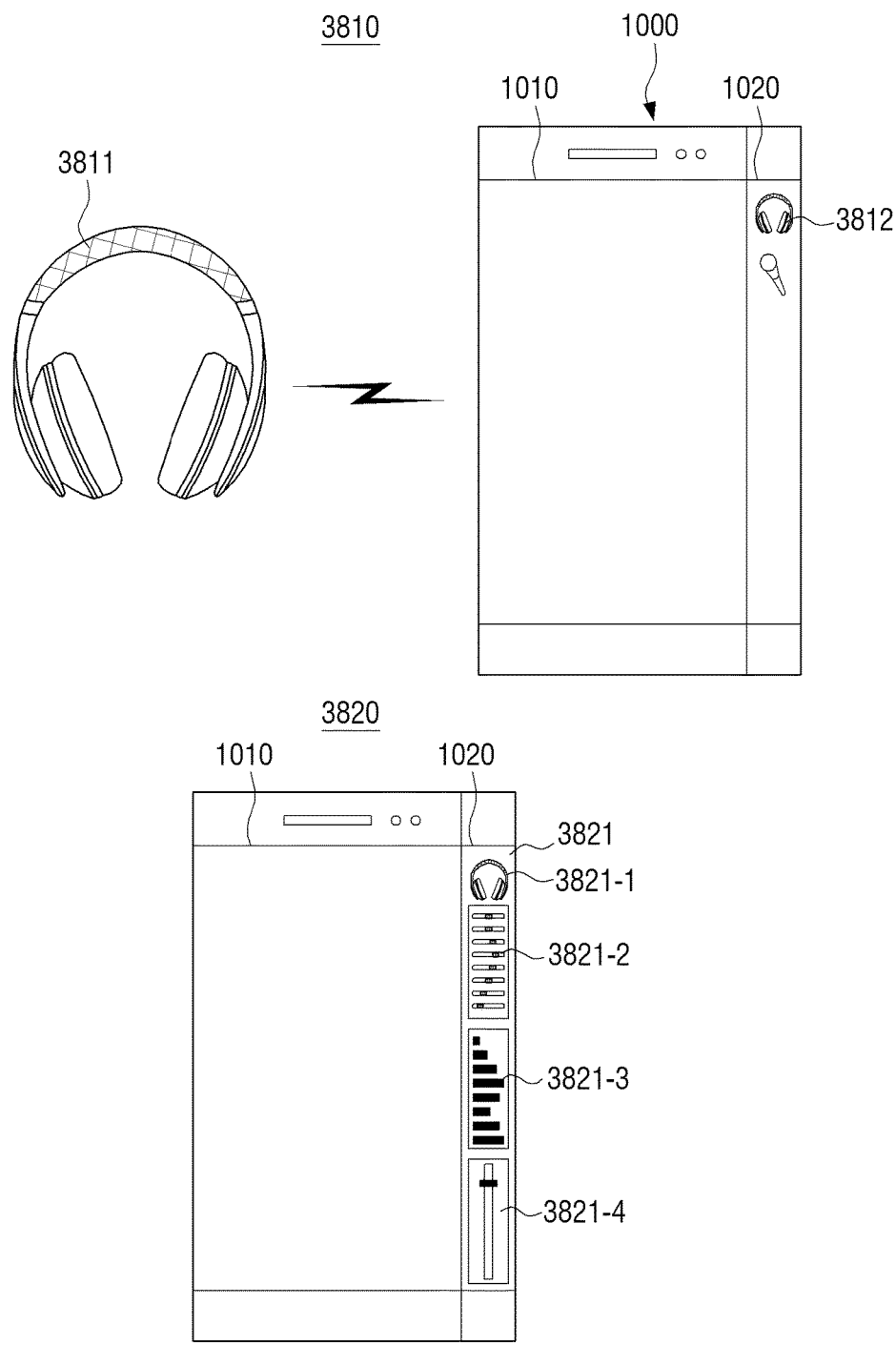

Referring to 3810 of FIG. 38, the user terminal device 1000 and an audio device (for example, speaker, earphone, headset, microphone, home theater, etc.) 3811 located external to the user terminal device 1000 may be connected so as to be able to communicate with each other. For example, when the user terminal device 1000 and the audio device 3811 are located within a predetermined distance or are in contact with each other, the user terminal device 1000 and the audio device 3811 may be connected so as to be able to communicate with each other. If the user terminal device 1000 and the audio device 3811 are connected so as to be able to communicate with each other, the controller 200 may display the UI element 3812 associated with the audio device 3811 on the sub-region 1020. The UI element 3812 may be, for example, an object for identifying the audio device 3811 or an icon corresponding to an application associated with the audio device 3811. The bent touch screen 100 may receive and sense the user gesture selecting the UI element 3812 while the UI element 3812 is displayed on the sub-region 1020. The user gesture may be, for example, the user's finger gesture or the user's pen gesture tapping the UI element 3812.

As illustrated in 3820 of FIG. 38, the controller 200 may display the execution screen 3821 of the application corresponding to the UI element 3812 on the sub-region 1020 in response to the user gesture input selecting the UI element 3812. The application execution screen 3821 may include at least one of, for example, identification information 3821-1 of the audio device 3811 representing that the application execution screen 3821 is being connected to the user terminal device 1000, state information 3821-2 and 3821-3 (for example, equalizer information, playing volume information, etc.) of the audio device, and a UI element 3821-4 that may control the audio device 3811. The UI element 3821-4 that may control the audio device 3811 may include at least one of, for example, a UI element that may control a volume of the audio device 3811 and the UI element that may select sound effects (for example, hip-hop, jazz, classic, etc.) of the audio device 3811. Further, the controller 200 may control the function of the audio device 3811 in response to the user input through the execution screen 3821 of the application. For example, the controller 200 may control the volume of the audio device 3811 in response to the user input being received through the UI element 3821-4.

Figure 39:
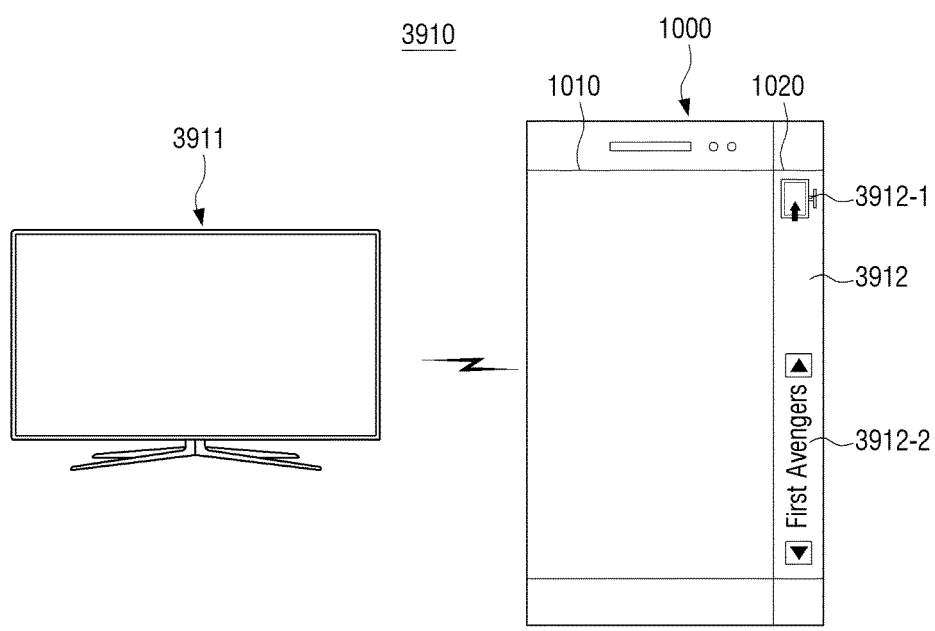

Referring to FIG. 39, the user terminal device 1000 and the display device (for example, monitor, digital TV, tablet PC, etc.) 3911 located external to the user terminal device 1000 may be connected so as to be able to communicate with each other. If the user terminal device 1000 and the display device 3911 are connected so as to be able to communicate with each other, the controller 200 may display an execution screen 3912 of the preset application associated with the display device 3911 located external to the user terminal device 1000 on the main region 1010. The application execution screen 3921 may include at least one of, for example, identification information 3912-1 of the display apparatus 3911 representing that the application execution screen 3921 is being connected to the user terminal device 1000 and the state information of the UI element 3912-2 or the display device 3911 that may control the display device 3911.

The UI element 3912-2 that may control the display device 3911 may include at least one of, for example, the UI element searching for contents to be played by the display device 3911, the UI element starting to play the contents by the display device 3911, and the UI element stopping playing of contents by the display device 3911. The state information of the display device 3911 may include at least one of, for example, a title of the video contents that is being played by the display device 3911, a playing time of the video contents, a source of video contents, and the remaining playing time of the video contents.

Figure 40:
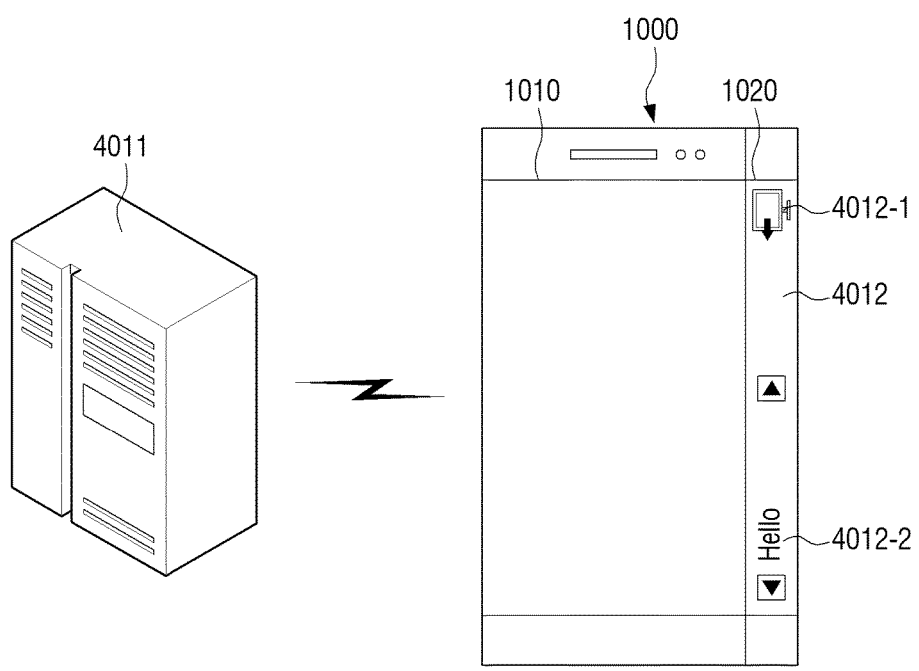

Referring to FIG. 40, the user terminal device 1000 and storage devices (for example, computer, server, etc.) 4011 located external to the user terminal device 1000 may be connected so as to be able to communicate with each other. If the user terminal device 1000 and the storage device 4011 are connected so as to be able to communicate with each other, the controller 200 may display an execution screen 4012 of the preset application associated with the storage device 4011 on the sub-region 1020. The application execution screen 4012 may include at least one of, for example, identification information 4012-1 of a storage device 4011 representing that the application execution screen 4012 is being connected to the user terminal device 1000, a UI element 4012-2 searching for contents to be played by the user terminal device 1000, state information associated with the contents to be played by the user terminal device 1000, a UI element starting to play contents by the user terminal device 1000, and a UI element stopping playing of the content by the user terminal device 1000. Further, the information associated with the contents to be played by the user terminal device 1000 may include at least one of, for example, a title of playing contents, a playing time of contents, a source of contents, and the remaining playing time of contents.

Figure 41:
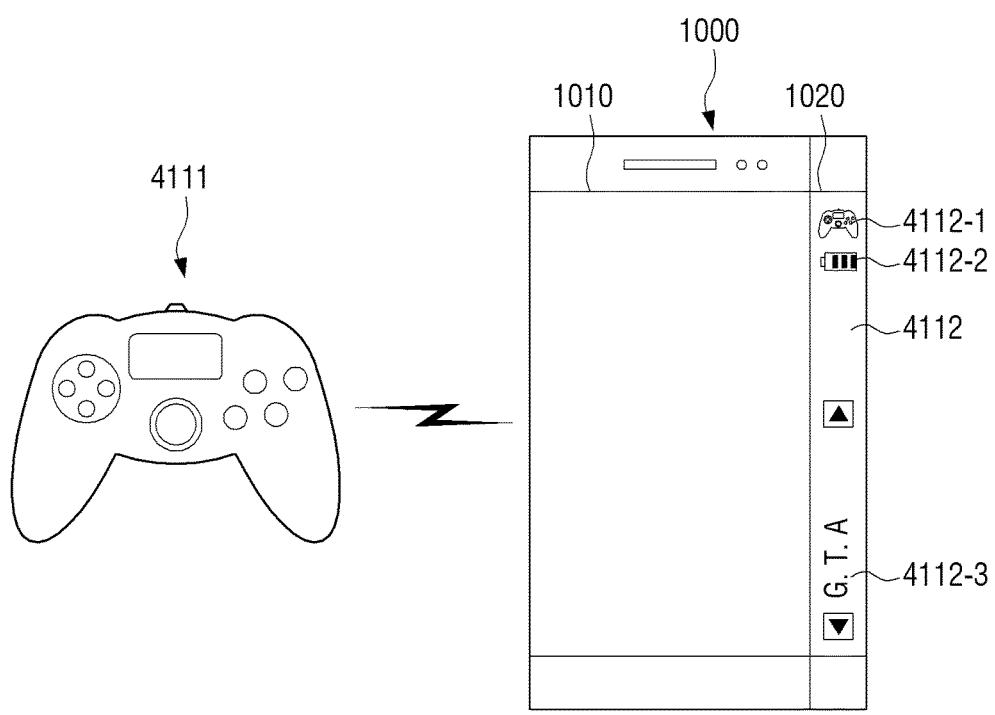

Referring to FIG. 41, the user terminal device 1000 and input devices (for example, game controller) 4111 located external to the user terminal device 1000 may be connected so as to be able to communicate with each other. If the user terminal device 1000 and the game controller 4111 are connected so as to be able to communicate with each other, the controller 200 may display an execution screen 4112 of the preset application associated with the game controller 4111 on the sub-region 1020. The application execution screen 4112 may include at least one of, for example, identification information 4112-1 of the game controller 4111 representing that the application execution screen 4112 is being connected to the user terminal device 1000 and the state information 4112-2 of the UI element 4112-3 or the game controller 4111 that may control the game controller 4111. The UI element 4112-3 that may control the game controller 4111 may include at least one of, for example, a UI element searching for video contents to be controlled by the game controller 4111, a UI element starting to play the video contents controlled by the game controller 4111, and a UI element stopping playing of the video contents that are being played by the game controller 4111. Further, the state information 4112-2 of the game controller 4111 may be, for example, a battery residual quantity of the game controller 4111, a network connection state to the game controller 4111, or the like.

Figure 42:
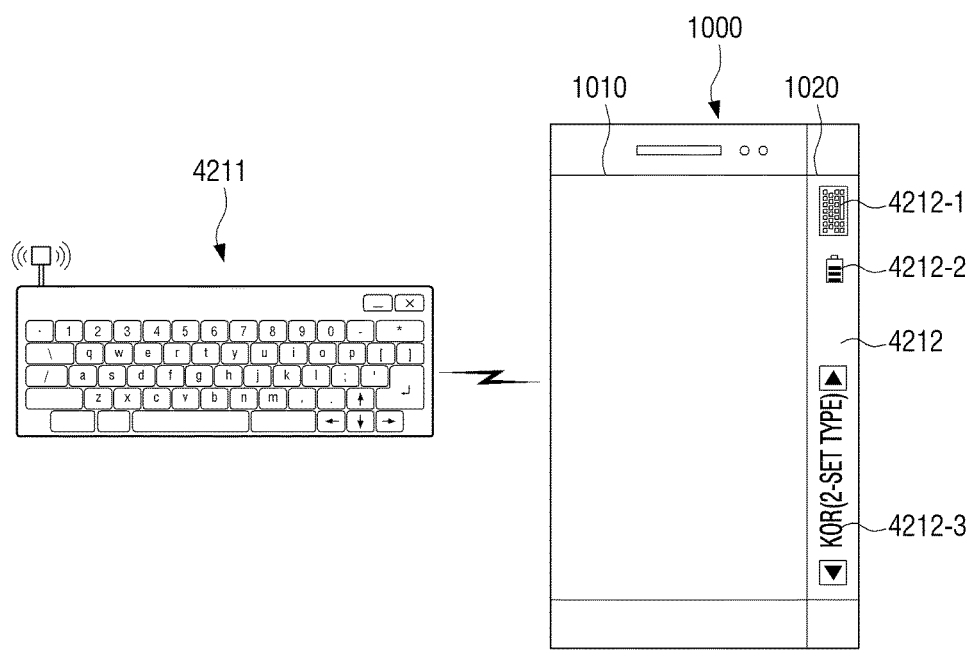

Referring to FIG. 42, the user terminal device 1000 and input devices (for example, keyboard, mouse) 4211 located external to the user terminal device 1000 may be connected so as to be able to communicate with each other. For example, if the user terminal device 1000 and the keyboard 4211 are connected so as to be able to communicate with each other, the controller 200 may display an execution screen 4212 of the preset application associated with the input device 4211 located outside on the sub-region 1020. The application execution screen 4212 may include at least one of, for example, identification information 4212-1 of the keyboard 4211 representing that the application execution screen 4212 is being connected to the user terminal device 1000 and the state information 4212-2 of the UI element 4212-3 or the keyboard 4211 that may control the keyboard 4211. The UI element 4212-3 that may control the keyboard 4211 may be, for example, the UI element that may change a kind, layout, or language of keyboard 4211. Further, the state information of the keyboard 4211 may be, for example, the battery residual quantity of the keyboard 4211.

As another exemplary embodiment, when the external device is present around the user terminal device 1000, the controller 200 may display the UI element representing the external device communicating with the user terminal device 1000 on the sub-region 1020. The bent touch screen 100 may receive and sense the user gesture selecting the UI element while the UI element is displayed on the sub-region 1020. Further, the controller 200 may perform the communication connection between the user terminal device 1000 and the external device in response to the received user gesture selecting the UI element.

Figure 43:
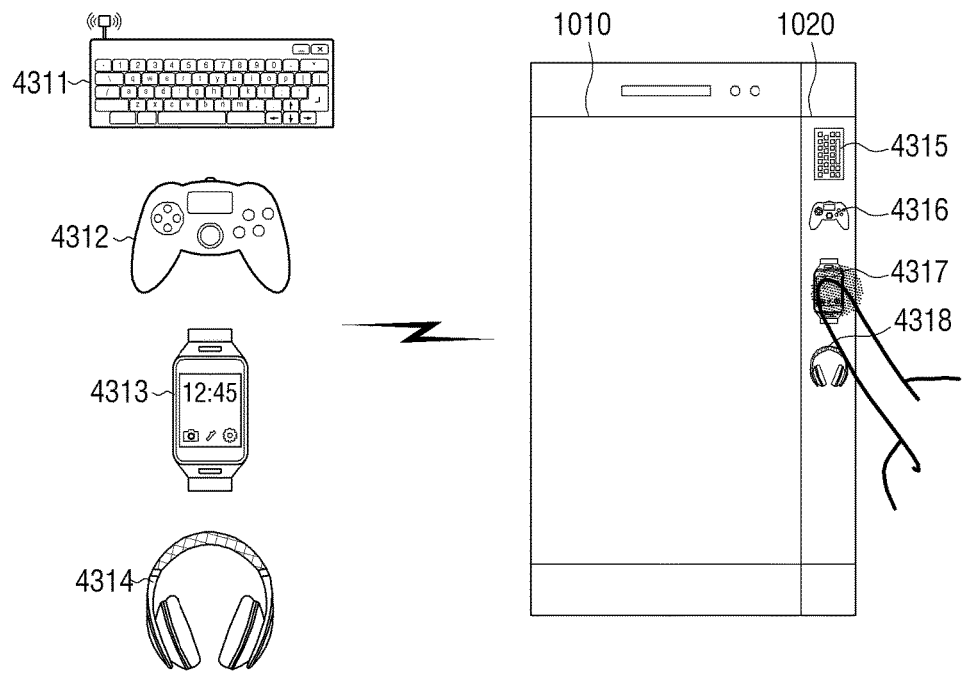
Figure 43:
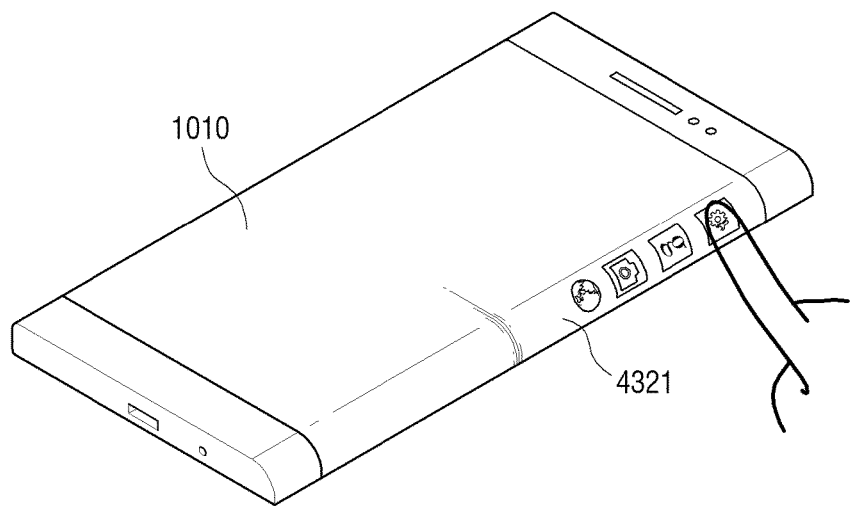

For example, referring to 4310 of FIG. 43, when a plurality of external devices 4311, 4312, 4313, and 4314 are present around the user terminal device 1000, the controller 200 may display a plurality of UI elements 4315 to 4318 representing the external devices communicating with the user terminal device 1000 on the sub-region 1020. The plurality of UI elements each may be, for example, objects identifying the external devices 4311 to 4314 or icons corresponding to applications representing each of the external devices 4311 to 4314. In the state in which the plurality of UI elements 4315 to 4318 are displayed, the bent touch screen 100 may receive and sense the user gesture selecting one UI element 4317 for establishing a communication connection.

In response to the user gesture, the controller 200 may perform establish the communication connection with the external device 4313 corresponding to one UI element 4317 and, as illustrated in 4320, the controller 200 may display an execution screen 4321 of the application corresponding to one UI element 4317 on the sub-region 1020. The execution screen 4321 of the application may include at least one UI element that may control the external device 4313 corresponding to one UI element 4317. Next, the controller 200 may control the external device 4313 in response to the user input through the execution screen 4321 of the application.

Figure 45:
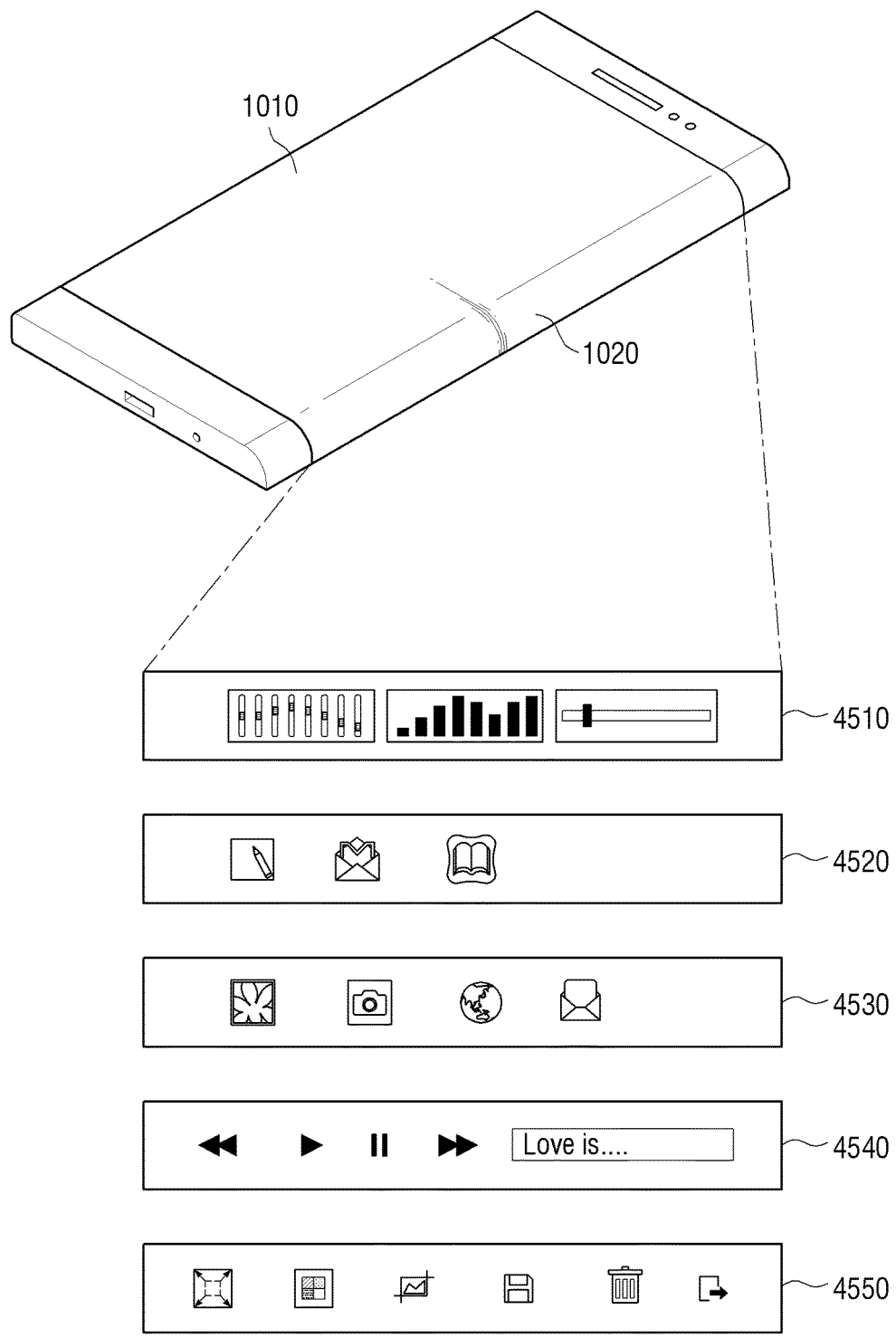

FIGS. 45 and 46 are diagrams illustrating the performance of the user interaction on a panel displayed in a sub-region according to an exemplary embodiment of the present disclosure.

According to one exemplary embodiment, when there exists a plurality of external devices that may communicate with the user terminal device 1000 or may be input to the user input device 1000, the bent touch screen 100 may display a panel associated with one of the plurality of external devices on the sub-region 1020. In this case, the panel may include at least one UI element associated with one external device. Here, if one panel corresponds to one external device, one panel may also be provided through one application and a plurality of panels may also be provided through one application. Meanwhile, what the external device is input to the user terminal device 1000 may include the state in which the external device and the user terminal device 1000 are connected so as to be able to communicate with each other or the external device is coupled with the user terminal device 1000 by a device in the accessory form of the user terminal device 1000 and then is separated from the user terminal device 1000. For example, the external device present in the accessory form may be a pen.

The bent touch screen 100 may receive and sense the user gesture dragged in one direction on the sub-region 1020 while the panel is displayed. The controller 200 may change or delete the UI element included in the panel or display a new UI element on the panel in response to the user gesture.

Figure 44:
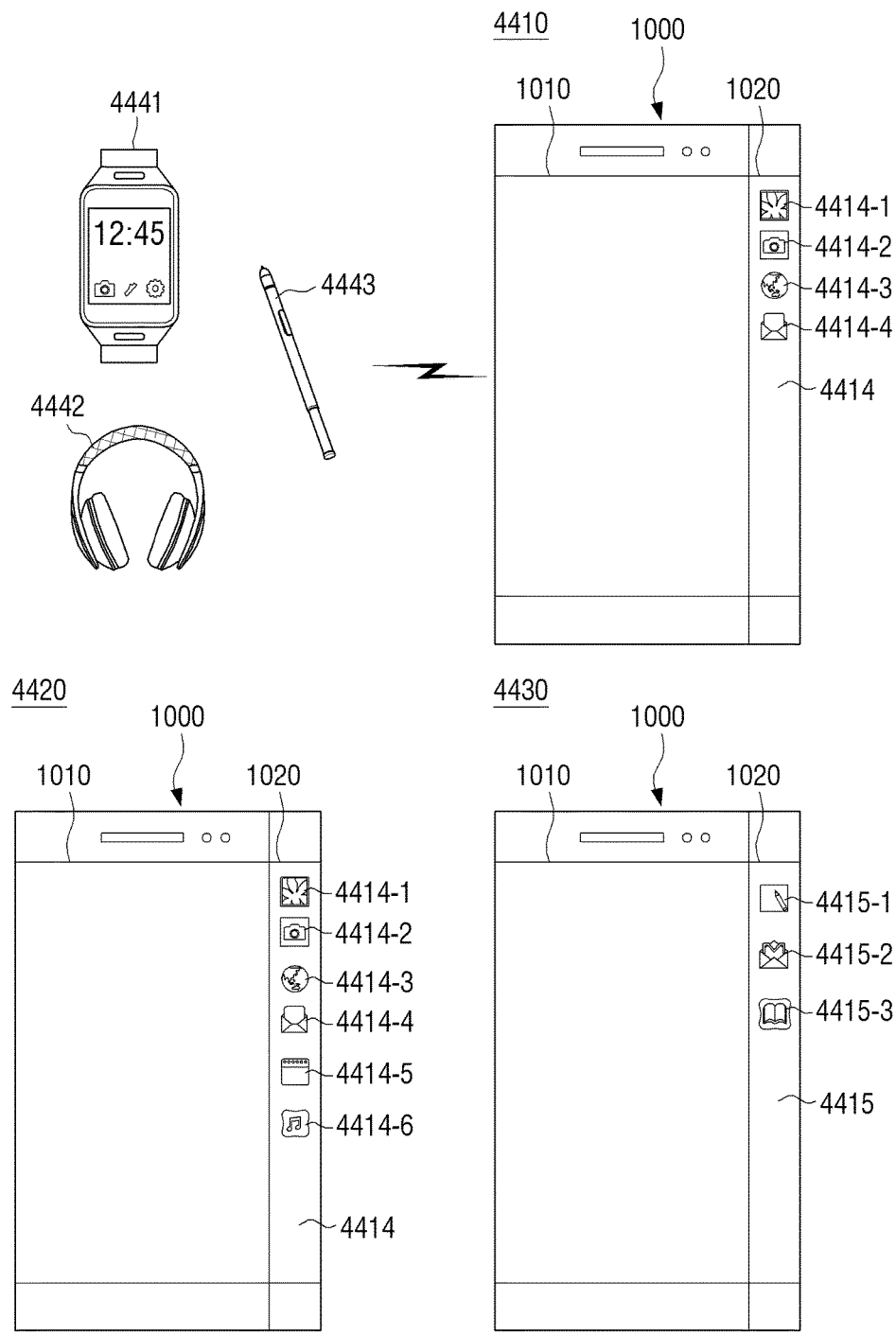

For example, referring to 4410 of FIG. 44, when there exists a plurality of external devices (for example, audio device 4442, wearable device 4441, pen 4443, etc.) that may communicate with the user terminal device 1000 or may be input to the user terminal device 1000, the bent touch screen 100 may display a panel 4414 including at least one of UI elements 4414-1, 4414-2, 4414-3, and 4414-4 associated with one (for example, wearable device) of the plurality of external devices on the sub-region 1020. In this case, the UI element may be the UI element (for example, icon) corresponding to the application associated with one external device (for example, wearable device) or the UI element that may control one external device. The application associated with the external device may be, for example, the preset application associated with the external device recommended by the user terminal device 1000, an application which the user frequently uses beyond a predetermined frequency upon the use of the external device, or an application which a third party recommends in association with the external device, or the like.

The bent touch screen 100 may receive and sense the user gesture dragged along a long side of the sub-region 1020 while the panel 4414 is displayed. As illustrated in 4420 of FIG. 44, the controller 200 may display the panel 4414 further including other UI elements 4414-5 and 4414-6 associated with one external device (for example, wearable device) on the sub-region 1020 in response to the user gesture.

Alternatively, the bent touch screen 100 may receive and sense the user gesture dragged along a short side of the sub-region 1020 while the panel 4414 is displayed. As illustrated in 4430 of FIG. 44, the controller 200 may display the panel 4415 including UI elements 4415-1, 4415-2, and 4415-3 associated with another external device (for example, pen) of the plurality of external devices on the sub-region 1020 in response to the user gesture.

FIG. 45 illustrates an example of panels that may be displayed on the sub-region 1020 of the bent touch screen 100 according to the exemplary embodiment of the present disclosure, but the kind of panels that may be displayed on the sub-region 1020 is not limited thereto. Reference numeral 4510 of FIG. 45 represents the panel including the UI element associated with the audio device when the external device that may communicate with the user terminal device 1000 is the audio device. Further, reference numeral 4520 of FIG. 45 represents the panel including the UI element associated with the input device when the external device that may communicate with the user terminal device 1000 is the input device. Further, reference numeral 4530 of FIG. 45 represents the panel including the UI element associated with the wearable device when the external device that may communicate with the user terminal device 1000 is the wearable device. Further, reference numeral 4540 of FIG. 45 represents the panel including the UI element associated with the music application when the application that is being executed by the user terminal device 1000 is a music application. The UI element associated with the music application may include at least one of, for example, a music search UI element, a music start UI element, a music ending UI element, a volume control UI element, and a UI element corresponding to other applications associated with a music application. When the application that is being executed by the user terminal device 1000 is a gallery application, reference numeral 4550 of FIG. 45 represents the panel including the UI element associated with the gallery application. The UI element associated with the gallery application may include at least one of, for example, an image search UI element, an image editing UI element, an image deleting UI element, an image sharing UI element, and a UI element corresponding to other applications associated with an image application.

When the plurality of panels are stored in the storage 310 and one of the plurality of panels is displayed on the sub-region 1020 of the bent touch screen 100, one panel that is being displayed on the sub-region 1020 may be switched to the other of the plurality of panels depending on the user gesture. Further, when the user gesture is continued, the controller 200 may again display one panel first displayed when the switching of the plurality of panels ends. That is, the controller 200 may display the plurality of panels in a circulation or revolving manner in response to the user gesture.

According to another exemplary embodiment, when the plurality of panels are stored in the storage 310, the user may change an order that the plurality of panels are circulated. Alternatively, at least one of the plurality of panels may be deleted. Alternatively, the user may also register a specific application or a function in the panel corresponding to one external device.

Figure 46A:
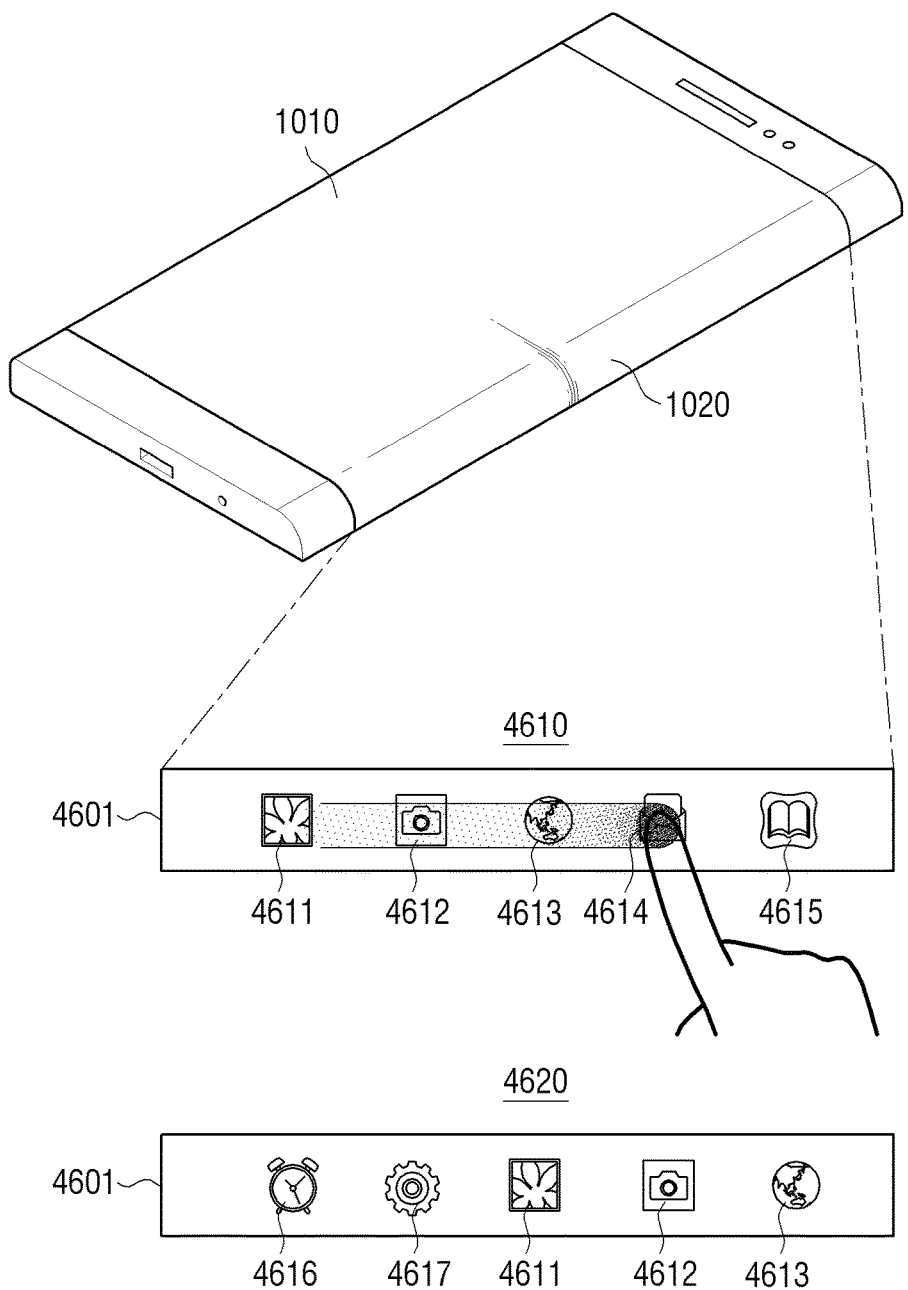

Referring to 4610 of FIG. 46A, the controller 200 may display a panel management application 4601 on the main region 1010 or the sub-region 1020. The panel management application 4601 may include objects 4611 to 4615 associated with one panel. In this state, the bent touch screen 100 may select one of the plurality of objects and receive the user gesture dragged along the long side of the sub-region 1020. As illustrated in 4620 of FIG. 46A, the controller 200 may display the panel management application 4601 including objects 4611, 4612, 4613, 4616, and 4617 of which the positions are changed, in response to the user gesture. Further, referring to reference numeral 4630 of FIG. 46B, the bent touch screen 100 may select one of the objects and receive the user gesture dragged outward of the sub-region 1020 while the panel management application 4601 including the objects 4611 to 4615 representing each of the plurality of panels is displayed. As illustrated in reference numeral 4640 of FIG. 46B, the controller 200 may delete one object 4614 of the objects 4611 to 4615 and display the panel management application 4601 from which one object 4614 is removed, in response to the user gesture.

Figure 47:
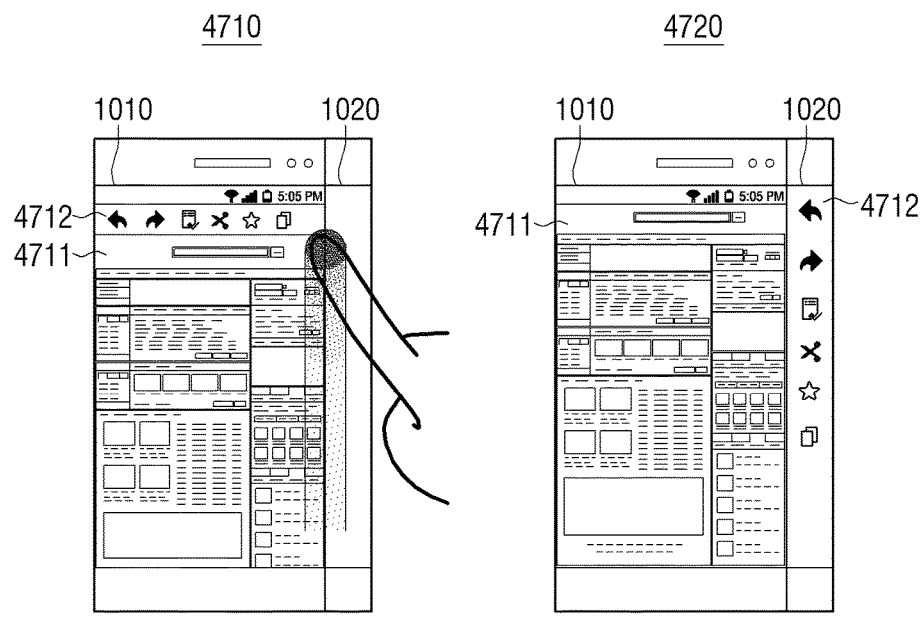
FIGS. 47 and 48 are diagrams illustrating the performance of the user interaction based on a boundary between a main region and the sub-region according to an exemplary embodiment of the present disclosure.
Figure 48:
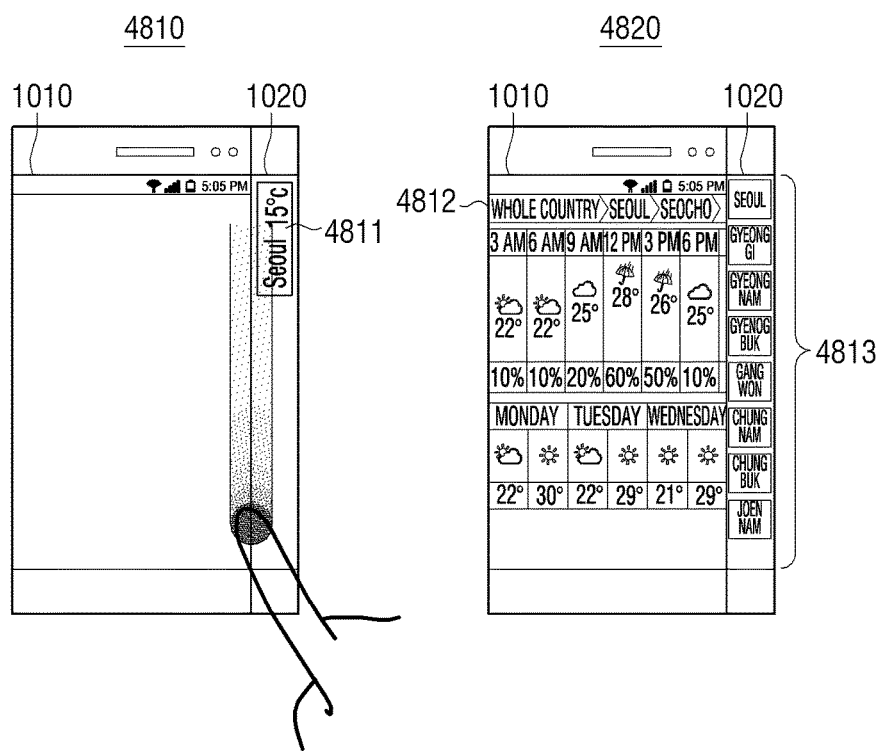

FIGS. 47 and 48 are diagrams illustrating the performance of the user interaction based on a boundary between the main region and the sub-region according to an exemplary embodiment of the present disclosure.

According to an exemplary embodiment, the controller 200 may display contents and the UI element controlling the contents on the main region 1010. In this state, the bent touch screen 100 may receive and sense the user gesture based on the boundary region between the main region 1010 and the sub-region 1020. For example, the bent touch screen 100 may be extended to at least one side surface (for example, at least one surface of the left, right, upper, and lower sides) of the user terminal device 1000 on the main region 1010 to allow the bent touch screen 100 to be folded to be smaller than an operable radius of curvature (for example, radius of curvature of 5 cm, 1 cm, 7.5 mm, 5 mm, 4 mm, etc.), such that the bent touch screen 100 may be fastened with the side surface of the user terminal device 1000. In this case, the bent touch screen 100 may receive and sense the user gesture based on the folded region. In detail, the bent touch screen 100 may receive and sense the user gesture vertically dragged along the boundary region. Alternatively, the bent touch screen 100 may receive and sense the user gesture dragged from the main region 1010 to the sub-region 1020 based on the boundary region. The controller 200 may display the UI element controlling the contents on the sub-region 1020 in response to the user gesture. Further, the controller 200 may extend the contents and display the extended contents on the main region 1010. In this case, the contents may be extended to include at least a portion of the region in which the UI element is displayed and may display the extended portion.

Referring to reference numeral 4710 of FIG. 47, the controller 200 may display a web page 4711 and a UI element 4712 controlling the web page on the main region 1010. In this state, the bent touch screen 100 may receive and sense the user gesture dragged downwardly along the boundary between the main region 1010 and the sub-region 1020. As illustrated in reference numeral 4720 of FIG. 47, the controller 200 may display a UI element 4712 on the sub-region 1020 in response to the user gesture. Further, the controller 200 may display the web page 4711 on the main region 1010. Here, as illustrated in reference numeral 4710 of FIG. 47, the web page 4711 may be extended to include at least a portion of the region in which the UI element 4712 is displayed and be displayed. Next, the controller 200 may control the web page 4711 in response to the user gesture selecting the UI element 4712. For example, the controller 200 may display a copy of web page, a registration of web page, and a web page before or after the web page.

According to another exemplary embodiment, the controller 200 may display the UI element on the sub-region 1020. In this state, the bent touch screen 100 may receive and sense the user gesture based on the boundary region between the main region 1010 and the sub-region 1020. For example, the bent touch screen 100 may receive and sense the user gesture vertically dragged along the boundary region. Alternatively, the bent touch screen 100 may receive and sense the user gesture dragged from the sub-region 1020 to the main region 1010 based on the boundary region. The controller 200 may display the execution screen of the contents or the application corresponding to the UI element on the main region 1010 in response to the user gesture. Further, the controller 200 may display another UI element controlling the execution screen of the contents or the application displayed on the main screen 1010 on the sub-region 1020.

For example, referring to reference numeral 4810 of FIG. 48, the controller 200 may display a weather object 4811 on the sub-region 1020. In this state, the bent touch screen 100 may receive and sense the user gesture dragged upwardly along the boundary between the main region 1010 and the sub-region 1020. As illustrated in reference numeral 4820 of FIG. 48, the controller 200 may display the execution screen 4812 of the weather application corresponding to the weather object 4811 on the main region 1010 in response to the user gesture. Further, the controller 200 may display the UI element 4813 controlling the execution screen 4812 of the weather application on the sub-region 1020.

Figure 50:
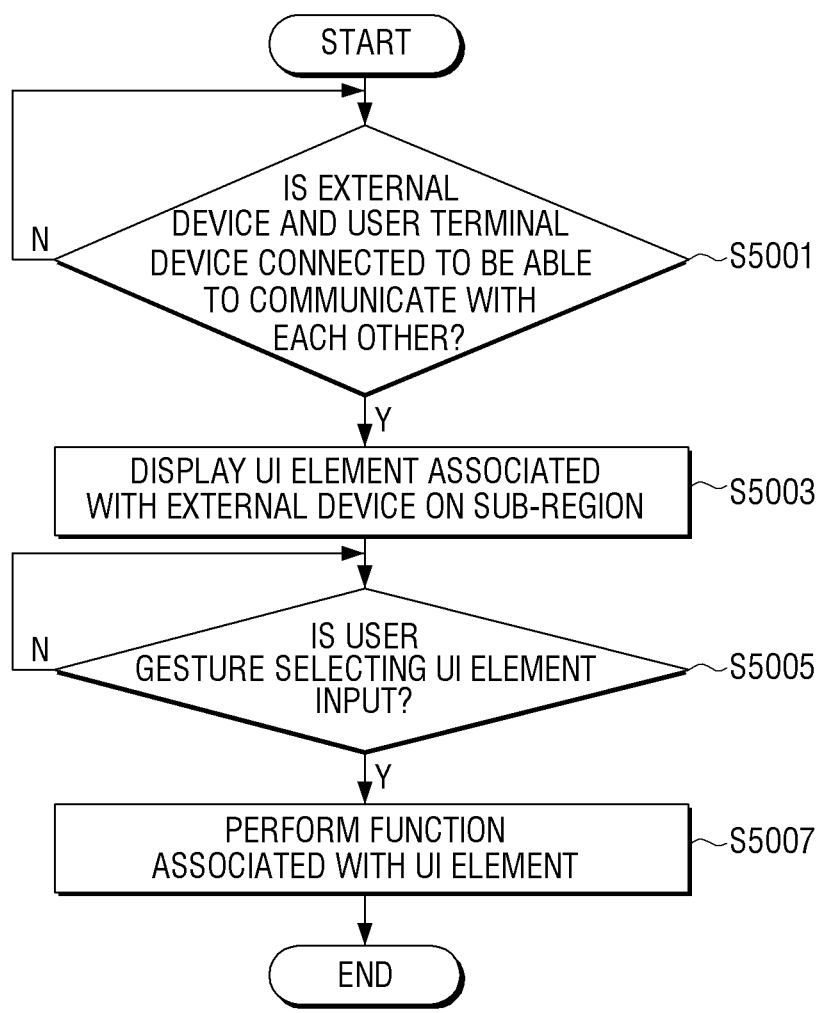
FIGS. 50, 51, and 52 are flow charts for describing an interaction method for a user terminal device according to various exemplary embodiments of the present disclosure.

FIG. 50 is a flow chart for describing an interaction method according to another exemplary embodiment of the present disclosure.

Referring to FIG. 50, the user terminal device 1000 may determine whether the external device and the user terminal device 1000 are connected so as to be able to communicate with each other (S5001).

As a result, if the external device and the user terminal device 1000 are connected so as to be able to communicate with each other (S5001—Y), the user terminal device 1000 may display the UI element associated with the external device on the sub-region 1020 (S5003).

Next, the user terminal device 1000 may determine whether the user gesture selecting the UI element is input to the sub-region 1020 (S5005).

As a result, if the user gesture is input (S5005—Y), the user terminal device 1000 may perform the function associated with the UI element (S5007). For example, the user terminal device 1000 may display the execution screen of the application corresponding to the UI element on the main region 1010 or the sub-region 1020. Alternatively, the user terminal device 1000 may display at least one UI element controlling the external device on the sub-region 1020. Alternatively, the user terminal device 1000 may control the function of the external device.

Figure 51:
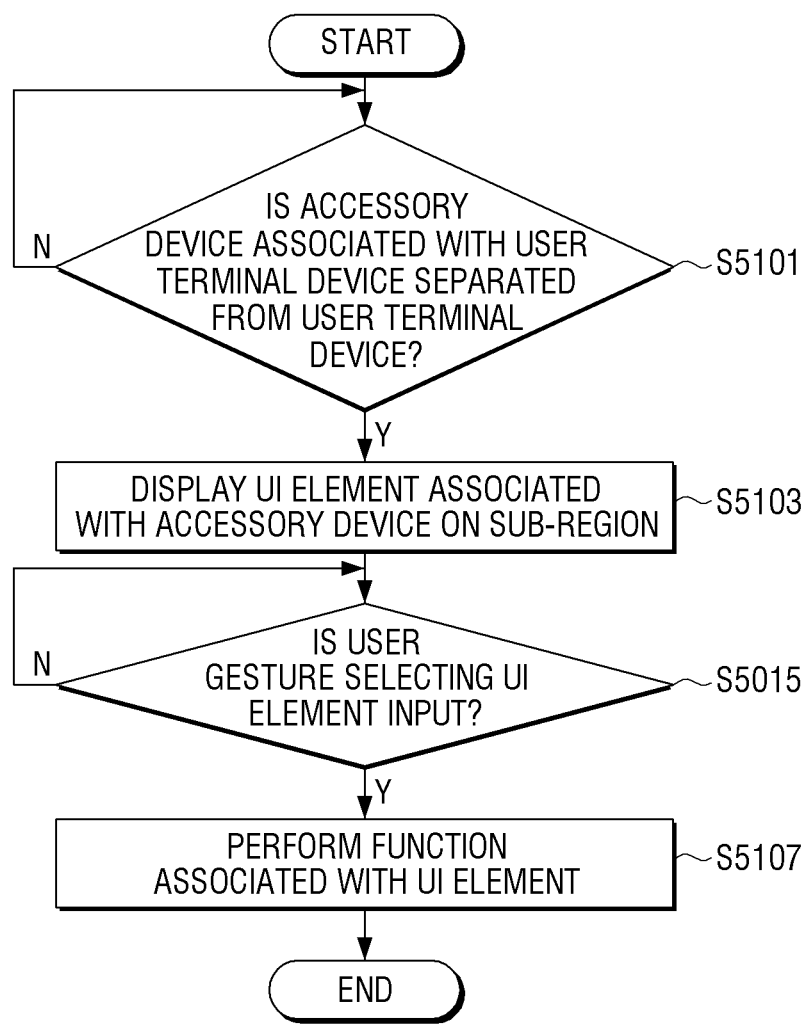

FIG. 51 is a flow chart for describing an interaction method according to another exemplary embodiment of the present disclosure.

Referring to FIG. 51, the user terminal device 1000 may determine whether the accessory device associated with the user terminal device 1000 is separated from the user terminal device 1000 (S5101). The accessory device may be, for example, a pen.

As a result, if the accessory device is separated from the user terminal device (S5101—Y), the user terminal device 1000 may display the UI element associated with the external device on the sub-region 1020 (S5103).

Next, the user terminal device 1000 may determine whether the user gesture selecting the UI element is input to the sub-region 1020 (S5105).

As a result, if the user gesture is input (S5105—Y), the user terminal device 1000 may perform the function associated with the UI element (S5107). For example, the user terminal device 1000 may display the execution screen of the application corresponding to the UI element on the main region 1010 or the sub-region 1020. Alternatively, the user terminal device 1000 may display at least one UI element controlling the external device on the sub-region 1020. Alternatively, the user terminal device 1000 may control the function of the external device.

Figure 52:
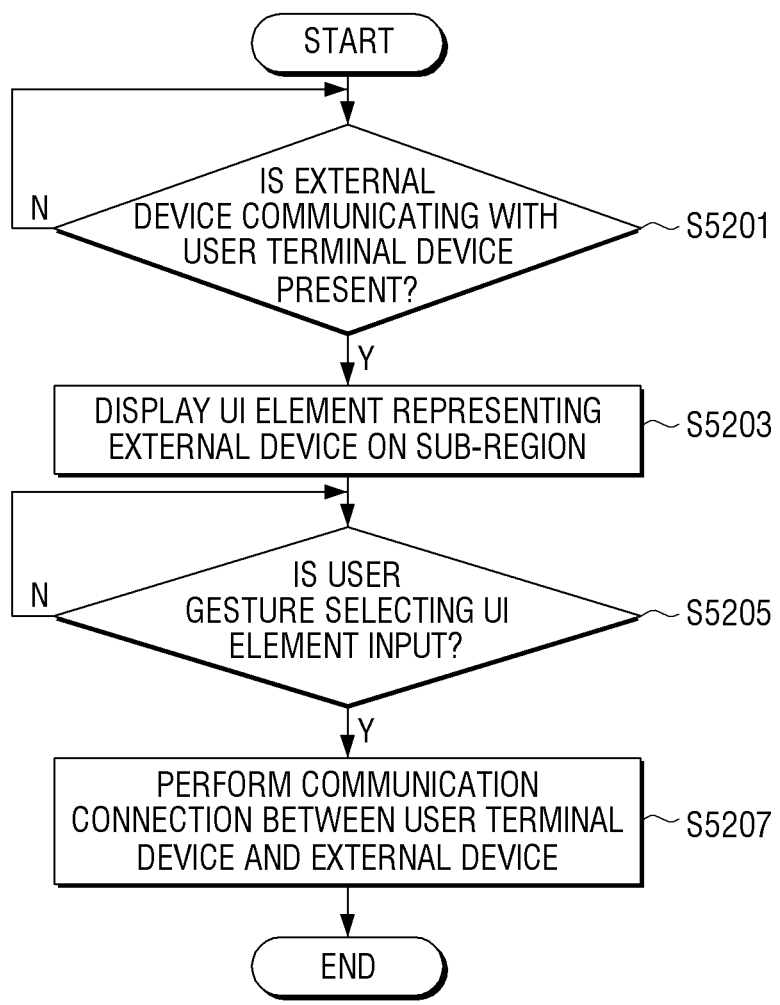

FIG. 52 is a flow chart for describing an interaction method according to another exemplary embodiment of the present disclosure.

Referring to FIG. 52, the user terminal device 1000 may determine whether the external device communicating with the user terminal device 1000 is present (S5201).

As a result, if the external device communicating with the user terminal device 1000 is present (S5201—Y), the user terminal device 1000 may display the UI element representing the external device on the sub-region 1020 (S5203).

Next, the user terminal device 1000 may determine whether the user gesture selecting the UI element is input to the sub-region 1020 (S5205).

As a result, if the user gesture is input (S5205—Y), the user terminal device 1000 may perform the communication connection between the user terminal device 1000 and the external device (S5207).

In addition, the interactions described in various exemplary embodiments as described above may be performed but the illustration and description of the detailed flow chart for each exemplary embodiment will be omitted.

As described above, the user terminal device may support various interactions. Each exemplary embodiment as described above may be separately implemented, but if necessary, may be implemented by being combined with each other.

Meanwhile, the interaction method for a user terminal device and the screen display method according to various exemplary embodiments of the present disclosure as described above may be stored in a non-transitory readable medium. The non-transitory readable medium may be used while being equipped in various apparatuses.

The non-transitory readable medium is not a medium that stores data therein for a while, such as a register, a cache, and a memory, but means a medium that semi-permanently stores data therein and is readable by a device. In detail, the non-transitory readable medium may be a CD, a DVD, a hard disc, a Blueray disc, an USB, a memory card, an ROM, etc.

For example, a program code for performing receiving a finger gesture selecting a first object included in a menu displayed on a sub-region of a bent touch screen divided into the main region and the sub-region having an area smaller than that of the main region and fixed to form a surface including the main region and a surface including the sub-region in an obtuse angle; receiving a pen gesture moved on the main region; and visually transforming and displaying a region corresponding to a moved trajectory in response to the finger gesture and the pen gesture, as a result of applying a function corresponding to the first object to the region corresponding to the moved trajectory of the pen gesture may be stored in a non-transitory readable medium and be provided.

Further, although the preferred embodiments of the present disclosure have been disclosed for illustrative purposes, those skilled in the art will appreciate that various modifications, additions and substitutions are possible, without departing from the scope and spirit of the present disclosure as disclosed in the accompanying claims. Accordingly, such modifications, additions and substitutions should also be understood to fall within the scope of the present disclosure.

What is claimed is:

1. An electronic device comprising:
   a touch display comprising a main display area and a curved sub display area, the curved sub display area being extended from the main display area in an integrated manner, is curved toward one side of the main display area, and is smaller than the main display area;
   a communicator circuit configured to connect with a wearable device; and
   a controller, based on a connection to the wearable device, configured to control the touch display to display a user interface related to the wearable device on the curved sub display area, based on receiving a touch input relating to the user interface displayed on the curved sub display area, perform an operation related to the touch input relating to the user interface displayed on the curved sub display area; and based on performing the operation related to the touch input relating to the user interface, control the touch display to display at least one selectable user interface item to control the wearable device on the curved sub display area,
   wherein the controller is further configured to control the display to simultaneously display on the curved sub display area a plurality of selectable user interface icons uniquely associated with a plurality of wearable devices connected with the electronic device, and
   wherein the controller is further configured to display a plurality of applications of one of the wearable devices corresponding to a touch input relating to one of the plurality of user interface icons on the curved sub display area.

2. The electronic device as claimed in claim 1, wherein the controller, based on performing the operation related to the touch input relating to the user interface, controls the touch display to display an execution screen of an application corresponding to the touch input relating to the user interface on at least one from among the main display area and the curved sub display area.

3. The electronic device as claimed in claim 2, wherein the operation related to the touch input relating to the user interface is a function to control the wearable device.

4. The electronic device as claimed in claim 3, wherein the function to control the wearable device comprises determining a type of a home screen to be displayed on the wearable device, a type of a notification application to be displayed on the wearable device, a video or an audio content to be reproduced in the wearable device, user bio information to be sensed by the wearable device, or time information to be displayed on the wearable device.

5. The electronic device as claimed in claim 1, wherein the user interface comprises identification information of the wearable device or identification information of an application to control the wearable device.

6. A user interaction method of an electronic device having a touch display including a main display area and a curved sub display area, the curved sub display area being extended from the main display area in an integrated manner, is curved toward one side of the main display area, and is smaller than the main display area, the method comprising:
   based on a wearable device being connected to the electronic device, displaying a user interface related to the wearable device on the curved sub display area;
   based on receiving a touch input related to the user interface displayed on the curved sub display area, performing an operation related to the touch input relating to the user interface displayed on the curved sub display area;
   based on performing the operation related to the touch input relating to the user interface, controlling the touch display to display at least one selectable user interface item to control the wearable device on the curved sub display area;
   controlling the display to simultaneously display on the curved sub display area a plurality of selectable user interface icons uniquely associated with a plurality of wearable devices connected with the electronic device; and
   controlling the display to display a plurality of applications of one of the wearable devices corresponding to a touch input relating to one of the plurality of user interface icons on the curved sub display area.

7. The method as claimed in claim 6, wherein the performing the operation comprises displaying an execution screen of an application corresponding to the touch input relating to the user interface on at least one from among the main display area and the curved sub display area.

8. The method as claimed in claim 6, wherein the performing the operation comprises executing a function to control the wearable device.

9. The method as claimed in claim 8, wherein the executing the function to control the wearable device comprises determining a type of a home screen to be displayed on the wearable device, a type of a notification application to be displayed on the wearable device, a video or an audio content to be reproduced in the wearable device, user bio information to be sensed by the wearable device, or time information to be displayed on the wearable device.

10. The method as claimed in claim 6, wherein the user interface comprises identification information of the wearable device or identification information of an application to control the wearable device.

11. The electronic device as claimed in claim 1, wherein the controller is further configured to detect a first touch input on the curved sub display area;
- detect a second touch input on the main display area; and
  - virtually transform and display a region corresponding to the second touch input based on the first touch input.

12. The method as claimed in claim 6, further comprising:
- detecting a first touch input on the curved sub display area;
- detecting a second touch input on the main display area; and
- virtually transforming and displaying a region corresponding to the second touch input based on the first touch input.

13. The electronic device as claimed in claim 11, wherein the first touch input and the second touch input are simultaneously detected.

14. The method as claimed in claim 12, wherein the first touch input and the second touch input are simultaneously detected.

15. The electronic device as claimed in claim 11, wherein the first touch input is a finger gesture and the second touch input is a pen gesture.

16. The method as claimed in claim 12, wherein the first touch input is a finger gesture and the second touch input is a pen gesture.

* * * * *